United States Patent [19]
Donnelly et al.

[11] Patent Number: 6,049,776
[45] Date of Patent: Apr. 11, 2000

[54] HUMAN RESOURCE MANAGEMENT SYSTEM FOR STAFFING PROJECTS

[75] Inventors: Joseph S. Donnelly, Clearwater, Fla.; Morris G. Robinson, Atlanta, Ga.; James R. Reese, Valrico, Fla.

[73] Assignee: Unisys Corporation, Blue Bell, Pa.

[21] Appl. No.: 09/081,512

[22] Filed: May 20, 1998

Related U.S. Application Data

[60] Provisional application No. 60/058,053, Sep. 6, 1997.

[51] Int. Cl.[7] ............................................. G06F 17/60
[52] U.S. Cl. .................. 705/8; 705/1; 705/7; 705/9; 364/468.01; 364/468.02; 364/468.03; 364/468.04; 364/468.05; 364/468.06
[58] Field of Search .................. 705/7, 8, 9, 1; 364/468.01, 468.02, 468.03, 468.04, 468.05, 468.06; 345/133, 140, 141

[56] References Cited

U.S. PATENT DOCUMENTS

| | | | |
|---|---|---|---|
| 5,111,391 | 5/1992 | Fields et al. | 705/9 |
| 5,117,353 | 5/1992 | Stipanovich et al. | 705/11 |
| 5,164,897 | 11/1992 | Clark et al. | 705/9 |
| 5,867,822 | 2/1999 | Sankar | 705/9 |

*Primary Examiner*—Allen R. MacDonald
*Assistant Examiner*—Romain Jeanty

*Attorney, Agent, or Firm*—Albert B. Cooper; Mark T. Starr; Steven B. Samuels

[57] ABSTRACT

A Resource Management System (RMS) including an RMS server having an RMS database containing files storing information on employees, employee skills, employee schedules and projects. The information in the files of the RMS database is obtained from external corporate databases as well as from direct entry. Calendar functionality is included for maintaining the scheduled activities of employees with different types of scheduled activities differently highlighted on a calendar display. Resource search and scheduling functionality is provided that identifies human resources possessing the required skills and availabilities for assignments to projects. Project parameters such as time requirements, skill requirements and proficiency levels are entered as parameters for defining the search. Assignment functionality assigns the identified employees to the projects and updates the system calendar to reflect the project assignments. RMS provides interfaces between the external databases and the RMS database for maintaining the information current that is stored therein. A common user interface provides a common view of the information in the RMS database and in the external databases. The RMS server, including the RMS database, is implemented on a programmed computer system.

46 Claims, 67 Drawing Sheets

| | | Calendar for <Employee Name> <Month> <Year> | | | | |
|---|---|---|---|---|---|---|
| | 1 | 2 | 3 | 4 | 5 | 6 |
| 7 | 8<br>8:00 Group Meeting<br>10:00 ABC Company<br>3:00 Dr.Appt | 9 | 10 | 11 | 12 | 13 |
| 14 | 15<br>8:00 Vacation | 16<br>8:00 Vacation | 17<br>8:00 Vacation | 18<br>8:00 Vacation | 19<br>8:00 Vacation | 20 |
| 21 | 22 | 23 | 24 | 25 | 26 | 27 |
| 28 | 29 | 30 | 31 | | | |

View Calendar for MMYY: ☐    Next Month    Prior Month    Exit

Calendar for <Employee Name>

| Date | Begin Time | End Time | Description/Comments | Tentative | Phone # |
|---|---|---|---|---|---|
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |
| 99/99/99 | 99:99 | 99:99 | XXXXXXXXXXXXXXXXXXXXXXXXXXXXXXXX<br>XXXXXXXXXXXXXXXXXXXXXXXXXXXXX | * | (999)999-9999 |

Delete Confirmation

Warning -- the following calendar entries will be deleted. Press OK to confirm. Exit to abort.

| Date | Time | ID | Description | Effort |
|------|------|----|-------------|--------|

[OK]  [Exit]

*Figure 16*

Add Calendar Entries

Name: [ ]

[ Select MAF ] [ ] [ Select Task ] [ ] [ Select TAR ]
[ Select Course ] [ Select Effort Code ]

Description: [ ]

Task: [ ]                        Effort: [ ]

Begin Date:                       End Date:
[ Calendar ]                      [ Calendar ]

Begin Time: [ ]
End Time: [ ]

2-Week Repeating Pattern: ☐ M ☐ T ☐ W ☐ T ☐ F   ☐ M ☐ T ☐ W ☐ T ☐ F

Comments: [ ]

Telephone #: [ ]                  Entered By: [ ]

☐ Personal Memo  ☐ Flexible  ☐ Tentative (Expiration Date: [ ] )

[ Update ]   [ Exit ]

*Figure 17*

Update Calendar Entry

Name:

Select MAF  Select Task  Select TAR

Select Course  Select Effort Code

Description:

Task:  Effort:

Date:

Begin Time:

Calendar

End Time:

Comments:

Telephone #:  Updated By:

☐ Personal Memo  ☐ Flexible  ☐ Tentative (Expiration Date: )

Update  Next  Previous  Exit

*Figure 18*

Group Calendar Update

Name: [_____]

Select MAF [_____]    Select Task [_____]    Select TAR [_____]

Select Course [_____]    Select Effort Code [_____]

Description: [_____]

Task: [_____]    Effort: [_____]

Begin Time: [____]    End Time: [____]

Comments: [_____]

Telephone #: [_____]    Updated By: [_____]

☐ Personal Memo   ☐ Flexible   ☐ Tentative (Expiration Date: [____] )

[ Update ]    [ Exit ]

*Figure 19*

Group Selection

Name: _____

[Select MAF] [Select Task] [Select TAR]

[Select Course] [Select Effort Code]

Description: _____

Task: _____ Effort: _____

Begin Date:
Calendar

End Date:
Calendar

Begin Time: _____
End Time: _____

2-Week Repeating Pattern: ☐ M ☐ T ☐ W ☐ T ☐ F  ☐ M ☐ T ☐ W ☐ T ☐ F

Entered By: _____  ☐ Flexible  ☐ Tentative (Expiration Date: _____ )

☐ Personal Memo

[View Selection] [Update] [Group Update] [Group Delete] [Exit]

Select MAF

Project Name:
Customer Name:

○ MAF Id    ○ Customer Name    ○ Project Name    ○ Org

MAF Id    Customer Name    Project Name    Org

[OK]  [Find]  [Exit]

*Figure 22*

Select TAR

TAR Description:
Customer Name:

○ Tar #   ○ Customer   ○ Description   ○ B Org  ○ S Org

Tar #   Customer   Description   Benefitting Org   Supplying Org

OK   Find   Exit

*Figure 24*

Select Course

Course Name:
○ Course Number
○ Description

Course Number
Description

OK   Find   Exit

Schedule Conflict

The new calendar entries conflicts with the following entries. Please contact the following manager to resolve this conflict:

Conflict
Date    Begin/End Time    Description    Effort

Exit

*Figure 29*

Notification of Schedule Change

Mail Id      Name

☐ Notify Employee

☐ Notify Manager

OK      Exit

| Selection | | | | |
|---|---|---|---|---|
| ○ Org | ○ Structure Name | ○ Organization Name | | ○ Organization Owner |

| Org ID | Structure | Organization Name | Organization Owner |
|---|---|---|---|
| 8721 | District | ISG Imageing Services Tea | Pease,Mitchell S |
| 8743 | District | ISG Imageing Services Tea | Holt,James E |
| 8771 | District | ISG Imageing Services Tea | Dombrow,John E |
| 8772 | District | ISG Pub Adm Weat Colorad | Dingethel,John A |
| 8776 | District | ISG Pub Adm West Washing | Kornfend,John F |
| 8761 | District | ISG Pub Adm West Naveda | Frank,Gary R |
| 8785 | LOB Practice | ISG Ps Business Operation | Unknown |
| 8794 | LOB Practice | ISG Ps Hq Resource . . . | Glusing,Stephen W |
| 8819 | District | ISG Ps Hhs No Dss [Rev] | McGhin,Warren L |
| 8820 | LOB Practice | ISG Ps J&P Domain | Baker, Earl |
| 8821 | LOB Practice | ISG Ps T&R Unallocated | Kurkian,Mary V |
| 8822 | District | ISG Ps Consulting Unaloc | Yaeger,Anthony N |
| 8823 | District | ISG Ps Pee Ne Teemly | Vanover,Donald F |
| 8824 | District | ISG Ps Paw Minnesota | Unknown |
| 8825 | District | C&D Mapping | Unknown |
| 8826 | District | C&D Development & Supp | Unknown |

Select organization employee reports to

Hari Skills Data Entry

Business Management | 999999 | Oiler, Ronald L

Hari Skills
99/99/99 99:99:99

Last Refresh Date
9/9/99

Last Update
9/9/99

| | Proficiency | Environment |
|---|---|---|
| 10.1 Business Management | 3-Fully Proficient | N-General |
| 10.2 Administration | 4-Exceedingly Proficient | N-General |
| 10.3 Business Operation | 4-Exceedingly Proficient | N-General |
| 10.4 Business Strategy Awareness | 3-Fully Proficient | N-General |
| 10.5 Business Tactical Planning | 1-Low proficiency | N-General |
| 10.6 Financial/ Budget Management | 3-Fully Proficient | N-General |
| 10.7 Program Management | 4-Exceedingly Proficient | N-General |
| 10.8 Project Management | | N-General |
| 10.9 Strategic Thinking & Planning | 4-Exceedingly Proficient | |

View
- ● Skills
- ○ Employee Detail

[Done] [Cancel] [Update] [Print Setup] [Print] [Delete] [Summary]

*Figure 38*

Hari Skill Summary

Hari Skill Proficiency Summary
99:99:99
99/99/99    Bonchev, Mikhail
99999

| | | Count | Avg |
|---|---|---|---|
| 15 | Client Dedicated | 1 | 2.0 |
| 20 | Communication | 4 | 2.8 |
| 25 | Fast-Cycle | 3 | 3.3 |
| 30 | Innovative | 4 | 2.0 |
| 45 | Problem Analysis | 5 | 3.0 |
| 50 | Professional and/or Technical Knowledge | 4 | 2.8 |
| 55 | Results-Driven | 5 | 2.2 |
| 60 | Team Centered | 6 | 3.3 |
| 61 | General Business | 1 | 2.8 |
| 70 | Languages (Part A) | 1 | 3.0 |
| 71 | Languages (Part B) | 3 | 3.0 |
| 90 | Productivity Tools | 4 | 2.8 |
| 110 | Documentation | 5 | 2.4 |
| 400 | Client Builder Methods & Tools | 4 | 2.3 |
| 410 | Object Oriented Methods & Tools | 1 | 1.0 |
| 620 | CASE/4GL | 4 | 2.5 |
| | Total Skills | 55 | |

[Done]  [Print]  [Print Setup]

*Figure 39*

| File | Org | Select | Delete | Cancel | Transfer | Exit | List | Search | Access | Secretary | Owner |
|------|-----|--------|--------|--------|----------|------|------|--------|--------|-----------|-------|

System Admin Desktop(VI.191T) NTATLANTASERVER Haupert,James

Organization Maintenance

Select Order
○ Org  ○ Structure    ○ Org Name    ● Div  ○ Reg  ○ LOB  ○ Dis

| Org ID | Structure Name | Org Name | Division | Region | Lob | District |
|--------|----------------|----------|----------|--------|-----|----------|
| 5003 | Division Sub | ISg Public Sector | 5003 | 0 | 0 | 0 |
| 6261 | LOB Practice | CSG Ps Hhs Marketing | 5003 | 5140 | 8261 | 6531 |
| 7172 | District | Assist Facilities Reserv | 5003 | 5140 | 6504 | 6506 |
| 6025 | District | ISg Western Services Sum | 5003 | 5140 | 6505 | 6504 |
| 7646 | District | ISg Ps Hhs Sc lvd [Rev] | 5003 | 5140 | 6504 | 0 |
| 5506 | LOB Prictice | Sg Headquarters Summary | 5003 | 5140 | 5506 | 6505 |
| 1253 | District | ISg Ps Hhs La Leader [Re | 5003 | 5140 | 6505 | 0 |
| 6504 | LOB Practice | ISg Eastern Hris Summary | 5003 | 5140 | 6504 | 0 |
| 5140 | Group | ISg Ps Health & Human Se | 5003 | 5140 | 0 | 0 |

Division  5003 Division Sub           ISg Pr Health & Human Se
Region    5140 Group                  ISg Public Sector
LOB       5504 unknown                ISg Eastern Hris Summary
District  0 LOB Practice              Unknown
Org       6504 Level 6    Structure Name  LOB Practice Owner     Burpa,Christopher    Org Name  ISg Eastern Hhs Summary
Org Code  ☐              Secretary    NOTE    N-999-9999

System Admin Desktop (V1.191U) NTATLANTASERVER RMSUSER

Employee Darnell,Michael E Skills

Skills for Employee  Darnell,Michael E
09/10/96 16:05:08

| Category | Sub Category | LV | Env |
|---|---|---|---|
| 10 Business Management | 2 Administration | 3 | N |
|  | 3 Business Orientation | 4 | N |
|  | 4 Business Strategy Awareness | 4 | N |
|  | 5 Business/Tactical Planning | 4 | N |
|  | 6 Financial/Budget Management | 2 | N |
|  | 7 Program Management | 3 | N |
|  | 8 Project Management | 4 | N |
|  | 9 Strategic Agility |  |  |
| 15 Client Dedicated | 3 Consultancy | 4 | N |
|  | 4 Quality & Service Orientation | 4 | N |
| 20 Communication | 2 Listening | 4 | N |
|  | 3 Oral Communication | 3 | N |
|  | 4 Presentation Techniques | 3 | N |
|  | 5 Self-Expression | 4 | N |
|  | 6 Written Communication | 4 | N |

[ OK ]  [ Save As ]  [ Print ]  [ Print Setup ]  [ Environment ]

Proficiency [ ]                                    Environment [ ]

*Figure 43*

Employee Roster

| Employee | Phone | Manager | Phone | Employee Id | Location |
|---|---|---|---|---|---|
| Acker, Rita M | 999-9999 | Bell, Larry P | 999-9999 | 999999 | TALLAHASSEE |
| Adrion, Charles A | 999-9999 | Paul, Gorgon S | 999-9999 | 999999 | WHITE PLAINS |
| Aguilar, Patrick D | 9-999-9999 | Burpo, Christopher | N-999-9999 | 999999 | Charlotte |
| Alexander, Kellie M | 999-9999 | Zimmerman, George W | 999-9999 | 999999 | TALLAHASSEE |
| Alger, James C | 999-9999 | Cally, John C | 999-9999 | 99999 | Okemos |
| Allard, James C | 999-9999 | Paul, Gordon S | 999-9999 | 999999 | Albany |
| Allen, Allen R | 999-9999 | Thurman, William D | 999-999-9999 | 999999 | OKEMOS |
| Allen, Angela T | 999-999-9999 | Thurman, William D | 999-999-9999 | 999999 | OKEMOS |
| Allen, Rodney F | 999-9999 | Bell, Carl W | 999-9999 | 999999 | TALLAHASSEE |
| Allison, Debbie | 999-9999 | Wilkin, Ian | 999-9999 | 999999 | Fredericton |
| Andriessen, Lori S | 999-9999 | Smith, Scott L | 999-9999 | 999999 | SACRAMENTO |
| Apkarian, Russell G | 999-9999 | Paul, Gordan S | 999-9999 | 999999 | ALBANY |
| Arbour, Jeffrey J | 999-9999 | Smith, Scott J | 999-9999 | 99999 | Okemos |
| Archibald, Doug | 999-9999 | Spencer, John | 999-9999 | 999999 | Gloucester |
| Armistead, Barbara | | Unknown | | 999999 | Reston |
| Arthur, Edward | 999-9999 | Grissen, Thomas A | 999-9999 | 999999 | SACRAMENTO |
| Askary, Suha Y | 999-9999 | Dingethal, John A | 999-9999 | 999999 | Santa Ana |

JAMES REESE

UNISYS CORPORATION

BACKGROUND SUMMARY

12 years as an information systems professional with experience in custom design and development, including:

- Project Leadership
- Human Resources Applications
- Real Time Systems
- Technical Consulting
- System Conversion and Enhancement
- CASE/4GL Tools
- Documentation
- On-Site Support

SELECTED CAREER ACCOMPLISHMENTS

Project Leadership

Led team of five analysts in the design and development of the Technical Assistance Processing System (TAPS), an internal UNISYS Information Services application. TAPS integrates funding approval, purchase order, and invoice processing for all Information Services personnel requests. System replaced manual procedures and greatly reduced time and cost to process each request.

| Employee id | Name | Nickname | Org id | Org name | District | Lob |
|---|---|---|---|---|---|---|
| 999999 | Acker,Rita M | | 9999 | ISG Imaging Services Tea | 6029 | 6029 |
| 999999 | Adrion,Charles A | Charlie | 9999 | ISG PsPae Ne Team Ii | 6535 | 6535 |
| 999999 | Aguilar,Patrick D | | 9999 | ISG Ps Hhs East Other | 6504 | 6504 |
| 999999 | Alexander,Kellie M | | 9999 | ISG South Team I | 6028 | 6028 |
| 999999 | Alger,James C | | 9999 | ISG Ps Hhs Mi Swss (Rev) | 6505 | 6505 |
| 999999 | Allard,Gary J | | 9999 | ISG Ps Pae Ne Team Ii | 6535 | 6535 |
| 999999 | Allen,Allen R | | 9999 | ISG Ps Hhs Mich Assist | 6505 | 6505 |
| 999999 | Allen,Angela T | | 9999 | ISG Ps Hhs Mich Assist | 6505 | 6505 |
| 999999 | Allen,Rodney F | Rod | 9999 | ISG Ps Pae Bus Dev (Rev) | 0 | 8328 |
| 999999 | Andriessen,Lori S | | 9999 | ISG Ps Paw Hdqtrs | 0 | 8339 |
| 999999 | Apkarian,Russell G | Russ | 9999 | ISG Ps Pae Ne Team Ii | 6535 | 6535 |
| 999999 | Arbour,Jeffrey J | | 9999 | ISG Ps Paw Bus Dev (Rev) | 0 | 8334 |
| 999999 | Armistead,Barbara | | 9999 | Identification &Records | 7255 | 7253 |
| 999999 | Arthur,Edward | | 9999 | ISG Ps Hhs West Other | 6505 | 6505 |
| 999999 | Askary,Suha Y | | 9999 | ISG Pub Adm West Washing | 6536 | 6536 |
| 999999 | Bac,Michael F | | 9999 | C&D-Development &Supp | 7254 | 7253 |
| 999999 | Baccino,Daniel J | | 9999 | ISG Ps Hq Marketing | 0 | 8666 |
| 999999 | Backer,Daniel P | | 9999 | ISG Ps Paw Minnesota Ter | 6536 | 6536 |

| File | Employee | Filter | Window | Help | | | | | | | | | |
|------|----------|--------|--------|------|---|---|---|---|---|---|---|---|---|

Assign Employees

Search Report
(99/99/99 99:99:99)

| ID | Name | Office Phone | Grade | State | Org | Manager | Mgr Phone | Cat | Sub | Lvl | Env | List |
|----|------|--------------|-------|-------|-----|---------|-----------|-----|-----|-----|-----|------|
| 999 | AndTaseo | | EA14 | | 463058 | Unknown | | 770 | 2 | 2 | D | |
| 999999 | Andris,James | 999-9999 | EA02 | PA | 8202 | Consolazio,Eric P | N999-9999 | 770 | 1 | 3 | D | |
| 999 | Antonio Rosa | | EA12 | | 463064 | Unknown | | 770 | 1 | 2 | D | |
| 999999 | Arthur,Edward | 999-9999 | EA02 | CA | 8255 | Grissen,Thomas A | 999-9999 | 770 | 1 | 2 | D | |
| 999999 | Asanovic,Petar | | EA14 | | 69006E | Unknown | | 770 | 1 | 4 | D | |
| 999999 | Baldyga,Robert J | | EA03 | MI | 4445 | Thurman,William D | On-Site | 770 | 1 | 1 | D | |
| 999999 | Bassingtaon,Jeffrey | | 07 | | 675013 | Unknown | | 770 | 1 | 2 | D | |
| 999999 | Bekli Khaled | | ES02 | | 69005E | Unknown | | 770 | 1 | 4 | D | |
| 9999 | Bourban Pierre | | EA02 | | 303742 | Unknown | | 770 | 1 | 4 | D | |
| 999999 | Bousigues Pierre A | | EA09 | | 690064 | Unknown | | 770 | 1 | 2 | D | |
| 999999 | Bright,Robert E | 999-9999 | EC01 | FL | 8595 | Zimmerman,George V | 999-9999 | 770 | 1 | 3 | D | |
| 999999 | Burbeck Neville Jo | | 15 | | 675013 | Unknown | | 770 | 1 | 3 | A | |

Project Name:

Select MAF    Assign    Select Effect Code

Search for employees with current selected skills

| File | Employee | Filter | Window | Help | | | | | | | | | | |
|---|---|---|---|---|---|---|---|---|---|---|---|---|---|---|
| | | | | | | Found Employees | | | | | | | | |
| ID | Name | Office Phone | Grade | State | Org | Manager | Mgr Phone | Cat | Sub | Lvl | Env | List |
| | | | | | Skill Search Report (99/99/99 99:99:99) | | | | | | | | |
| 999 | Andy,Fraser | | EA14 | | 463058 | Unknown | | 770 | 1 | 2 | D | |
| 999999 | Andris,James | 999-9999 | EA02 | PA | 8202 | Consolazio,Eric P | N999-9999 | 770 | 1 | 3 | D | |
| 999 | Antonio Rosa | | EA12 | | 463064 | Unknown | | 770 | 1 | 2 | D | |
| 999999 | Arthur,Edward | 999-9999 | EA02 | CA | 8255 | Grissen,Thomas A | 999-9999 | 770 | 1 | 2 | D | |
| 999999 | Asanovic,Petar | | EA14 | | 6900E | Unknown | | 770 | 1 | 4 | D | |
| 99999 | Baldyga,Robert J | 999-9999 | EA03 | MI | 4445 | Thurman,William D | On-Site | 770 | 1 | 1 | D | |
| 999999 | Bassington,Jeffrey | | 07 | | 675013 | Unknown | | 770 | 1 | 2 | D | |
| 999999 | Bekli Khaled | | ES02 | | 69005E | Unknown | | 770 | 1 | 4 | D | |
| 9999 | Bourban Pierre | | EA02 | | 303742 | Unknown | | 770 | 1 | 4 | D | |
| 999999 | Bousigues Pierre A | | EA09 | | 690064 | Unknown | | 770 | 1 | 2 | D | |
| 999999 | Bright,Robert E | 999-9999 | EC01 | FL | 8595 | Zimmerman,George V | 999-9999 | 770 | 1 | 3 | D | |
| 999999 | Burbeck Neville Jo | | 15 | | 675013 | Unknown | | 770 | 1 | 3 | A | |

| Environment | D | Install/Maintain | | Proficiency | 2 | Moderate | | Filter Location |
|---|---|---|---|---|---|---|---|---|
| Skill | 770 | 1100/2200 Series | | | | | | Filter by Grade |
| | 1 | 1100/2200 Ser Comm Ntwks | | | | | | |
| Direct Report | 0 | UnKnown | | | | | | Calc Rates |
| | 4630560 | CSG Ps | | | Employees | 119 | | Done |

Search for employees with current selected skills

| File | Employee | Filter | Window | Help | | | | | | | | | |
|---|---|---|---|---|---|---|---|---|---|---|---|---|---|

Found Employees

Skill Search Report (99/99/99 99:99:99)

| ID | Name | Office Phone | Grade | State | Org | Manager | Mgr Phone | Cat | Sub | Lvl | Env | List |
|---|---|---|---|---|---|---|---|---|---|---|---|---|
| 99999 | Robbins Nigel | | EC01 | | 6750148 | UnKnown | | 825 | 9 | 3 | A | |
| 999 | Rogerio Seabra | | EM05 | | 4630560 | UnKnown | | 825 | 4 | 3 | D | |
| 999999 | RossiterRobert T | | EA02 | OH | 4445 | Thurman,William D | 999-999-9999 | 825 | 4 | 4 | A | |
| 9999 | Russi Ettor | | EC03 | | 2659998 | UnKnown | | 825 | 9 | 3 | D | |
| 999999 | Samra,Rajbir S | 999-9999 | EA02 | MI | 8236 | Rosenberg,Charles | 999-999-9999 | 825 | 9 | 3 | A | |
| 99999 | Sattari Afsi | | EM06 | | 6750152 | UnKnown | | 825 | 9 | 3 | A | |
| 9999 | Schmid Ernst | | EM06 | | 3037461 | UnKnown | | 825 | 9 | 3 | A | |
| 9999 | Schwab Heinz | | EC04 | | 3037455 | UnKnown | | 825 | 4 | 4 | A | |
| 999999 | Shope,Donald E | 999-9999 | EM03 | PA | 4629 | Santmire,Glenn F | | 825 | 9 | 3 | A | |
| 99999 | Short Chris | | EC03 | | 6750155 | UnKnown | | 825 | 9 | 3 | A | |
| 9999 | Smith Stephen L | | EM04 | | 6750155 | UnKnown | | 825 | 9 | 3 | A | |
| 9999 | Soccol Celestin | | EA16 | | 6900180 | UnKnown | | 825 | 9 | 3 | A | |

| Environment | D | Install/Maintain | | Proficiency | 3 | Fully | | Filter Location |
|---|---|---|---|---|---|---|---|---|
| Skill | 825 | Database Management Systems (Part A) | | | | | | Filter by Grade |
| | 9 | Oracle | | | | | 999-9999 | Calc Rates |
| Direct Report | 0 | UnKnown | | | | | | Done |
| | 2659998 | Sistemisti CSG | | | | Employees | 138 | |

Search for employees with current selected skills

*Figure 61*

Found Employees

| ID | Name | Office Phone |
|---|---|---|
| 9999 | Aiolfi Camil | |
| 9999 | Bagnara Marco | |
| 999999 | Bagne Jean | 999-9999 |
| 999999 | Barker, Scott W | |
| 9999 | Bauland Gabriel | |
| 9999 | Beretti Alessa | |
| 9999 | Bianchini Umber | |
| 9999 | Bouzi Noreddine | |
| 99999 | Box Chris | |
| 99999 | Bradbury Peter | |
| 9999 | Brambilla Dante | |

Environment: D  825  9
Direct Report: 0  2659

Select States/Countries to Include

| CUID | Code | Description | | Cat | Sub | Lvl | Env | List |
|---|---|---|---|---|---|---|---|---|
| 7 | ND | North Dakota | | 825 | 9 | 3 | D | |
| 7 | NE | Nebraska | | 825 | 9 | 3 | D | |
| 7 | NH | New Hampshire | | 825 | 4 | 3 | D | |
| 7 | NJ | New Jersey | | 825 | 9 | 3 | A | |
| 7 | NM | New Mexico | | 825 | 9 | 3 | A | |
| 7 | NV | Nevada | | 825 | 9 | 3 | D | |
| 7 | NY | New York | | 825 | 9 | 4 | A | |
| 7 | OH | Ohio | | 825 | 9 | 3 | A | |
| 7 | OK | Oklahoma | | 825 | 9 | 3 | A | |
| 7 | OR | Oregon | | 825 | 9 | 3 | A | |
| 7 | PA | Pennsylvania | | 825 | 9 | 4 | D | |
| 7 | RI | Rhode Island | | | | | | |
| 7 | SC | South Carolina | | | | | | |
| 7 | SD | South Dakota | | | | | | |
| 7 | TN | Tennessee | | | | | | |
| 7 | TX | Texas | | | | | | |
| 7 | UT | Utah | | | | | | |
| 7 | VA | Virginia | | | | | | |
| 7 | VT | Vermont | | | | | | |
| 7 | WA | Washington | | | | | | |
| 7 | WI | Wisconsin | | | | | | |

All US | All | Clear | OK | Cancel

Fully    138

Filter Location
Filter by Grade
Calc Rates
Done

Click to select/deselect states/countries to include in search

*Figure 62*

| File | Employee | Filter | Window | Help |
|---|---|---|---|---|

Found Employees

Skill Search Report
(99/99/99 99:99:99)

| ID | Name | Office Phone | Grade | State | Org | Manager | Mgr Phone | Cat | Sub | Lvl | Env List |
|---|---|---|---|---|---|---|---|---|---|---|---|
| 999999 | Baker,Scott W | 999-9999 | EC04 | PA | 8206 | Mahle,W Stephen | 999-9999 | 825 | 9 | 3 | A |
| 999999 | Ferrara,Edward S | 999-9999 | EM04 | PA | 8523 | Cawthorne,Gary D | | 825 | 4 | 3 | D |
| 999999 | Gildersleeve,Debor | 999-9999 | EC03 | NJ | 8202 | Consolazio,Eric P | 999-9999 | 825 | 9 | 4 | D |
| 999999 | Ladson,Richard O | 999-9999 | EA02 | PA | 4982 | UnKnown | | 825 | 9 | 3 | A |
| 999999 | Misra,Sunil | 999-9999 | EP04 | PA | 8473 | Christman,Richard | 999-9999 | 825 | 4 | 4 | A |
| 999999 | Rastogi,Subhash C | 999-9999 | EA01 | VA | 8823 | Yaeger,Anthony N | 999-9999 | 825 | 9 | 3 | A |
| 999999 | Rossiter,Robert T | | EA02 | OH | 4445 | Thurman,William D | 999-999-9999 | 825 | 4 | 4 | A |
| 999999 | Shope,Donald E | 999-9999 | EM03 | PA | 4629 | Santmire,Gleen F | | 825 | 9 | 4 | A |
| 999999 | Topp,Jonathan J | 999-9999 | EC01 | VA | 8811 | Miller,Mark R | 999-9999 | 825 | 4 | 3 | A |
| 999999 | Zhuge,Xing | 999-9999 | EC04 | PA | 8202 | Consolazio,Eric P | 999-9999 | 825 | 9 | 3 | D |

| Environment | A | Design/Develope | | Proficiency | 3 | Fully | | Filter Location |
| Skill | 825 | Database Management Systems (Part A) | | | | | Filter by Grade |
| | 9 | Oracle | | | | | |
| | 536921 | Mahle,W Stephen | | | | | Calc Rates |
| Direct Report | 8206 | ISG CMS Consultant | | | | 999-9999 | Done |

Resume     Employees 10

Ready

HUMAN RESOURCE MANAGEMENT SYSTEM FOR STAFFING PROJECTS

CROSS REFERENCE TO RELATED APPLICATIONS

This is a nonprovisional application corresponding to and claiming the benefit of copending provisional application Ser. No. 60/058053, filed on Sep. 6, 1997.

BACKGROUND OF THE INVENTION

1. Field of the Invention

The invention relates to computer implemented systems for managing human resource data.

2. Description of the Prior Art

The staffing of complex projects within the corporate environment is traditionally a formidable task. Managers are responsible for identifying and securing employee or external consultants to service the varied project requirements. Conventionally, a manager will use a personal list of resources and the contact with a resource is usually by telephone. Because of this, "telephone tag" and dead-end leads are common and assignment of a resource to an engagement may he delayed by days. When a manager is unable to identify a resource within the manager's organization to fill an engagement, queries to other organizations within the corporation are initiated and usually by telephone. If a suitable internal corporate resource cannot be located, the resource inquiries are extended to External Services Vendors (ESV). These problems are exacerbated in a large and complex corporate environment which may be worldwide.

The parameters that are considered for the service include skill sets and levels, duration of project, time constraints, locations, schedules and commitments of the numerous resources that may provide candidates for fulfilling the requirements of the project. The methods that had historically been used to identify candidates to perform tasks relied primarily on paper calendars, phone calls and personal contacts which methods would be untenable for a complex task in an extensive corporate environment with numerous corporate organizations that are large and diverse in scope.

On the basis of the skills required to fulfill an engagement, a manager will first attempt to identify a consultant within the manager's organization that is available during the required time frame. When a potential consultant is identified, the manager contacts the consultant to verify availability. If available, the consultant is assigned to the engagement by the manager. The assignment is strictly a paper assignment and the contact is generally initiated by telephone with the concomitant disadvantages discussed above. If the manager is unable to identify a resource to fill an engagement, telephone queries are initiated to other management personnel to locate appropriate candidates. If a consultant is identified somewhere within the corporation, that consultant's manager of record is contacted and is responsible for making the project assignment. When a suitable internal resource is not identified, an ESV is considered as a potential candidate, further complicating this process.

In traditional corporate environments, numerous and diverse database systems exist from which information about employees and ESVs could be acquired. The information is, however, scattered across many different locations, systems and responsibilities. These independent database systems normally require significantly different user interfaces to obtain the information. For example, information regarding employee skills would be on one database system, whereas employee demographic information such as geographic locations, willingness to travel, managers and telephone numbers would be on another system. Still another system would contain the detail information on the projects to be staffed. Yet other systems would contain information regarding employee schedules and time reporting and still another system would contain ESV information. Each of these separate database systems are independent with respect to each other and customized for is purpose. Because of the concomitant difficulties involved in a complex project and because of the diversity and number of these databases, the individual corporate database systems are seldom utilized to review the capabilities of consultants to staff the projects.

A number of limited capability, commercially procurable, schedulers are available that provide scheduling analysis based on the time schedules of personnel. Such systems, however, cannot take advantage of the information available in the above mentioned existing corporate database systems. The types of existing databases are so different and diverse that a complex interface would be required to input and output information. Furthermore, such commercially available schedulers do not have the provisions to handle a personnel skills database and perform a skill search with employees selected for an engagement.

It is appreciated from the above that project staffing is traditionally performed by personal interfaces over the telephone and on paper. It is believed that the prior art does not provide a computer implemented system for staffing projects in accordance with a search for required personnel skill sets and schedule availability for the purpose of assigning such personnel to the project. Furthermore, it is believed that such a system does not exist that additionally integrates therein further search parameters such as location, past performance, training, willingness to travel and the like. It is also believed that such a system does not exist that, in addition, modifies the calendars of the selected personnel to reflect the project assignments.

SUMMARY OF THE INVENTION

The present invention provides a Resource Management System (RMS) and method implemented on a programmed computer system for identifying candidate human resources to be assigned to a project where the project requires predetermined skills and predetermined time availability. The computer system maintains an RMS system database including a system skills database file containing records identifying skills possessed by potential candidate human resources. A system calendar database file containing records of scheduled activities of potential candidate human resources is also maintained in the RMS system database. The RMS system searches the system skills and calendar database files for human resources possessing the predetermined skills and the predetermined time availability required for the project so as to identify the candidate human resources for the project.

The RMS may be implemented to service an enterprise where the enterprise maintains external databases storing data relating to human resources of the enterprise. Preferably, the RMS provides interfaces between the external databases and the RMS for providing data from the external databases for the records contained in the RMS system database. The RMS may also provide data through the interfaces for updating the enterprise external databases.

A common user interface preferably provides a common view of the information in the RMS system database and the external databases.

The RMS includes a calendar generating system for generating calendar displays for individual human resources utilizing the records of the RMS system calendar database file. A yearly calendar display highlights the days to which the individual human resource is scheduled to assignments, with different highlights, such as color coding, for different respective assignment types. Scheduled holidays may be shown differently emphasized such as by indenting.

The RMS can assign an identified human resource to the project and update the system calendar database file with the assignment.

The RMS system database may also include a personnel file containing records identifying demographic parameters of potential candidate human resources. Selected demographic parameters may be utilized to refine the search for human resources to staff the project.

SUMMARY OF THE DRAWINGS

FIGS. 31–51 relate to entering and obtaining information from the RMS system of the present invention and in particular the screens of FIGS. 31–51 are utilized in adding to and updating the employee records and browsing through the employee information in the RMS database of FIG. 1. FIGS. 52–65 relate to the Resource Searching and Assigning functions of the RMS system of the present invention and FIG. 66 illustrates a user entry interface for the RMS system.

Figure 1:
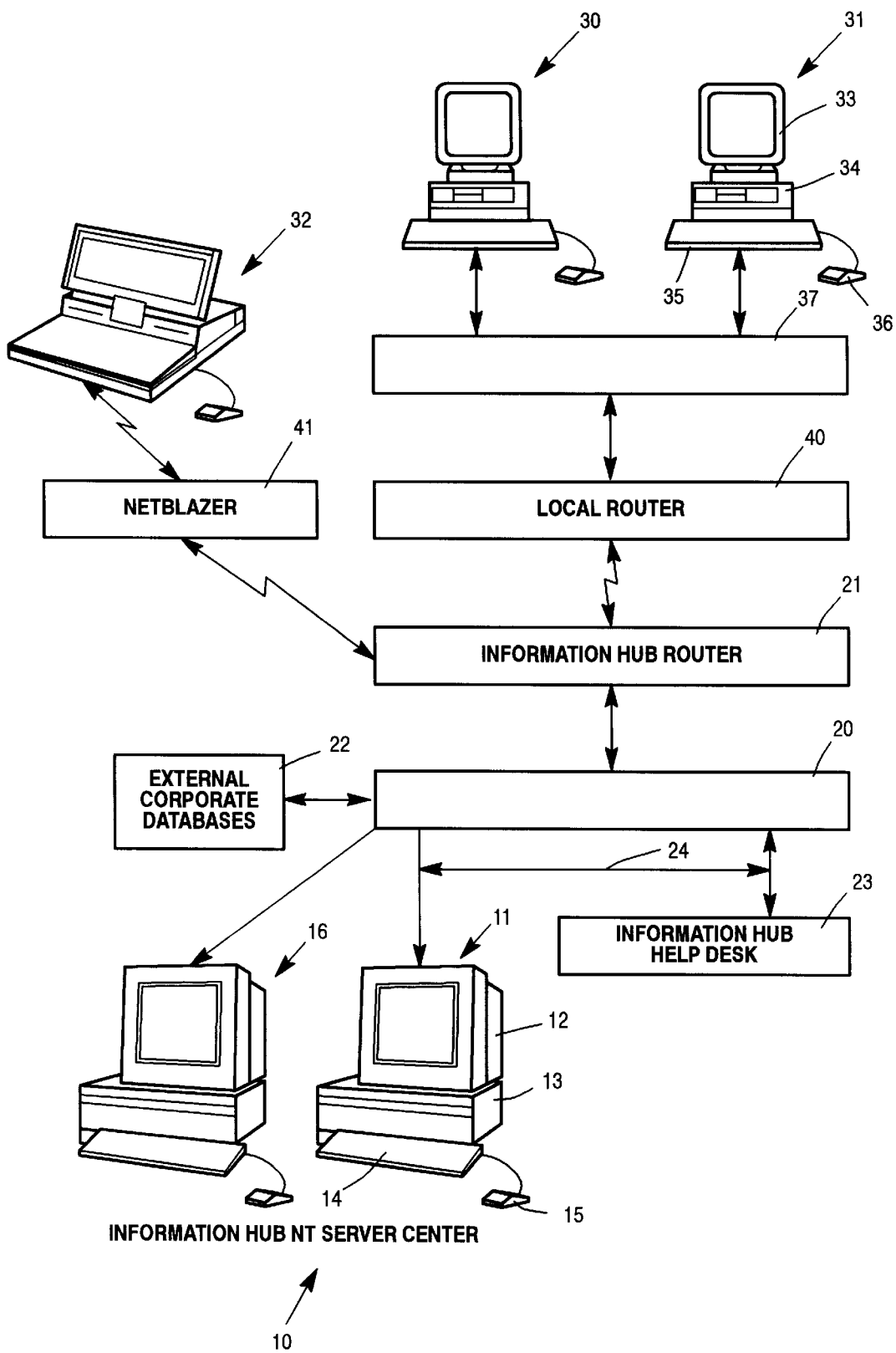
FIGS. 1–7 provide architectural and dataflow views of the present invention and FIGS. 8–30 relate to the calendar functions thereof.

The generation of the screens of FIGS. 8–30 and the control of data input and output with respect thereto are managed by the Calendar Management, the Screen Display Management and the Screen Data Input and Output Management functions of the RMS server of FIG. 1. The generation of the screens of FIGS. 31–51 and the control of data input and output with respect thereto are managed by the Screen Display Management and the Screen Data Input and Output Management functions of the RMS server of FIG. 1. The generation of the screens of FIGS. 52–65 and the control of data input and output with respect thereto are managed by the Resource Search logic, the Project Assignment logic, the Screen Display Management and the Screen Data Input and Output Management functions of the RMS server of FIG. 1. The generation of the screen of FIG. 66 and the control of data input and output with respect thereto are managed by the Master Controller, the Screen Display Management and the Screen Data Input and Output Management functions of the RMS server of FIG. 1.

BRIEF DESCRIPTION OF THE DRAWINGS

FIG. 1 is a network diagram illustrating a preferred architecture for the RMS system of the present invention.

Figure 2A:
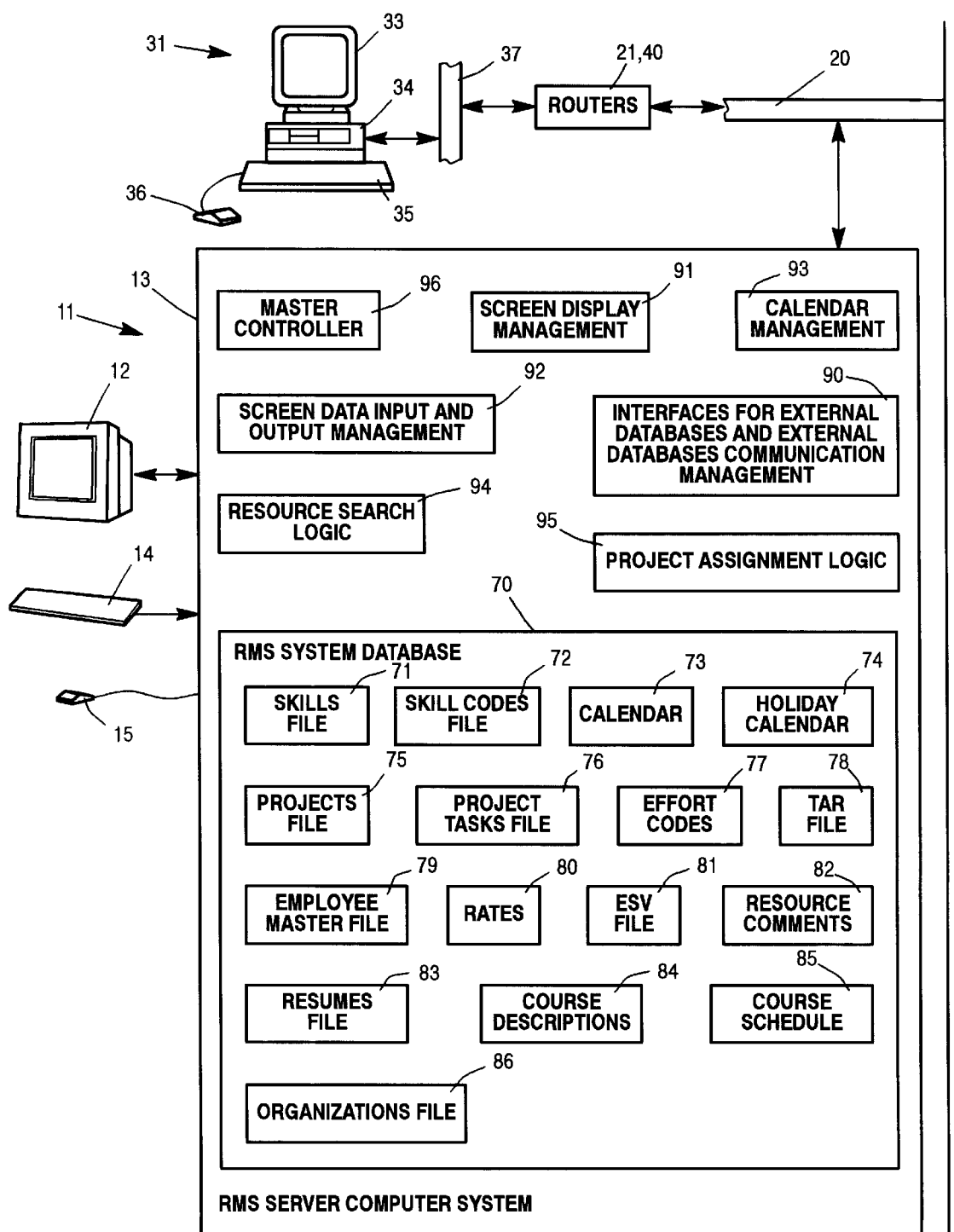
Figure 2B:
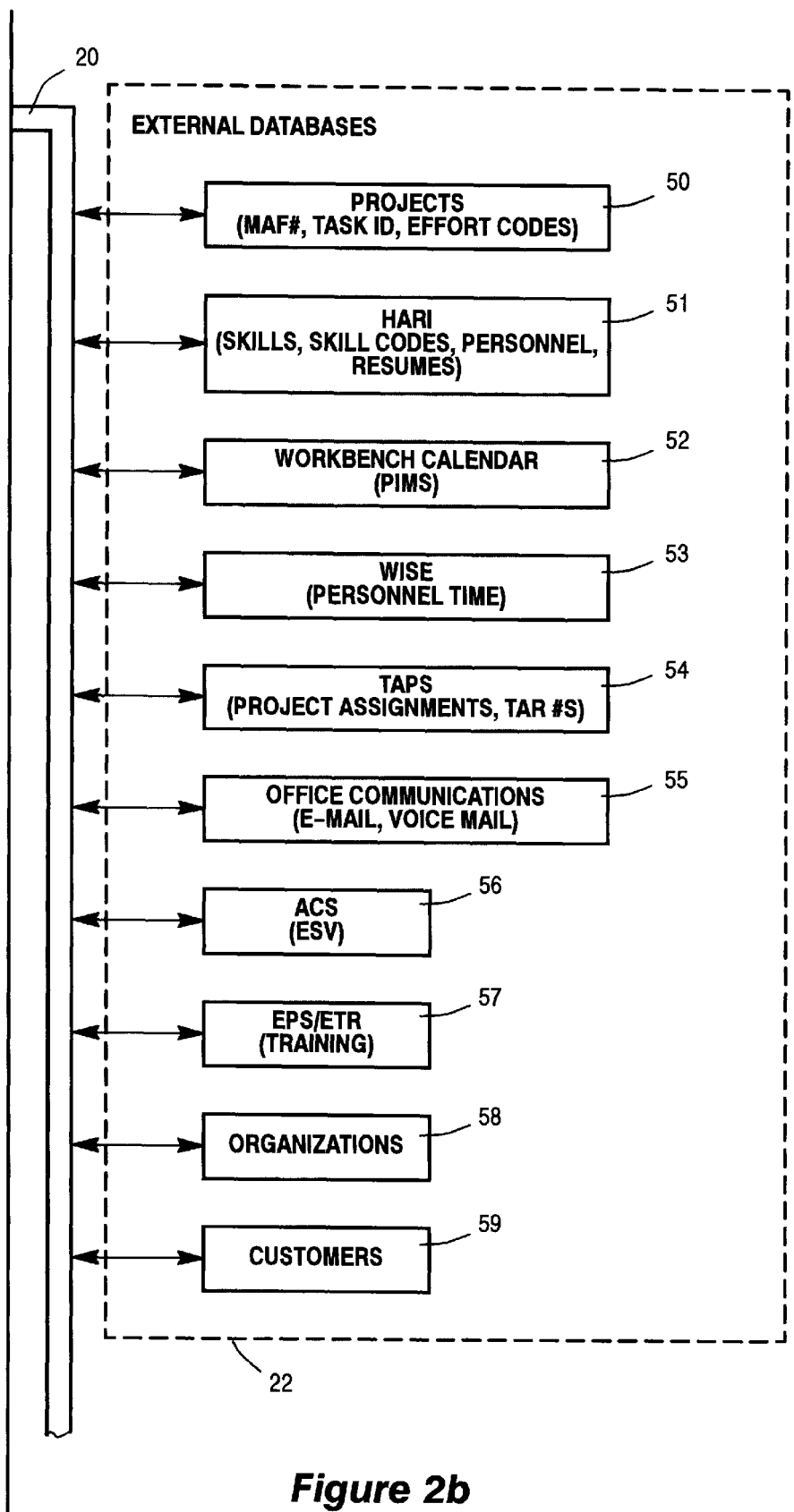

FIG. 2 is a schematic diagram illustrating details of the RMS production server of FIG. 1 interfaced with typical corporate external databases.

Figure 3:
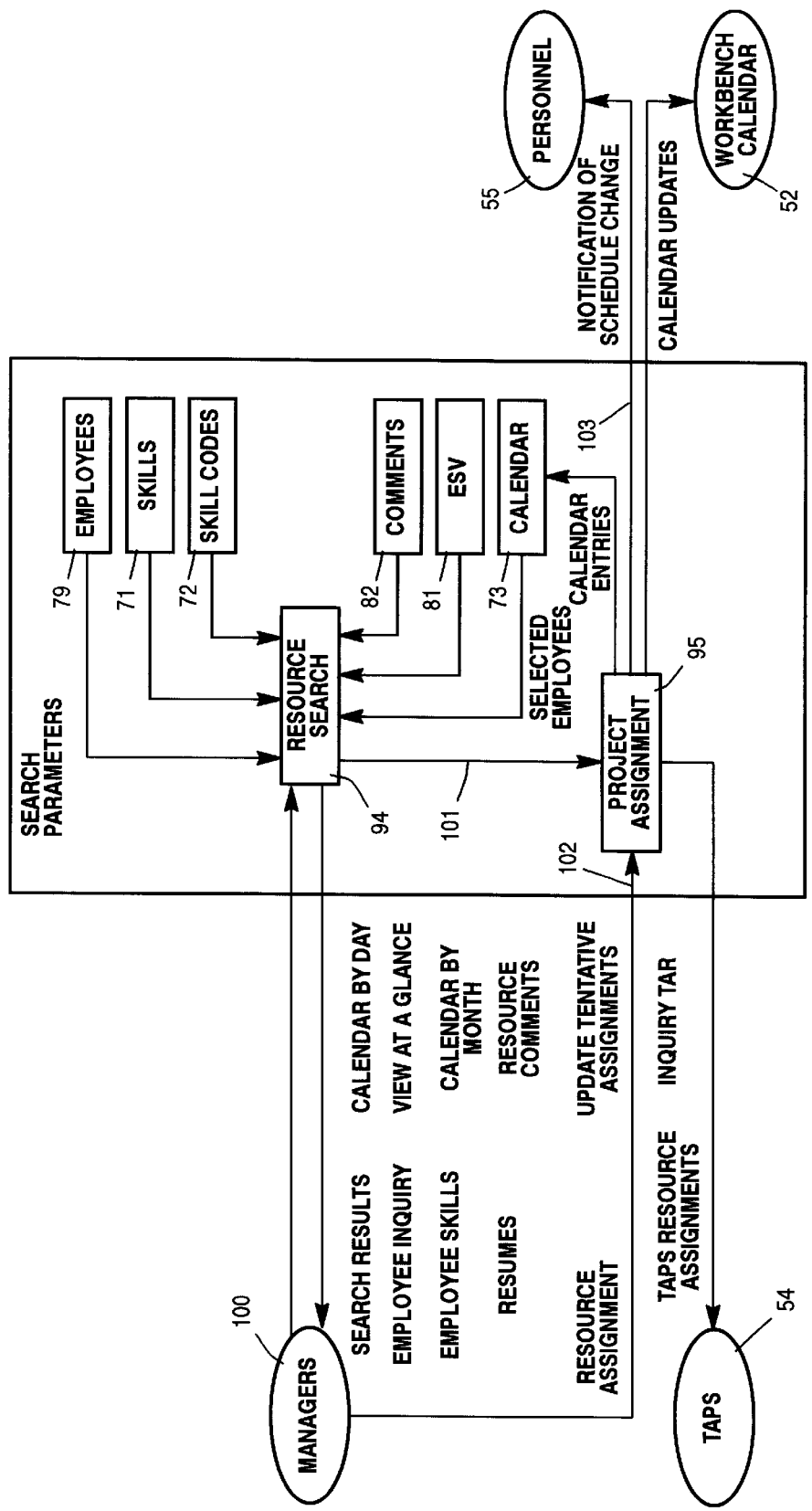

FIG. 3 is a dataflow diagram illustrating the Resource Search And Scheduling functions of the RMS system of the present invention.

Figure 4:
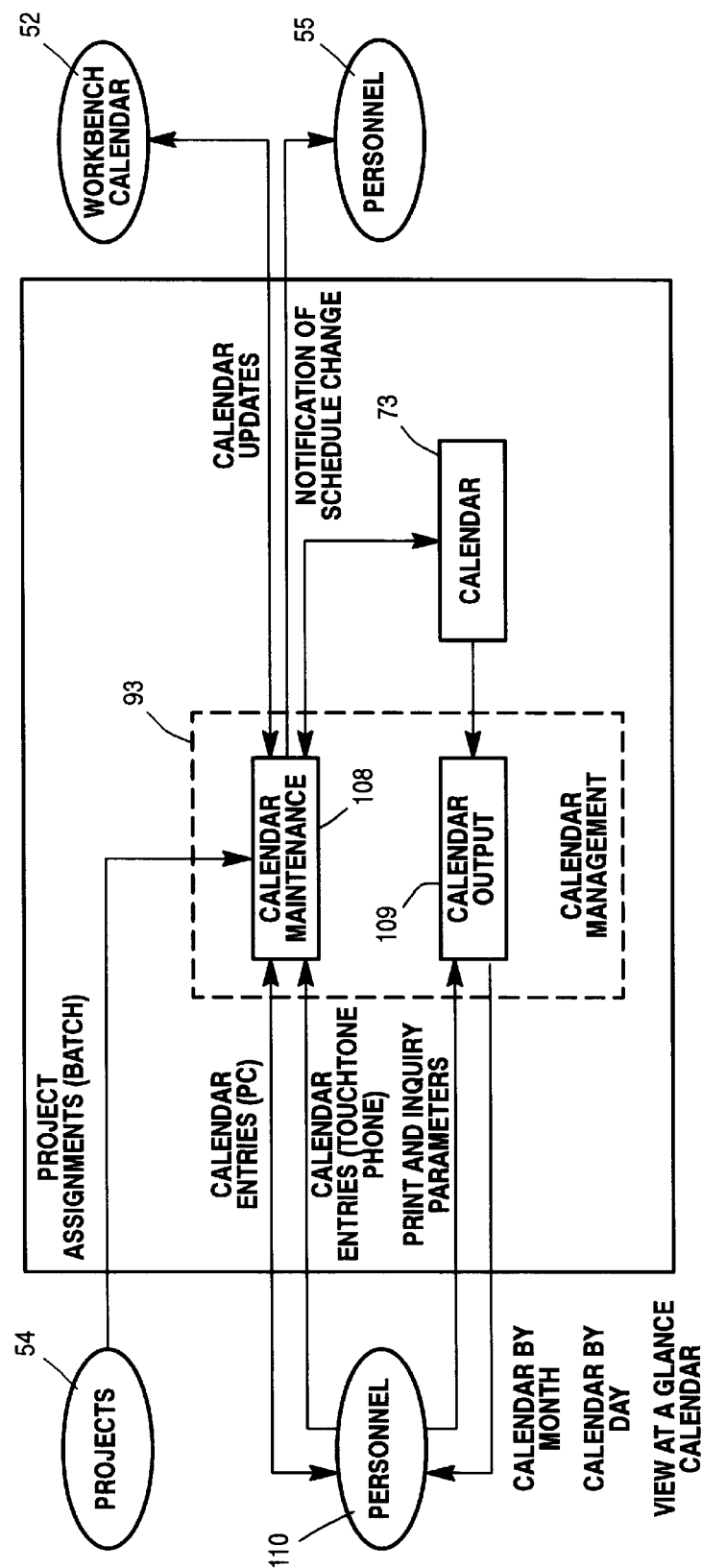

FIG. 4 is a dataflow diagram illustrating the Calendar functions of the RMS system of the present invention.

Figure 5:
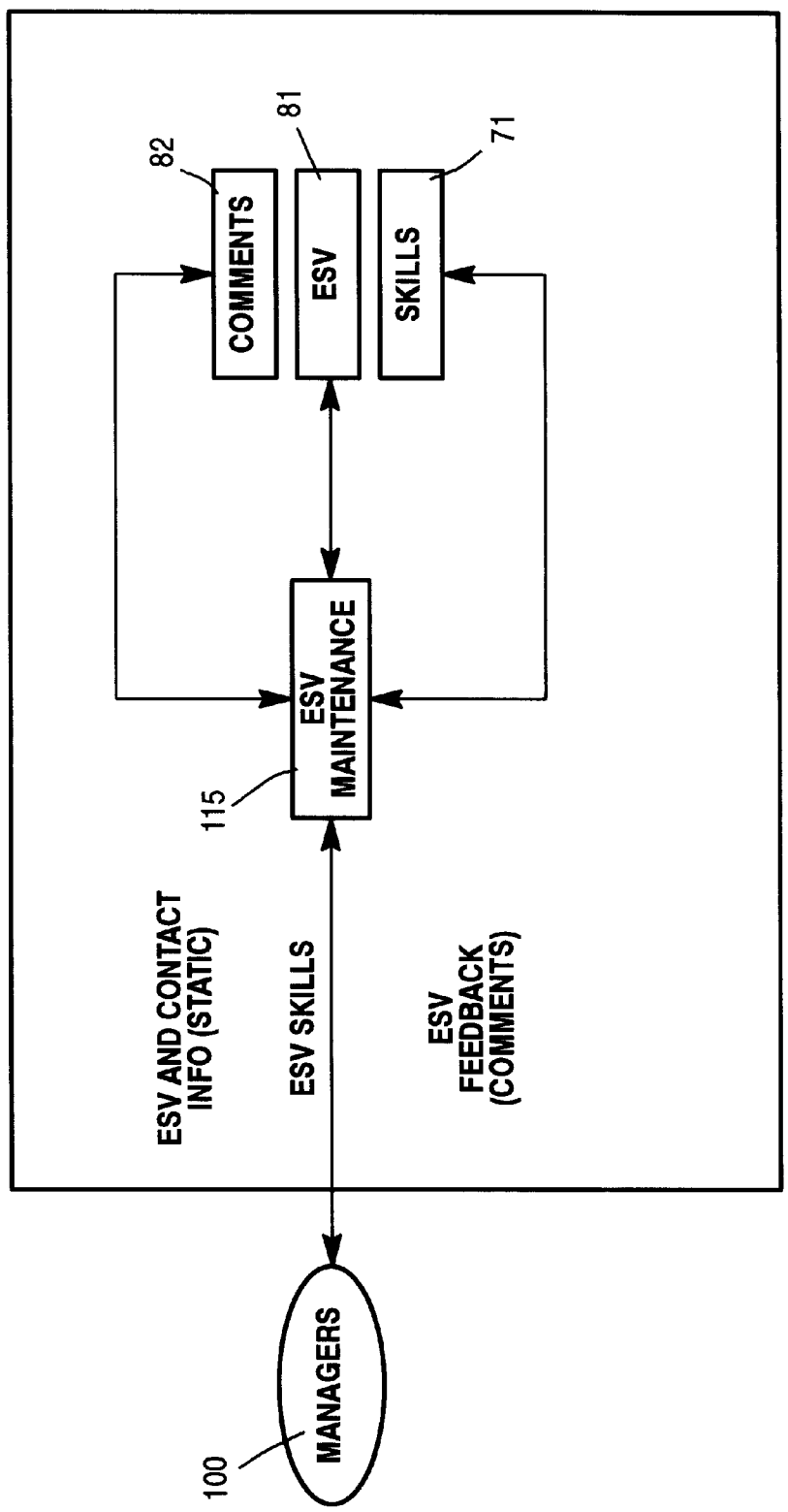

FIG. 5 is a dataflow diagram illustrating the ESV Tracking functions of the RMS system of the present invention.

Figure 6:
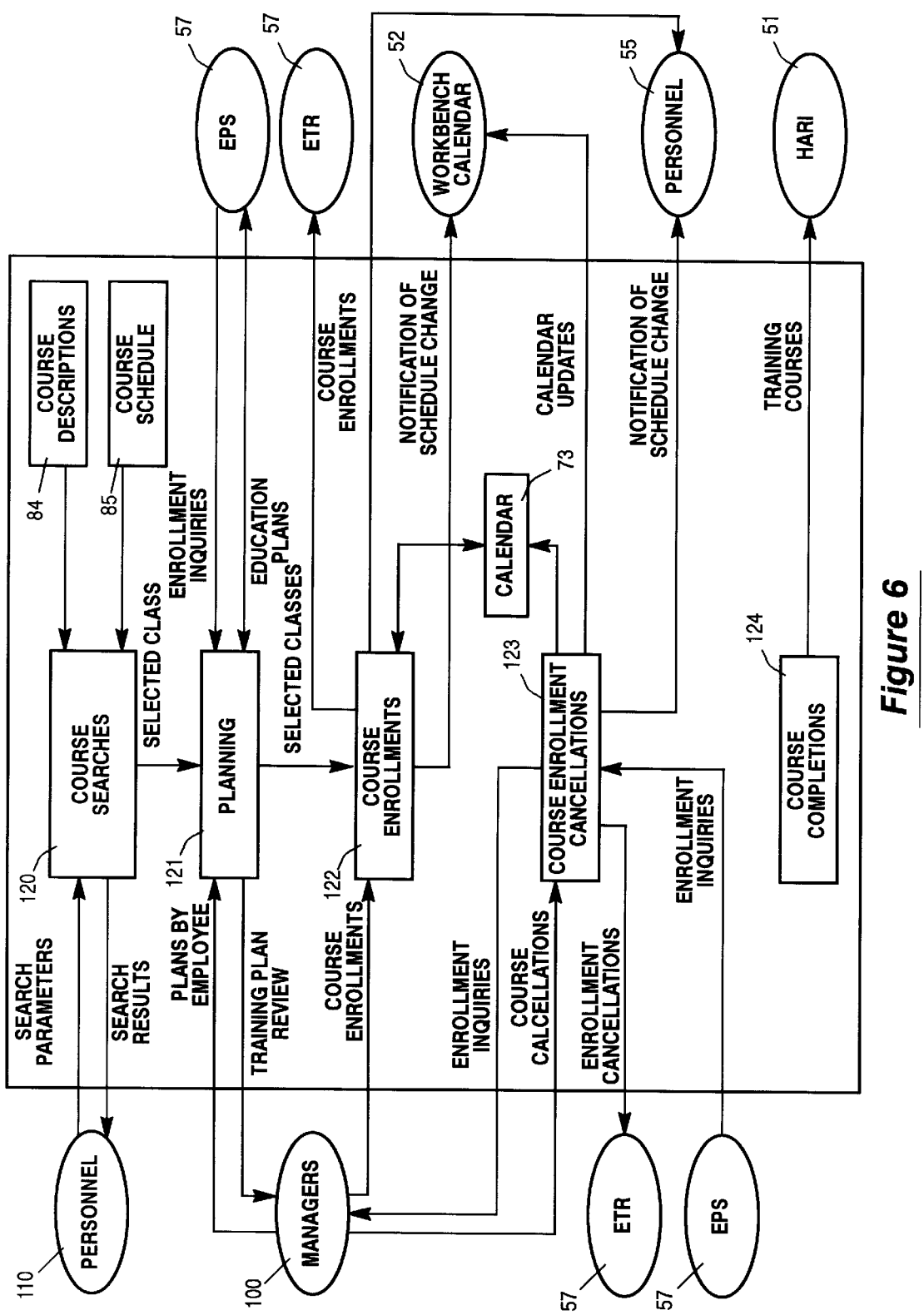

FIG. 6 is a dataflow diagram illustrating the Training Interface functions of the RMS system of the present invention.

Figure 7:
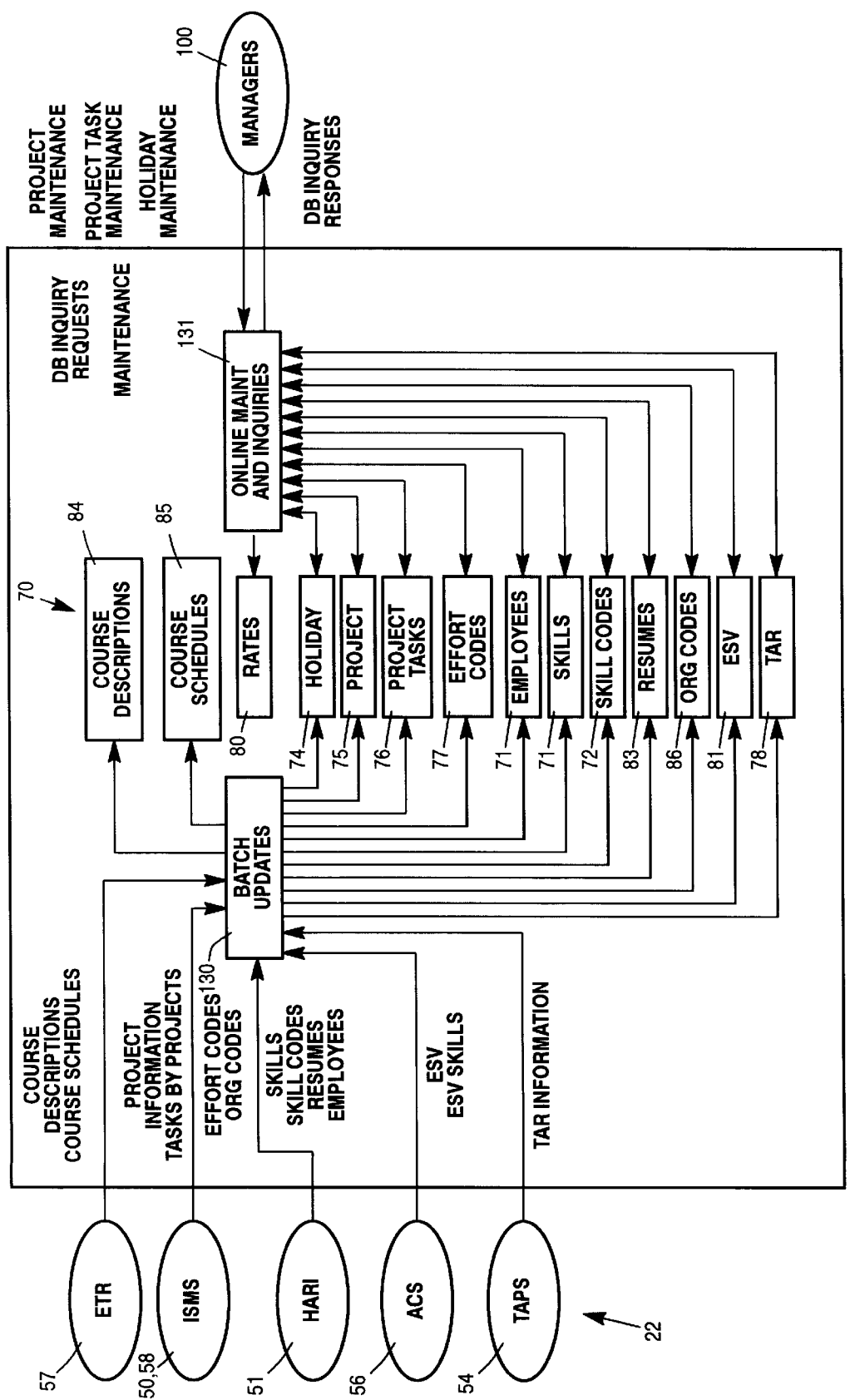

FIG. 7 is a dataflow diagram illustrating the Database Maintenance And Inquiry functions of the RMS system of the present invention.

Figure 8:
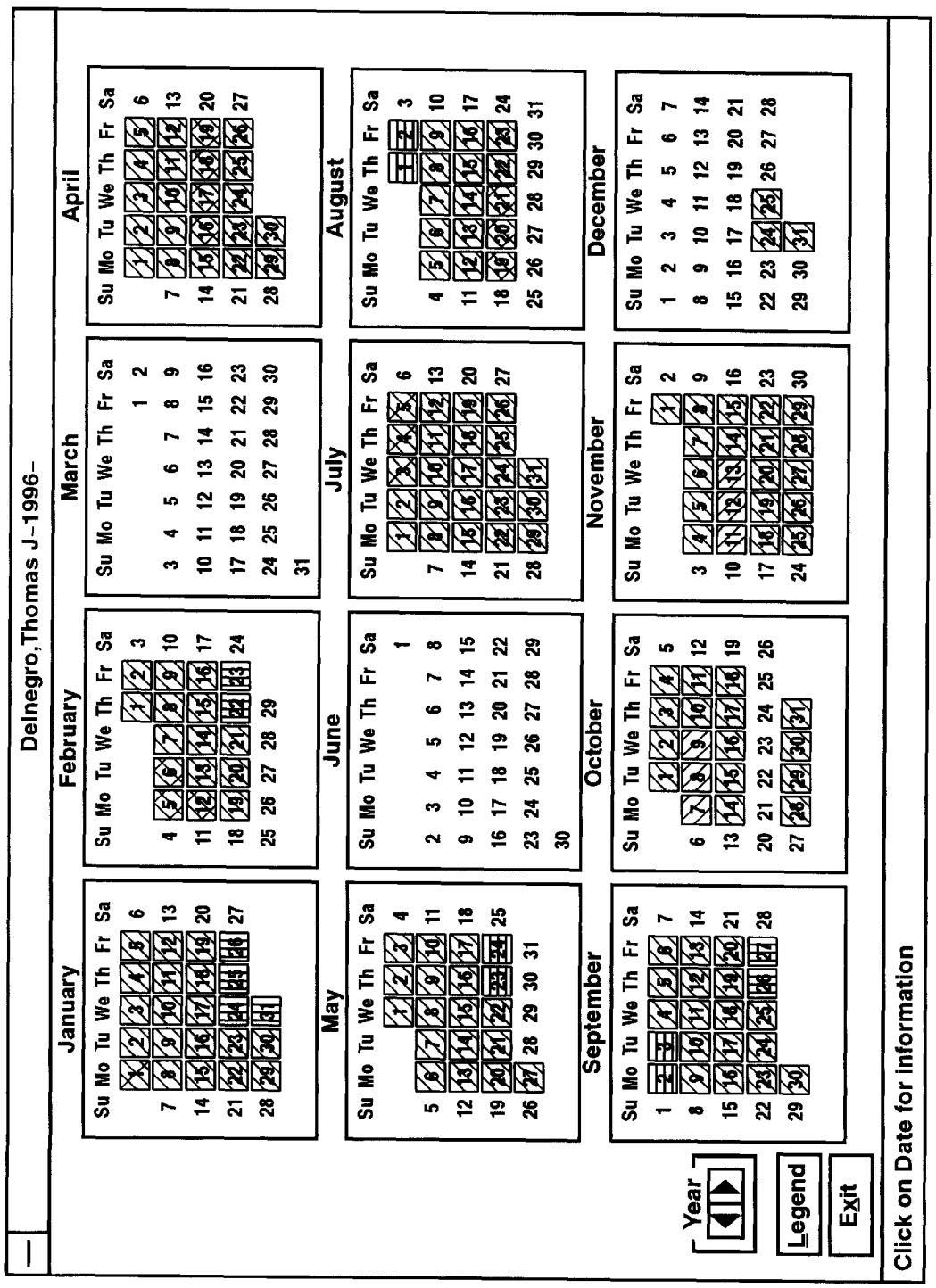

FIG. 8 is an illustration of a Yearly Calendar screen showing scheduled days of a human resource with scheduled activities differently highlighted.

Figure 9:
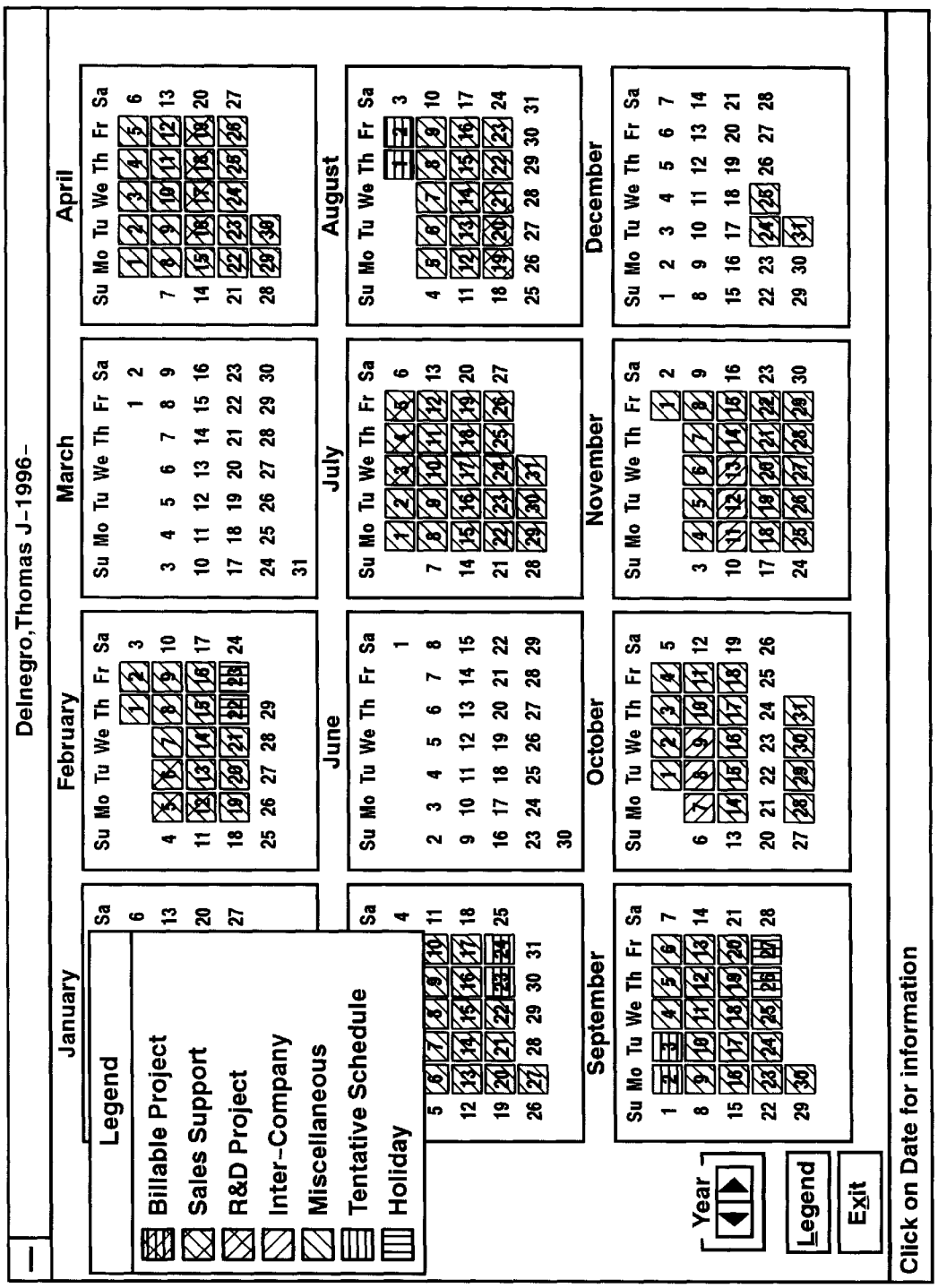

FIG. 9 is an illustration of the screen of FIG. 8 overlaid with the Legend pop-up window explaining the scheduled activity highlighting.

Figure 10:
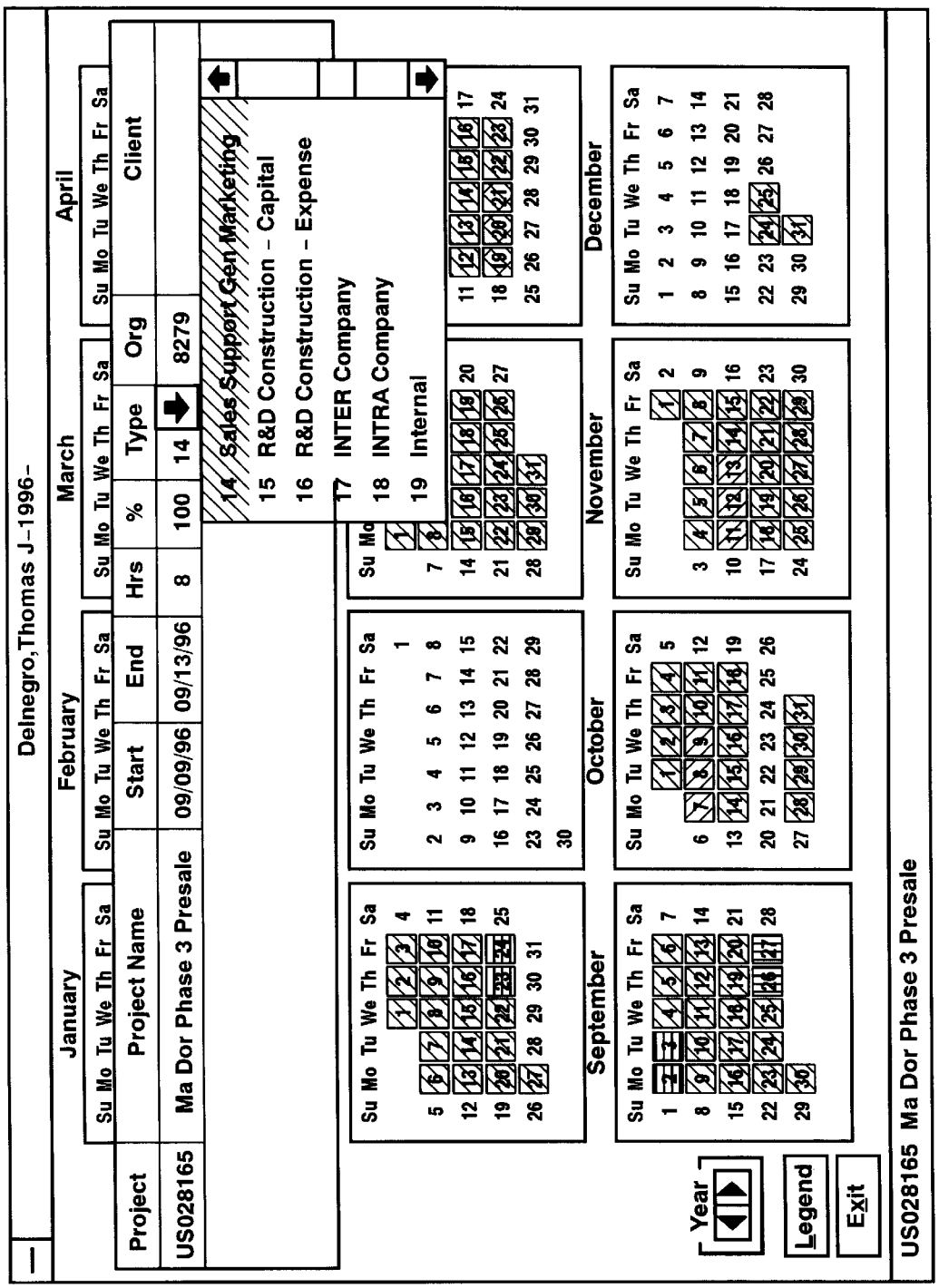

FIG. 10 is an illustration of the screen of FIG. 8 overlaid with a pop-up window identifying the projects and dates that have been assigned on a day or days designated by the user. FIG. 10 also illustrates a drop-down window with a project type list.

Figure 11:
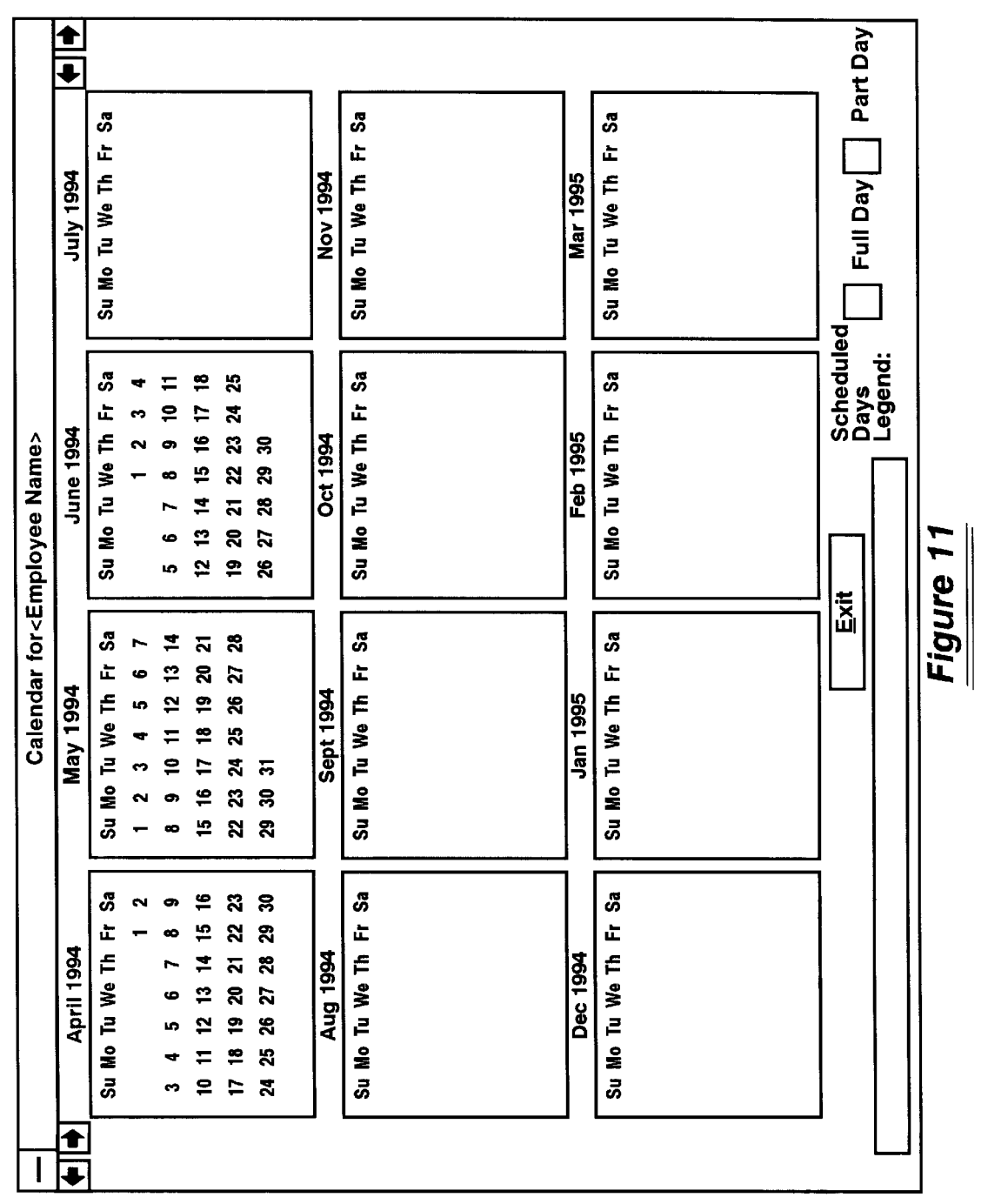

FIG. 11 is an illustration of an alternative Yearly Calendar screen providing a high-level view of the schedule of a human resource for up to twelve months from the current month.

FIG. 12 is an illustration of the Monthly Calendar screen providing an overview of the calendar for a month of a human resource.

Figure 13:
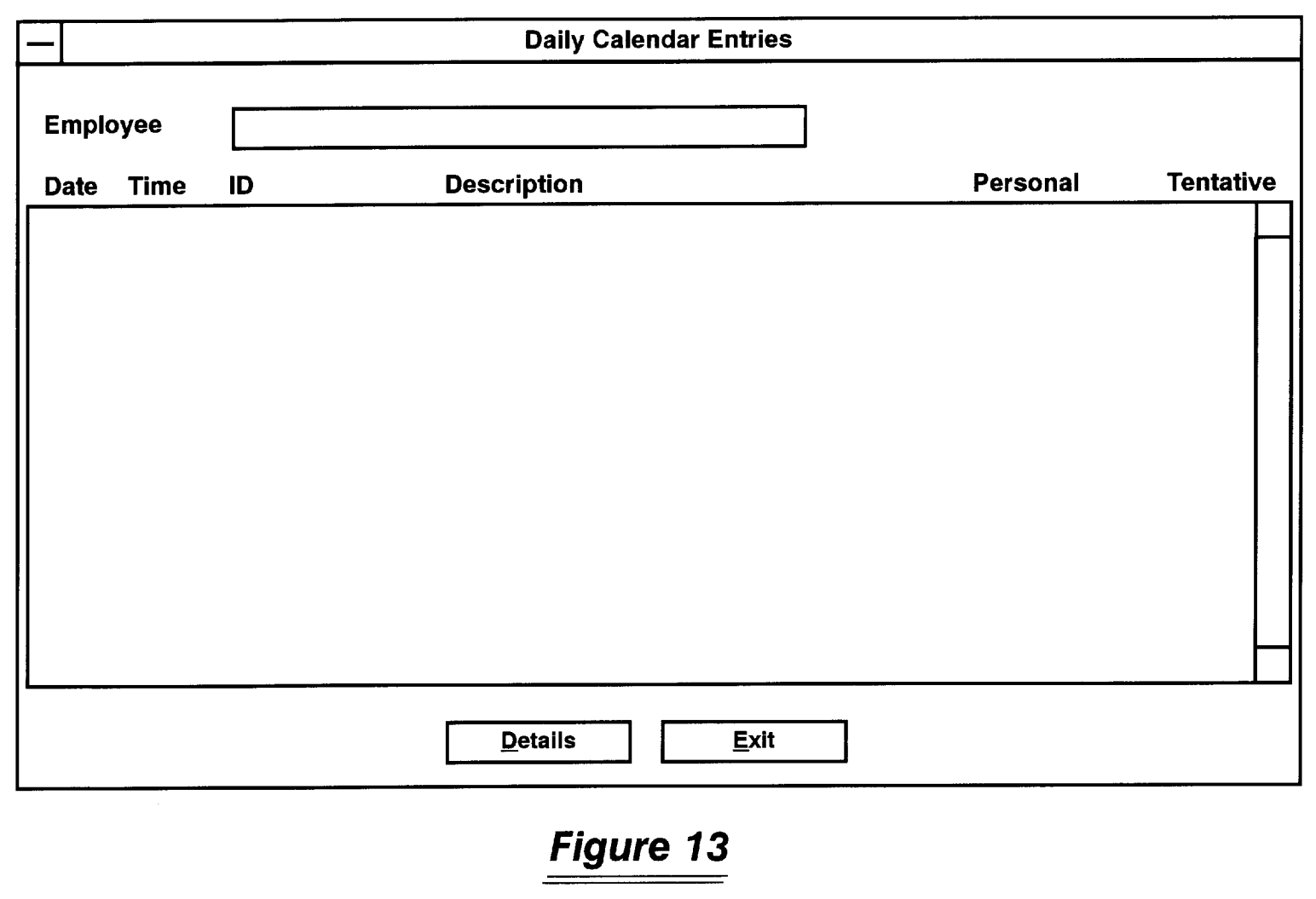

FIG. 13 is an illustration of the Daily Calendar screen listing active calendar entries for a selected date.

FIG. 14 is an illustration of the printing format of the daily calendar entries output created when the user requests printing or faxing of the active daily calendar entries.

Figure 15:
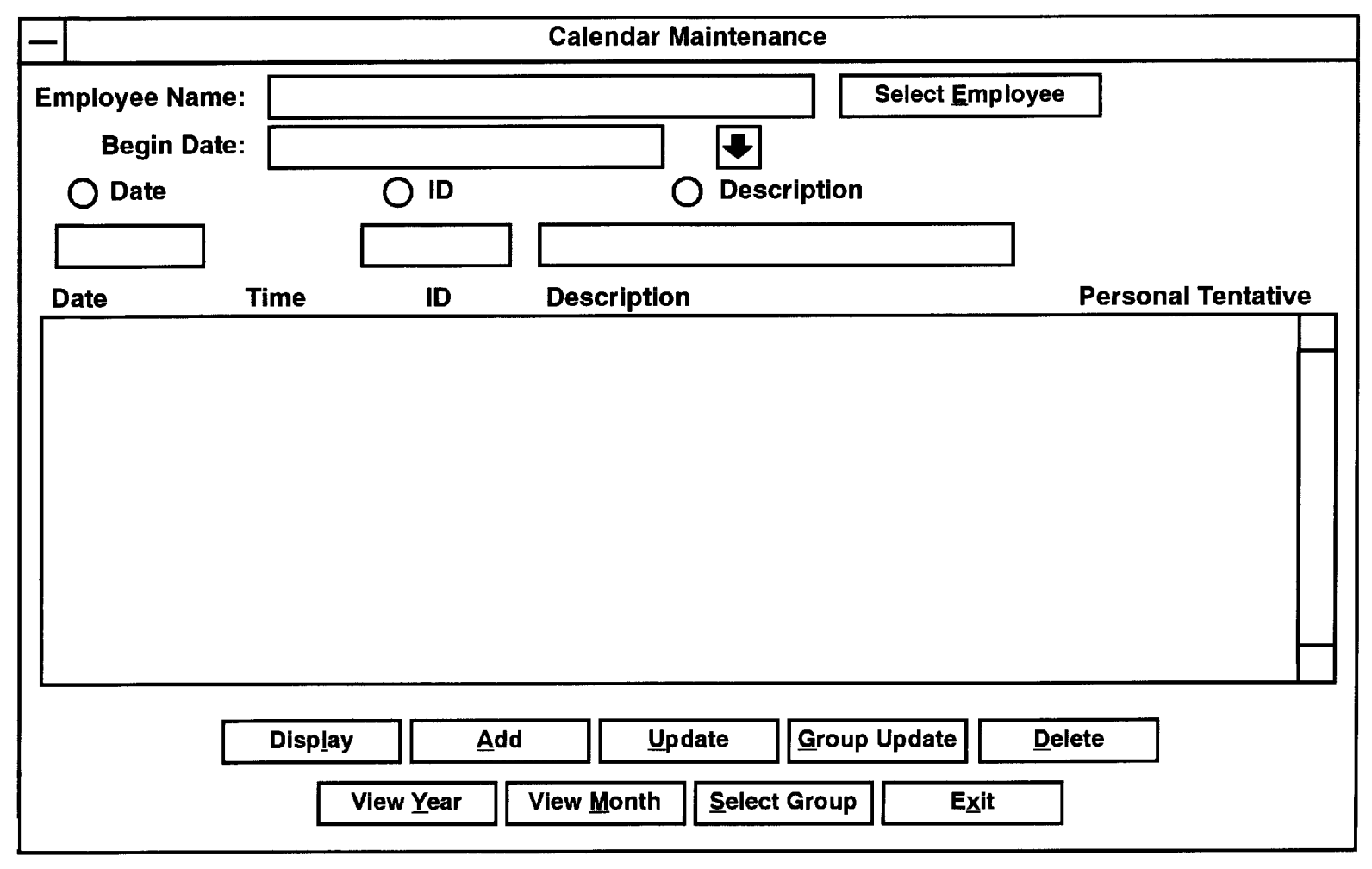

FIG. 15 is an illustration of the Calendar Maintenance screen which is the base point for initiating calendar updates and schedule inquiries.

FIG. 16 is an illustration of the Delete Confirmation screen used to confirm that entries marked for deletion are to be deleted from the calendar.

FIG. 17 is an illustration of the Add Calendar Entry screen used to make entries into the schedule of a human resource.

FIG. 18 is an illustration of the Update Calendar Entry screen used to review details of existing calendar entries and make changes to those entries, one entry at a time.

FIG. 19 is an illustration of the Group Calendar Update screen used to quickly update a group of calendar entries at one time.

FIG. 20 is an illustration of the Group Selection screen used to select a group of calendar entries to be updated or deleted based upon key selection criteria.

Figure 21:
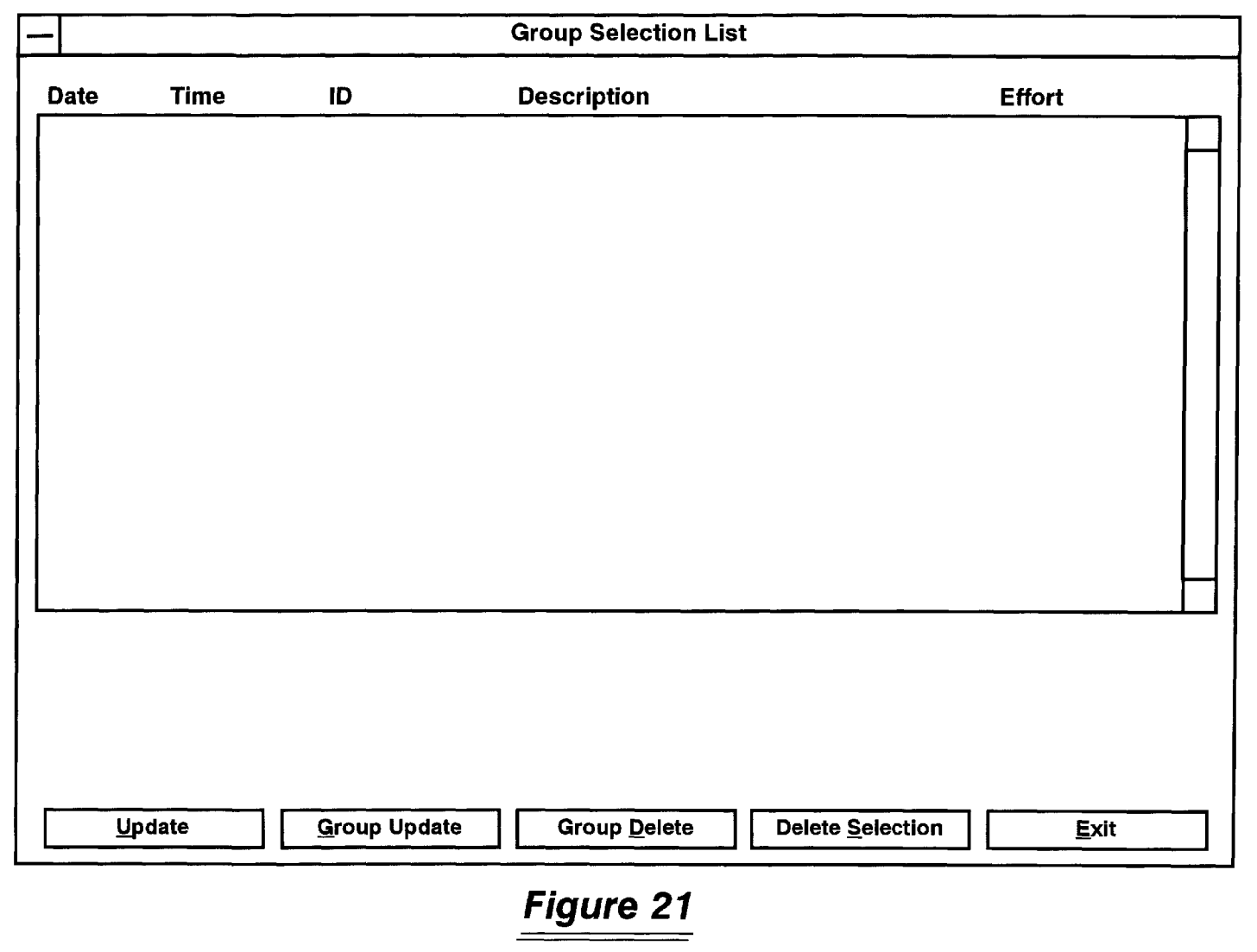

FIG. 21 is an illustration of the Group Selection List screen used to view the list of calendar entries that meet the search criteria prior to updating or deleting those entries.

FIG. 22 is an illustration of the MAF Selection screen. This screen is displayed whenever the Select MAF button is selected on any of the screens on which a MAF number is needed and is not known.

Figure 23:
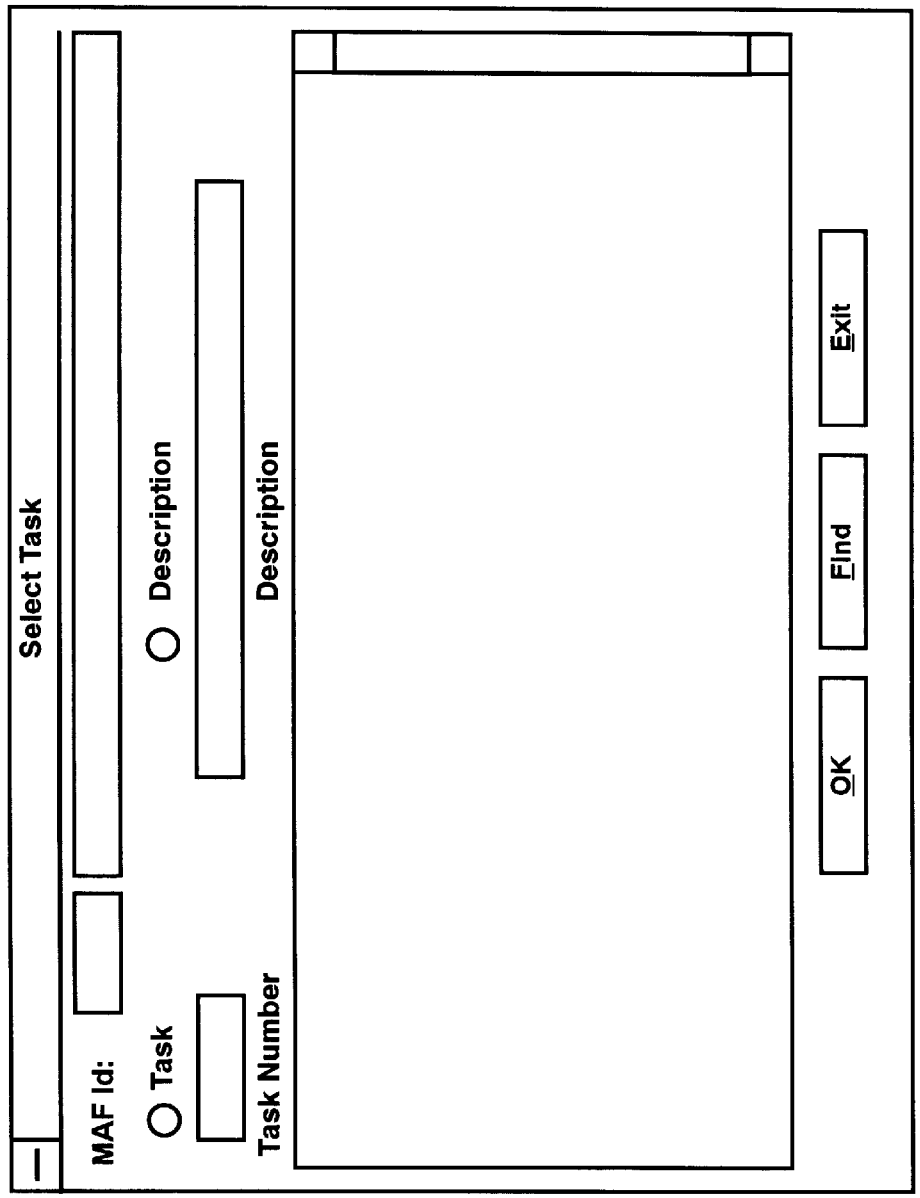

FIG. 23 is an illustration of the Task Selection screen. This screen is displayed whenever the Select Task button is selected on any of the screens on which a task number is needed and is not known.

FIG. 24 is an illustration of the TAR Selection screen. This screen is displayed whenever the Select TAR button is selected on any of the screens on which a TAR number is needed and is not known.

FIG. 25 is an illustration of the Course Selection screen. This screen is displayed whenever the Select Course button is selected on any of the screens on which a course number is needed and is not known.

Figure 26:
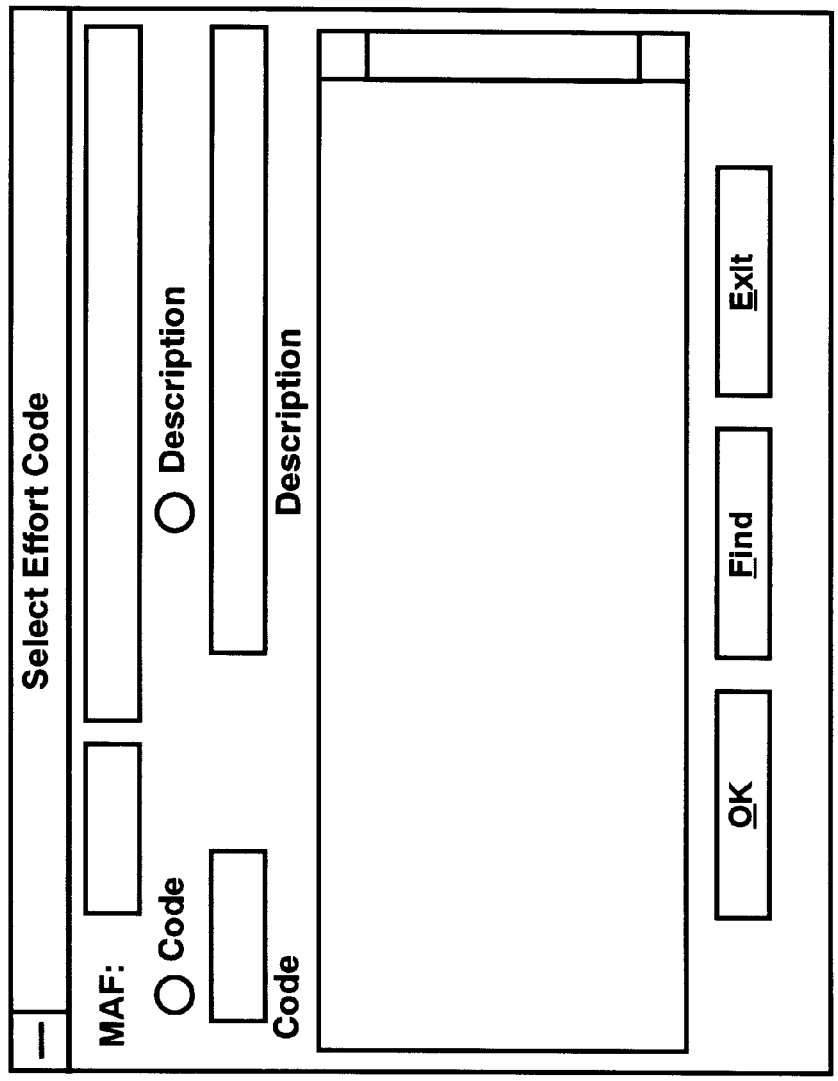

FIG. 26 is an illustration of the Effort Code Selection screen. This screen is displayed whenever the Select Effort Code button is selected on any of the screens on which an effort code is needed and is not known.

Figure 27:
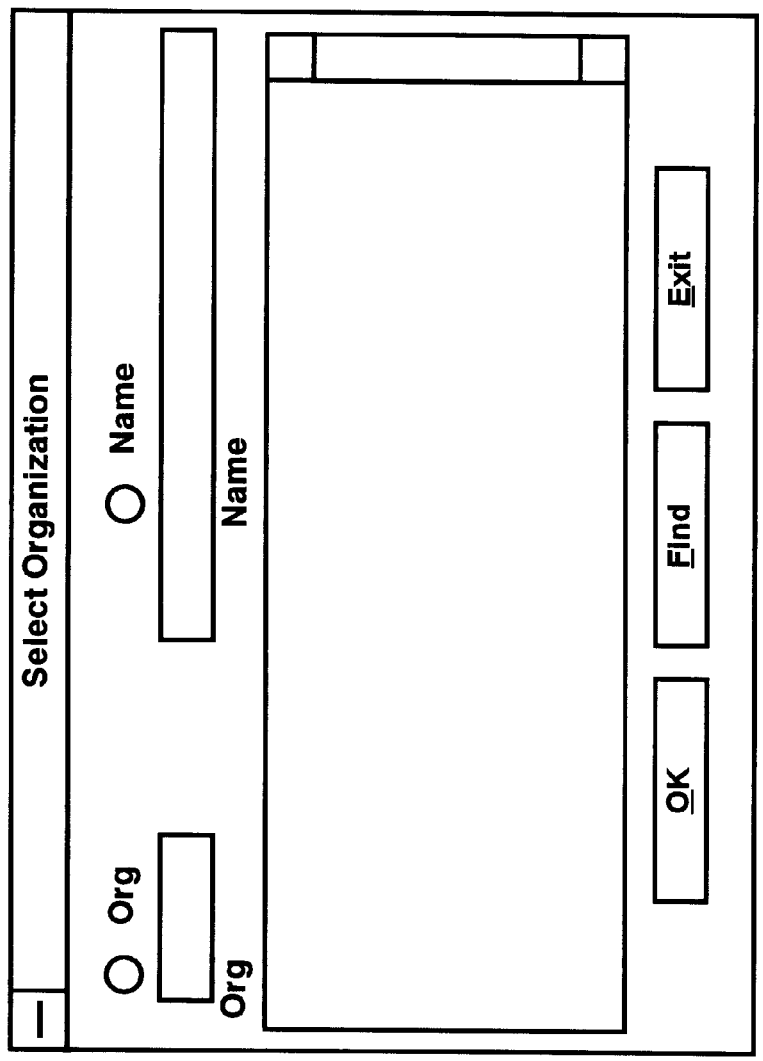

FIG. 27 is an illustration of the Organization Code Selection screen. This screen is displayed whenever the Select Org button is selected on any of the screens on which an organization code is needed and is not known.

Figure 28:
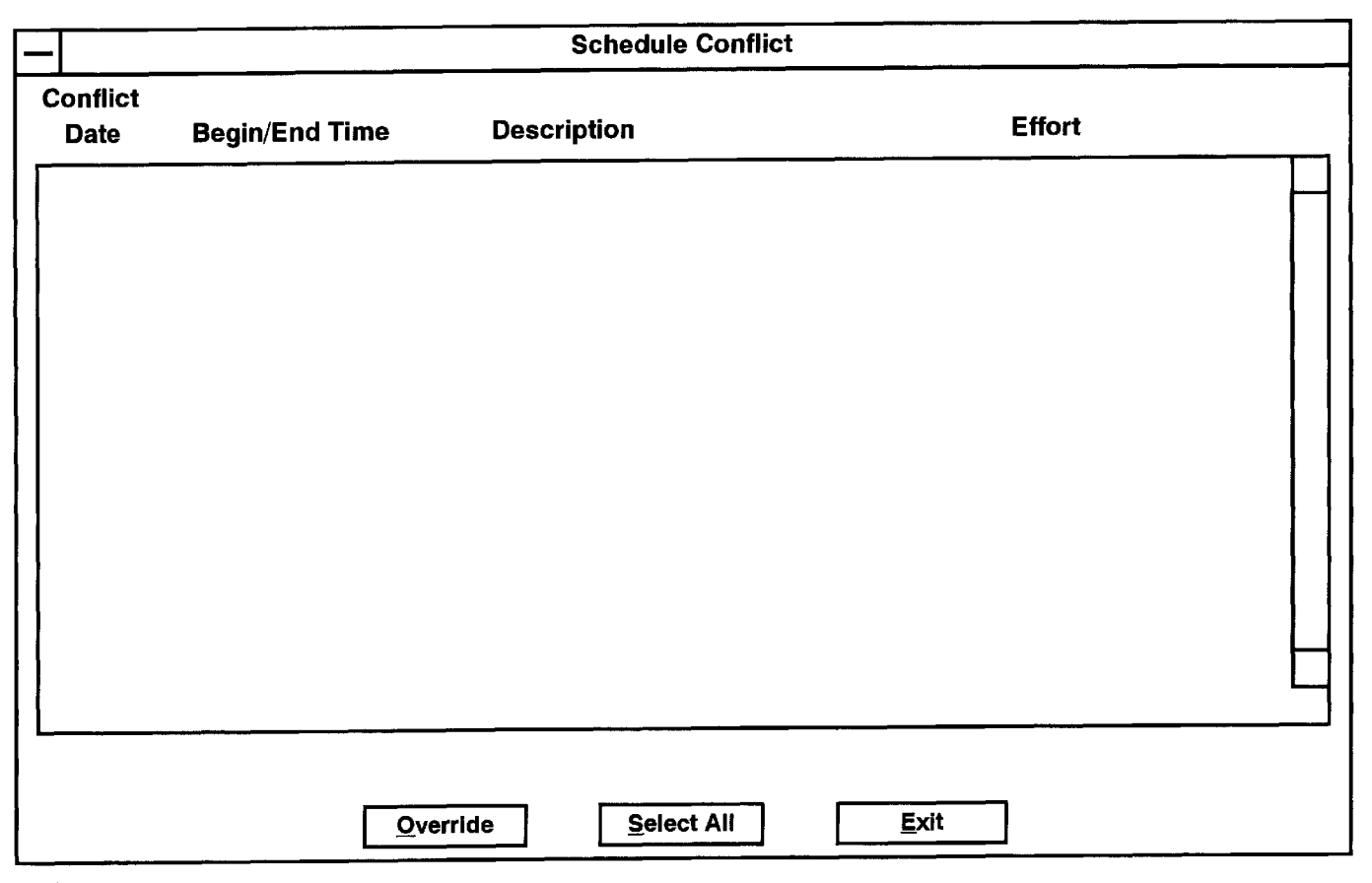

FIG. 28 is an illustration of the Schedule Conflict screen displayed whenever an attempt is made to update the calendar with an entry that conflicts with or overlaps with an existing active entry.

FIG. 29 is an illustration of a different format for the Schedule Conflict screen of FIG. 28.

FIG. 30 is an illustration of the Notification of Schedule Change screen utilized to send a notification to the employee and the manager thereof that a change has been made.

Figure 31:
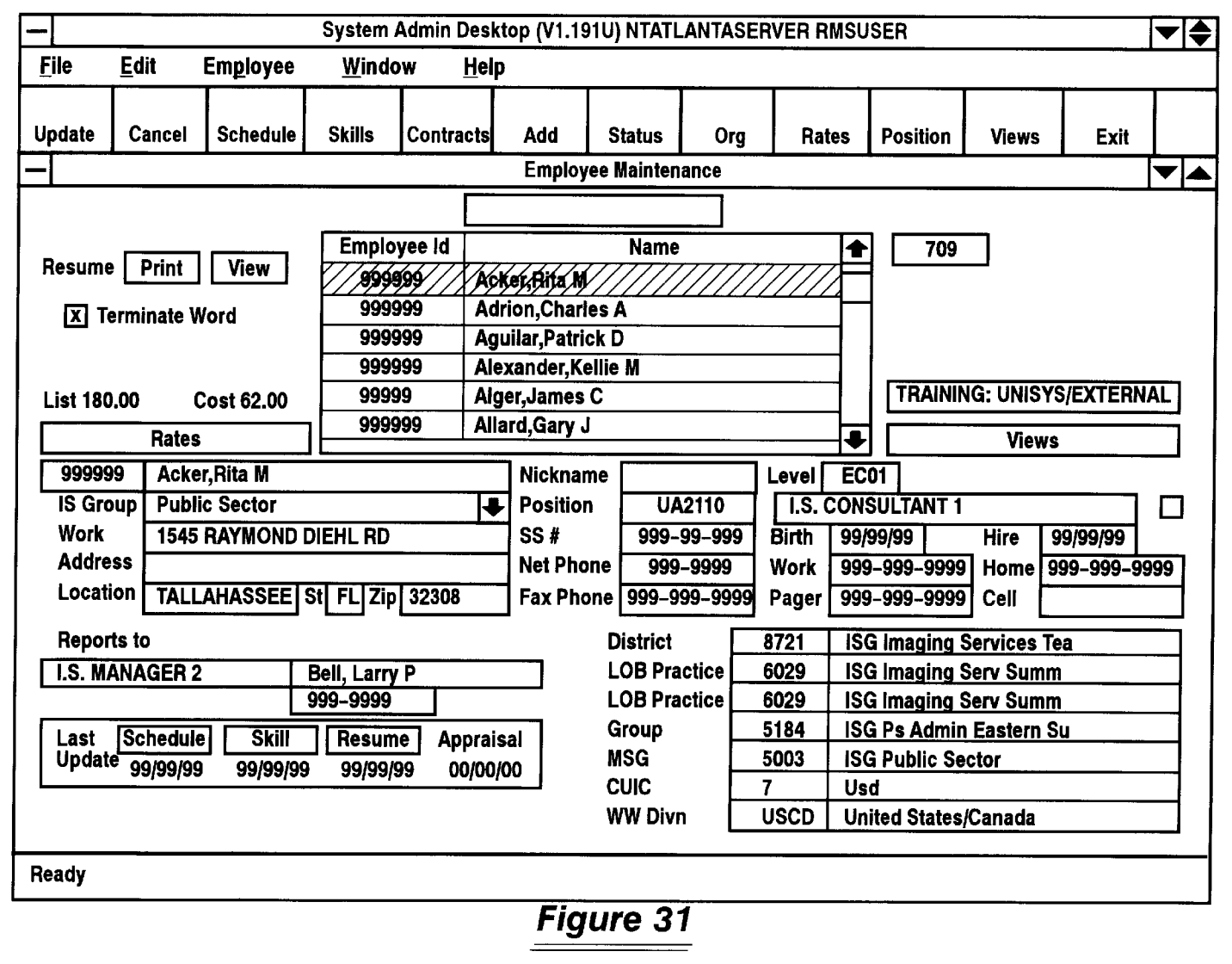

FIG. 31 is an illustration of the Employee Maintenance screen utilized for adding and updating the employee records in the RMS database.

Figure 32:
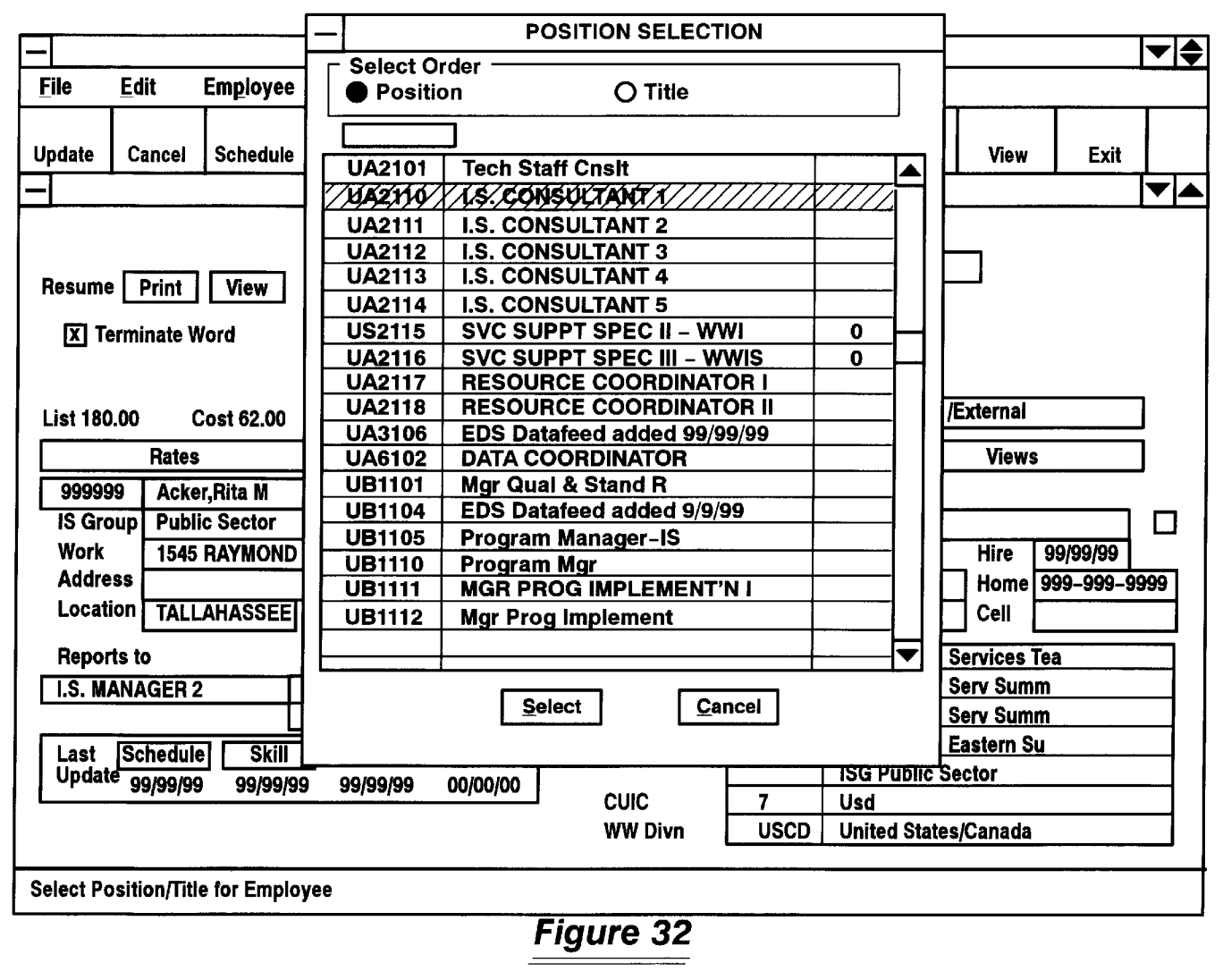

FIG. 32 is an illustration of the Employee Maintenance screen of FIG. 31 overlaid with the Position Selection pop-up window utilized to provide position code information to the user.

FIG. 33 is an illustration of the Employee Maintenance screen of FIG. 31 overlaid with the Select Organization pop-up window utilized to provide organization information to the user.

Figure 34:
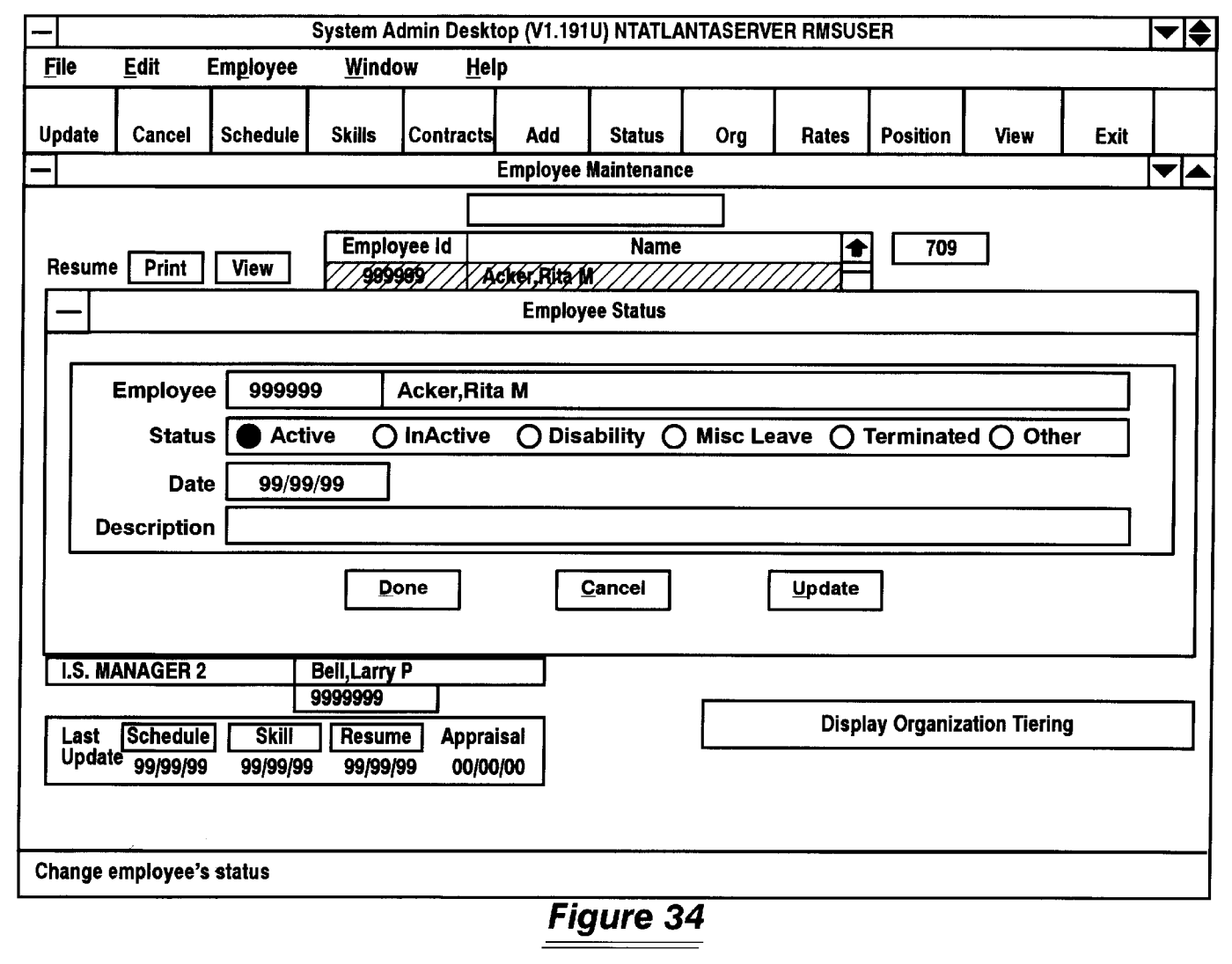

FIG. 34 is an illustration of the Employee Maintenance screen of FIG. 31 overlaid with the Employee Status pop-up window. Employee status is selected on this window for updating the RMS database.

Figure 35:
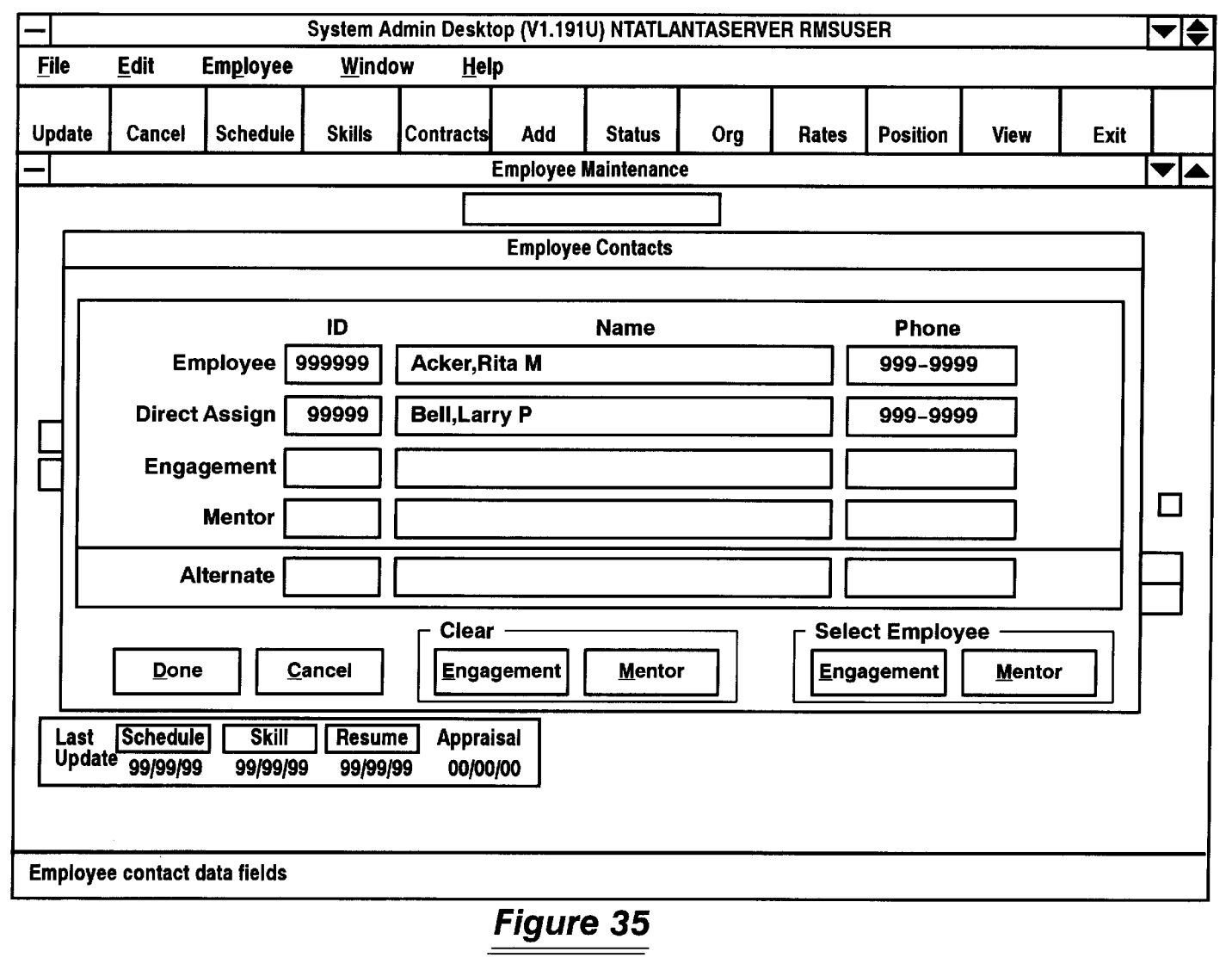

FIG. 35 is an illustration of the Employee Maintenance screen of FIG. 31 overlaid with the Employee Contacts pop-up window utilized to view and modify contacts such as the Direct Assign of the employee.

Figure 36:
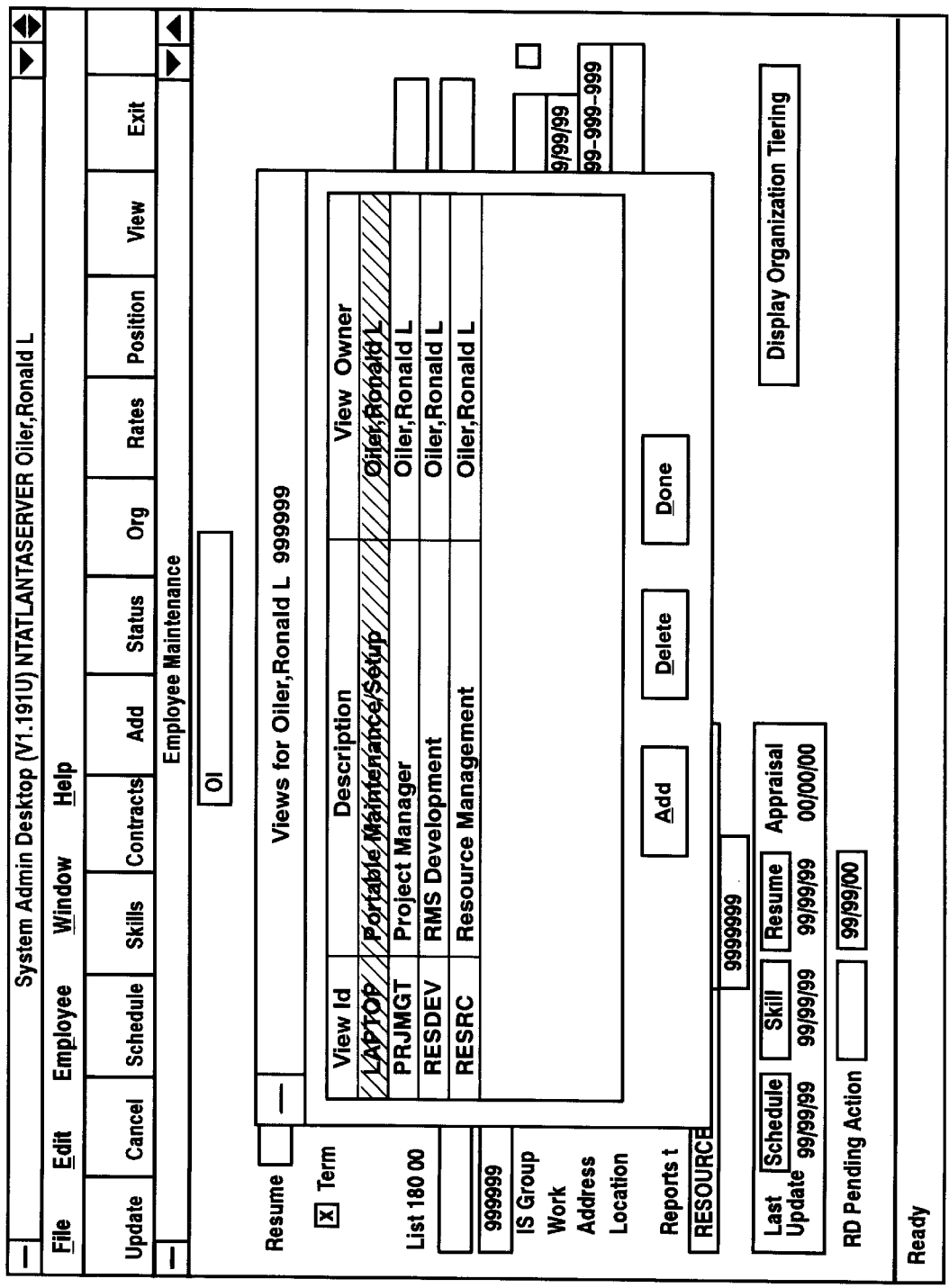

FIG. 36 is an illustration of the Employee Maintenance screen of FIG. 31 overlaid with the Employee Views pop-up window providing virtual organization information for an employee which can be browsed and modified.

Figure 37:
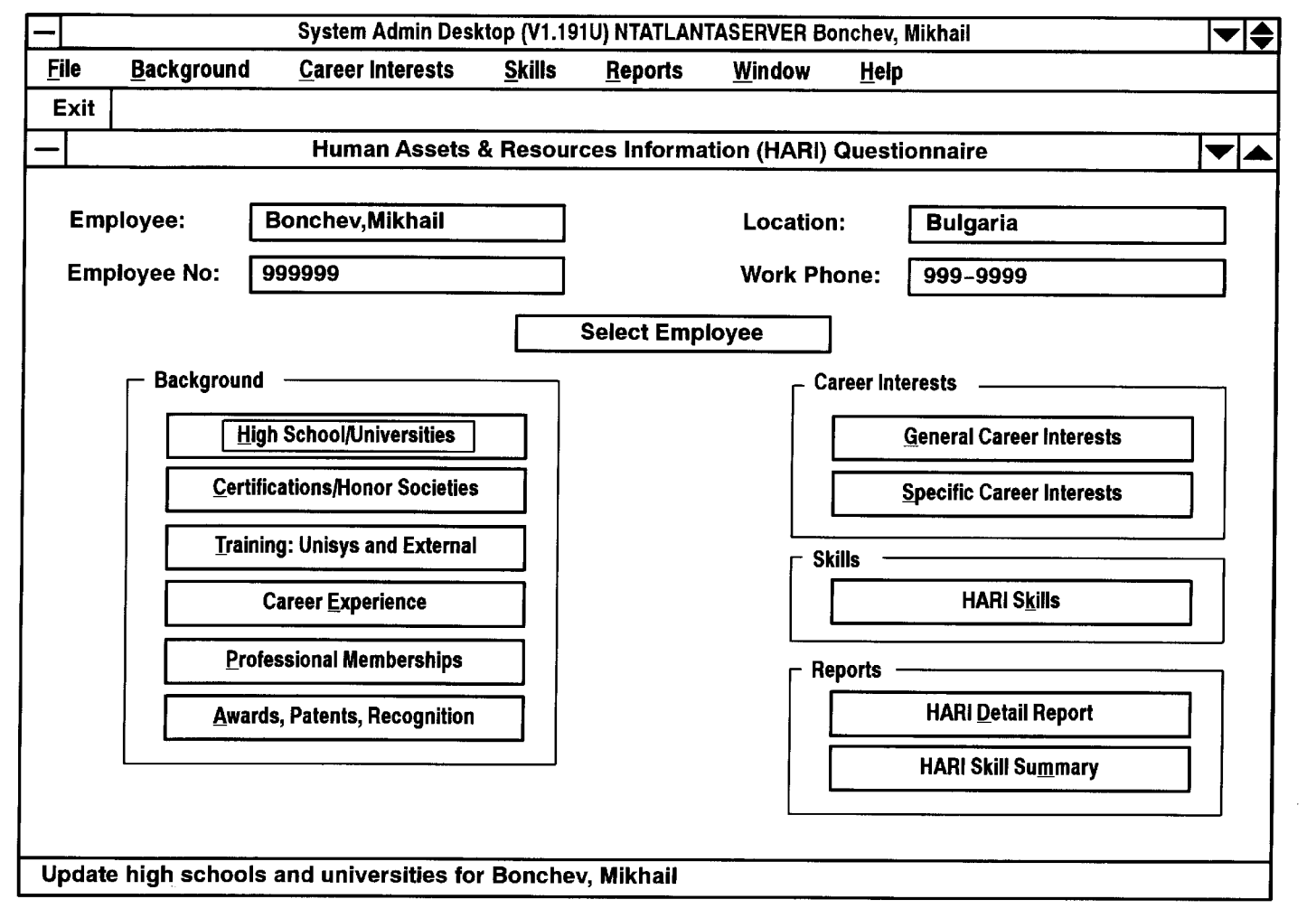

FIG. 37 is an illustration of the Employee Skills screen captioned Human Assets & Resources Information [HARI] Questionnaire. The HARI Questionnaire screen is used to view, add and delete skills information in the RMS database for a particular employee.

FIG. 38 is an illustration of the HARI Skills Data Entry screen which is the portion of the HARI Questionnaire relating to skills.

FIG. 39 is an illustration of the HARI Skill Summary report screen providing a HARI Skill Proficiency Summary of the selected employee.

FIG. 40 is an illustration of the Organization Maintenance screen used to update and add to the organizational information in the RMS database.

Figure 41:
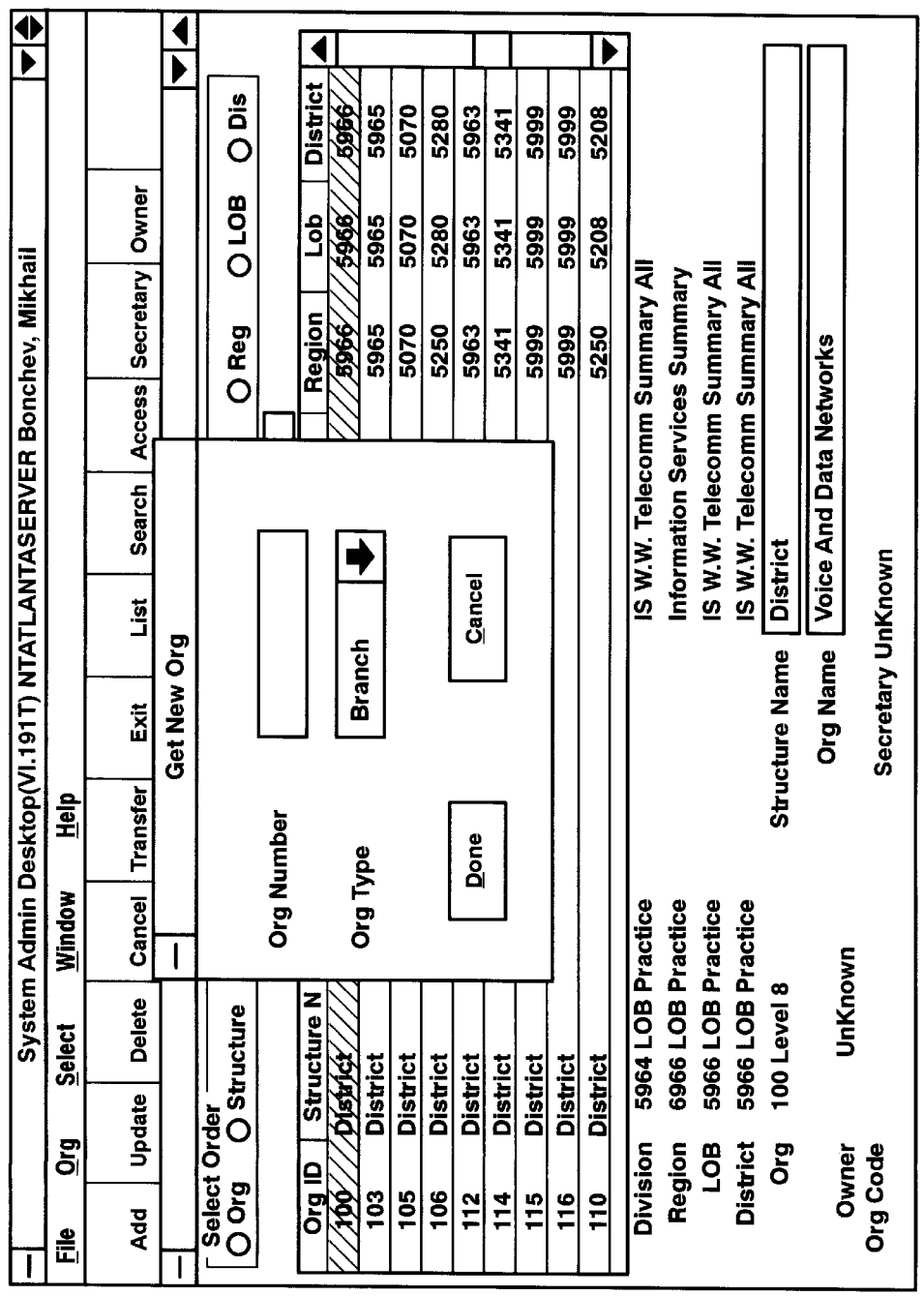

FIG. 41 is an illustration of the Organization Maintenance screen of FIG. 40 overlaid with the G;et New Organization dialogue pop-up box utilized when adding an organization to the database.

Figure 42:
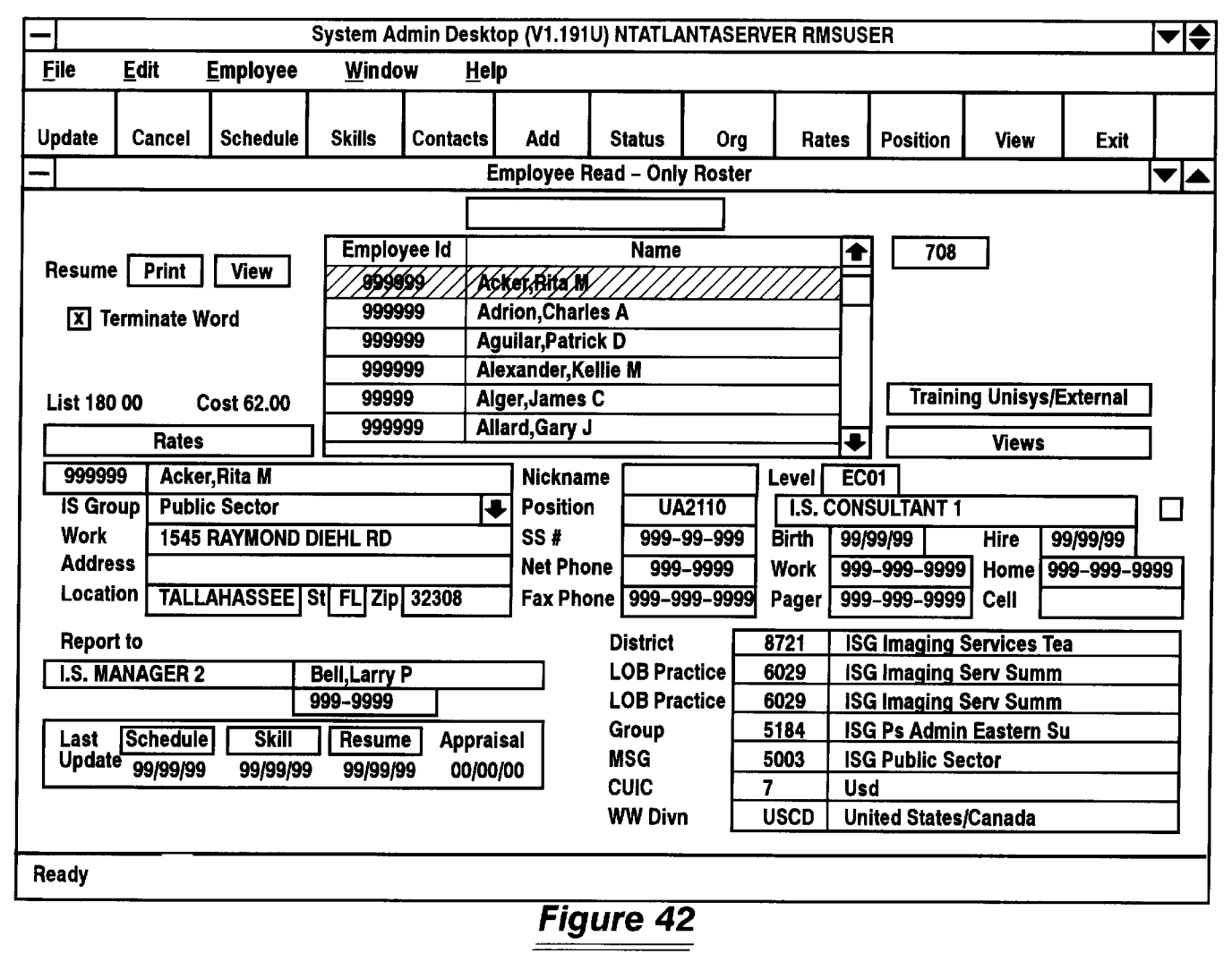

FIG. 42 is an illustration of the Employee Read-Only Roster screen utilized to browse employee detail information. Except for the caption "Employee Read-Only Roster", this screen is the same as the Employee Maintenance screen of FIG. 31.

FIG. 43 is an illustration of the Employee Skills screen categorically listing skills of a selected employee for read-only browsing.

FIG. 44 is an illustration of the Employee Roster screen used in the read-only browsing of employee detail information.

Figure 45:
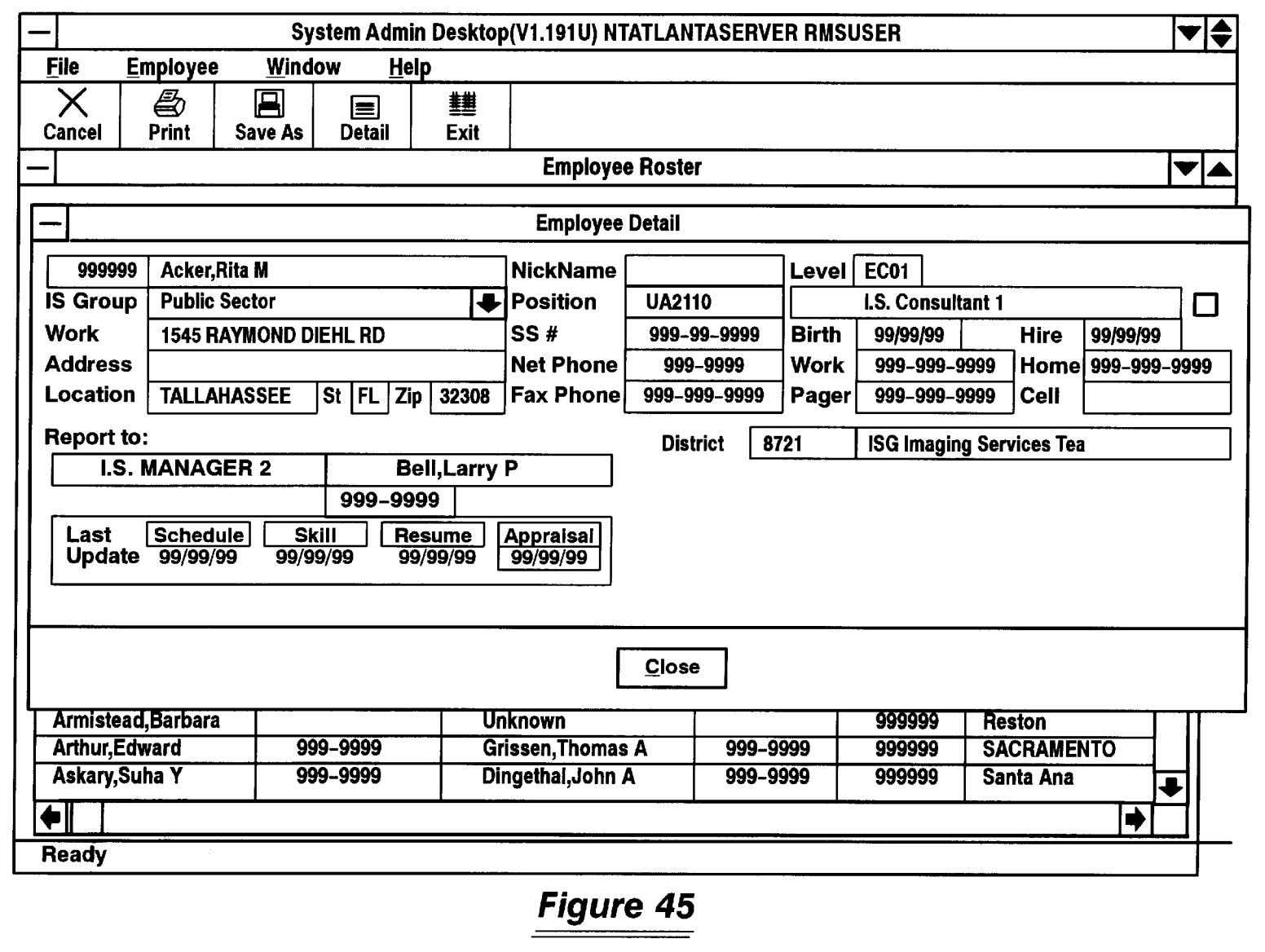

FIG. 45 is an illustration of the Employee Roster screen of FIG. 44 overlaid with an Employee Detail pop-up window for obtaining details for a specific employee from the roster list.

FIG. 46 is an illustration of a Resume screen providing the resume of a selected employee. The Resume screen is invoked through an employee information search function.

Figure 47:
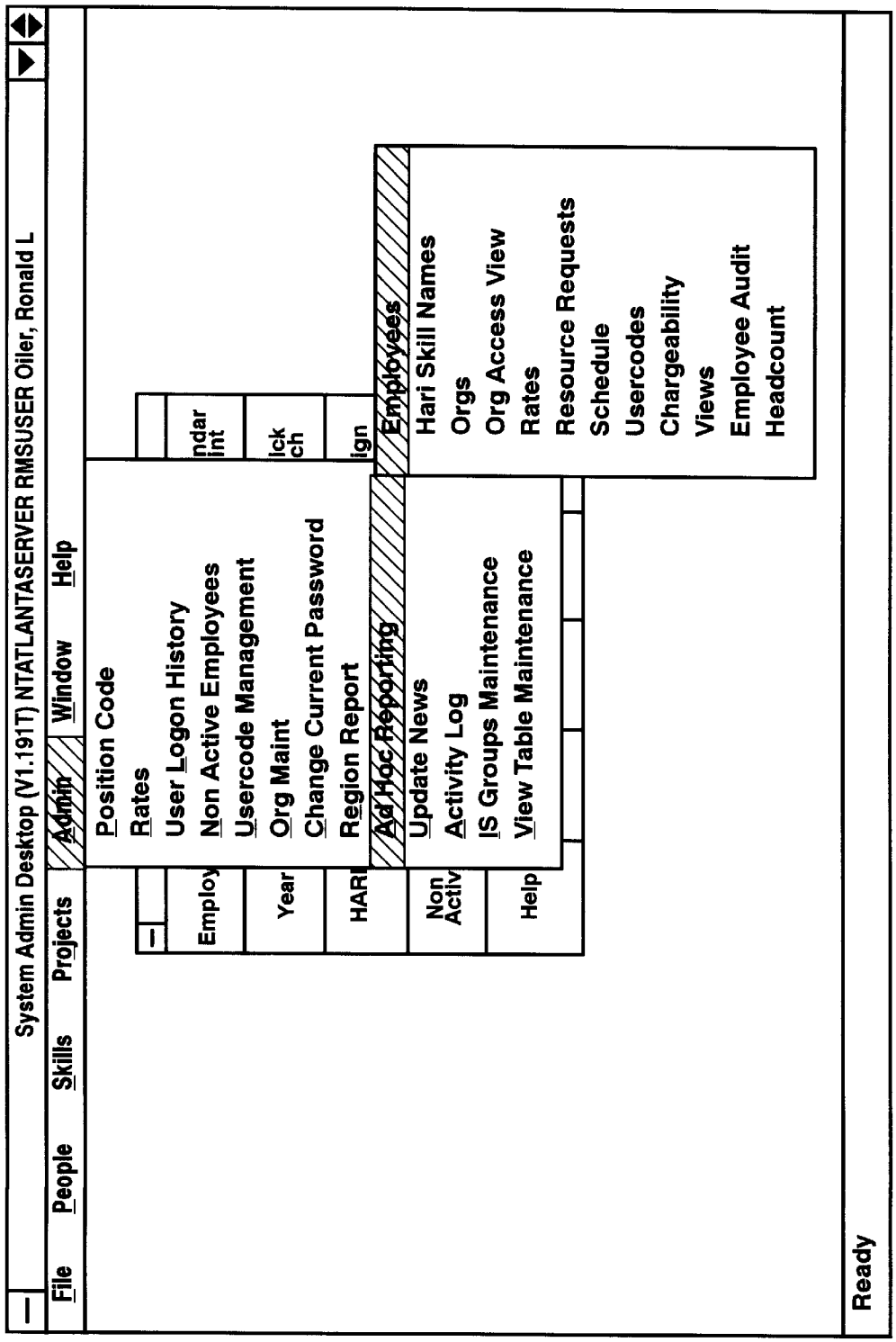

FIG. 47 is an illustration of a screen displaying a drop-down, cascading menu of an item on the menu bar of a Main Menu screen. The menu items provide a different view of the RMS database.

Figure 48:
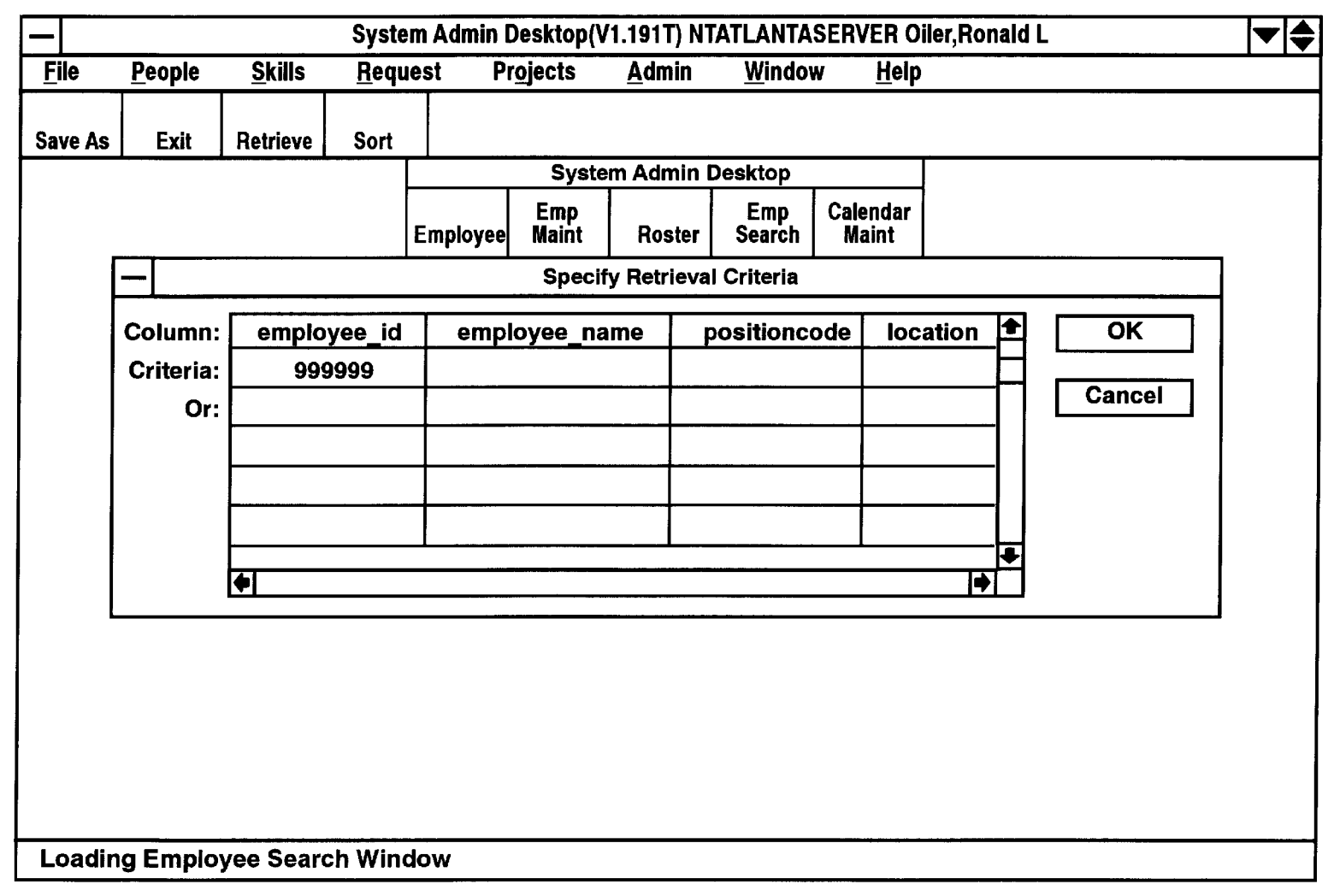

FIG. 48 is an illustration of the Specify Retrieval Criteria window displayed when selecting "Employees" from the cascading menu of FIG. 47. The user specifies employee information retrieval criteria on this window.

FIG. 49 is an illustration of the Employee Search screen displaying the information matching the specified retrieval criteria of FIG. 48.

Figure 50:
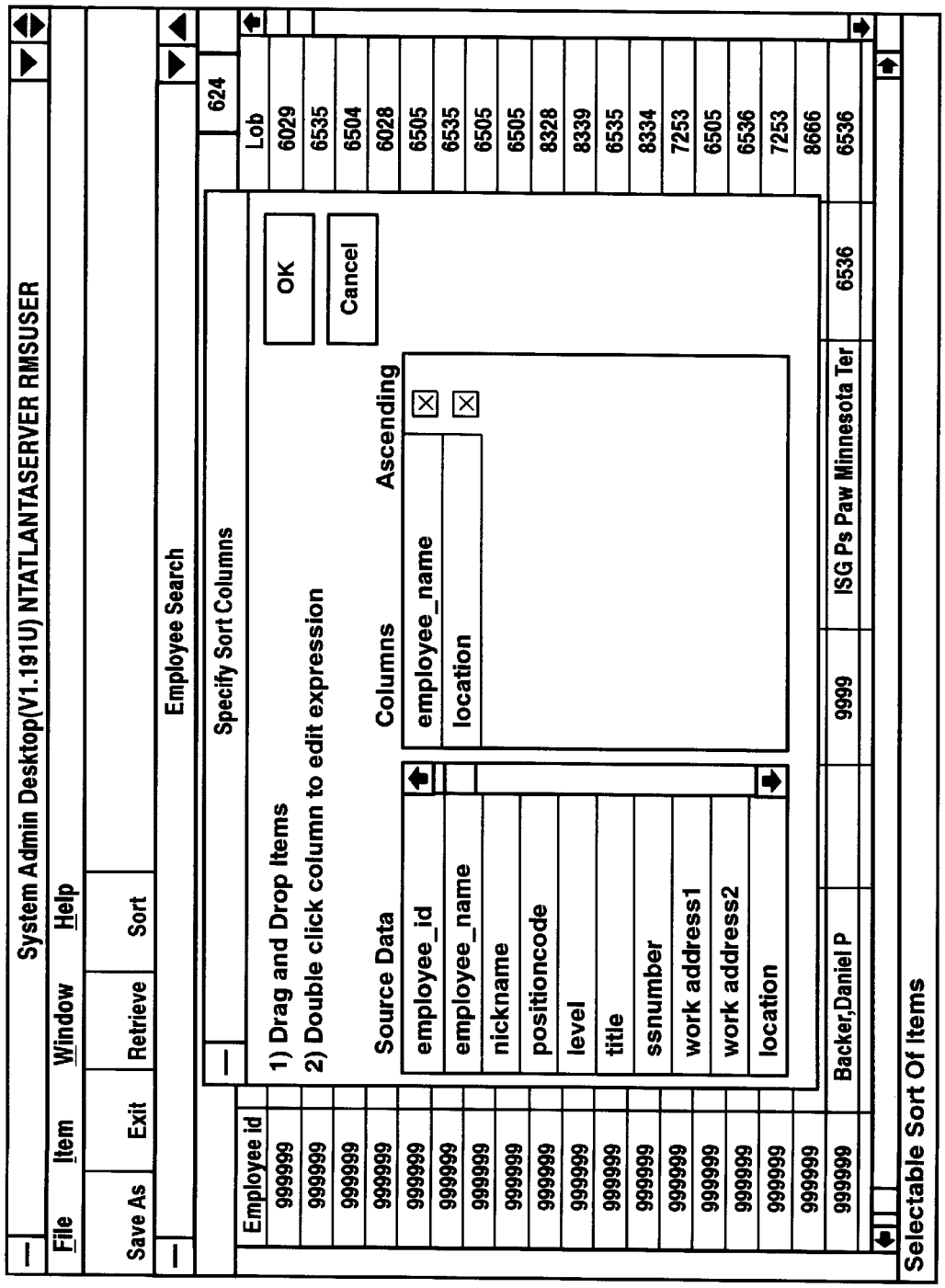

FIG. 50 is an illustration of the Employee Search screen of FIG. 49 overlaid with the Specify Sort Columns pop-up window. The Specify Sort Columns window assists the user in formatting the information on the Employee Search screen of FIG. 49.

Figure 51:
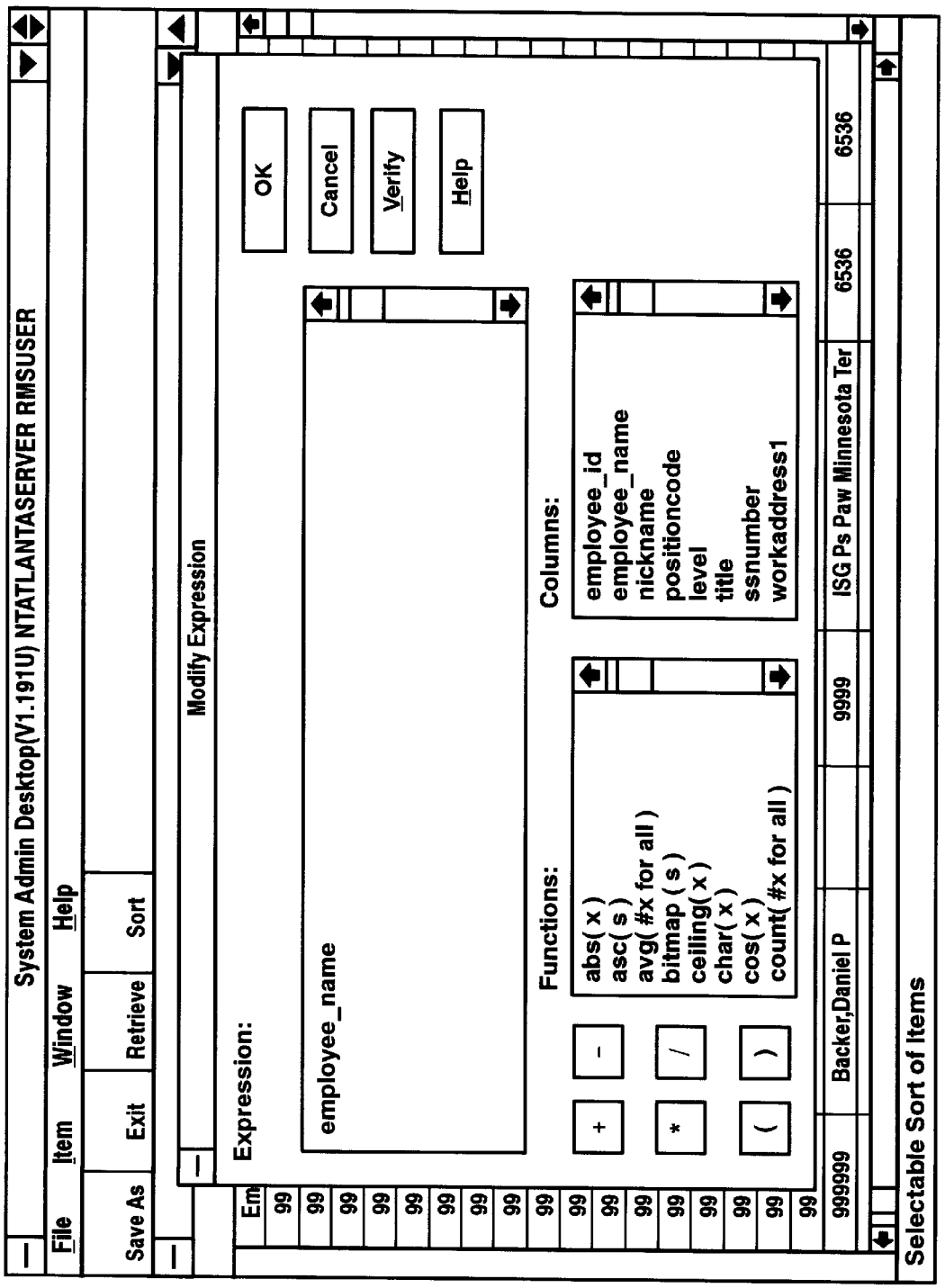

FIG. 51 is an illustration of the Employee Search screen of FIG. 49 overlaid with the Modify Expression pop-up window. The Modify Expression window is utilized to enhance the sort or provide a more specific view of the information retrieved on the Employee Search screen of FIG. 49.

Figure 52:
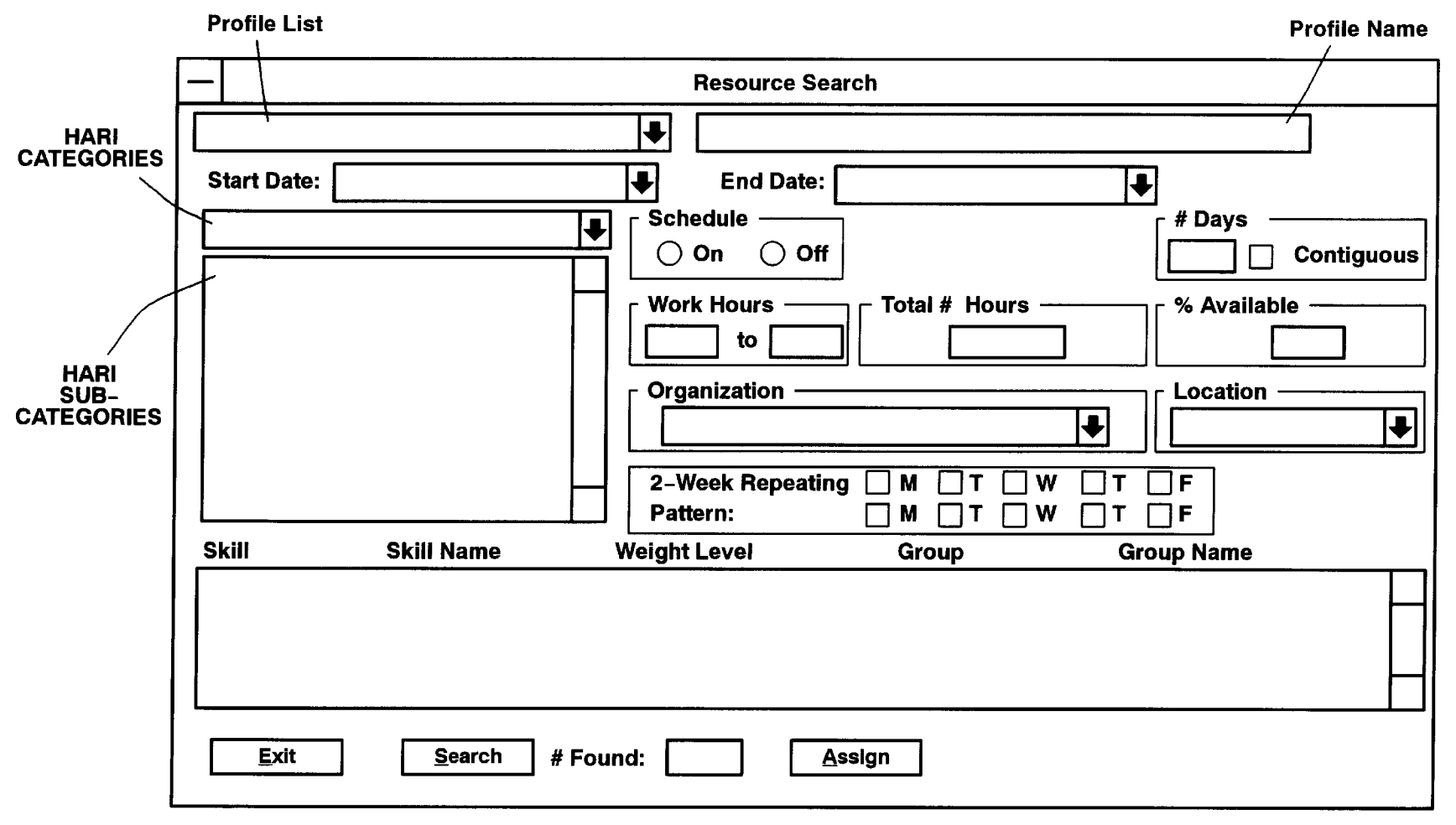

FIG. 52 is an illustration of the Resource Search screen used in the Resource Search functions of the RMS utilizing project requirements and the calendar to identify employees with the necessary skills and availability to fulfill an assignment.

FIG. 53 is an illustration of the Assign Employees screen providing a Search Report listing employees identified from the Resource Search screen of FIG. 52. The Assign Employees screen is utilized to select the project, effort code, and employees to be assigned to the project.

Figure 54:

FIG. 54 is an illustration of the Assign Employees Update screen which assigns the employees to the projects and performs associated updates to the Calendar.

Figure 55:
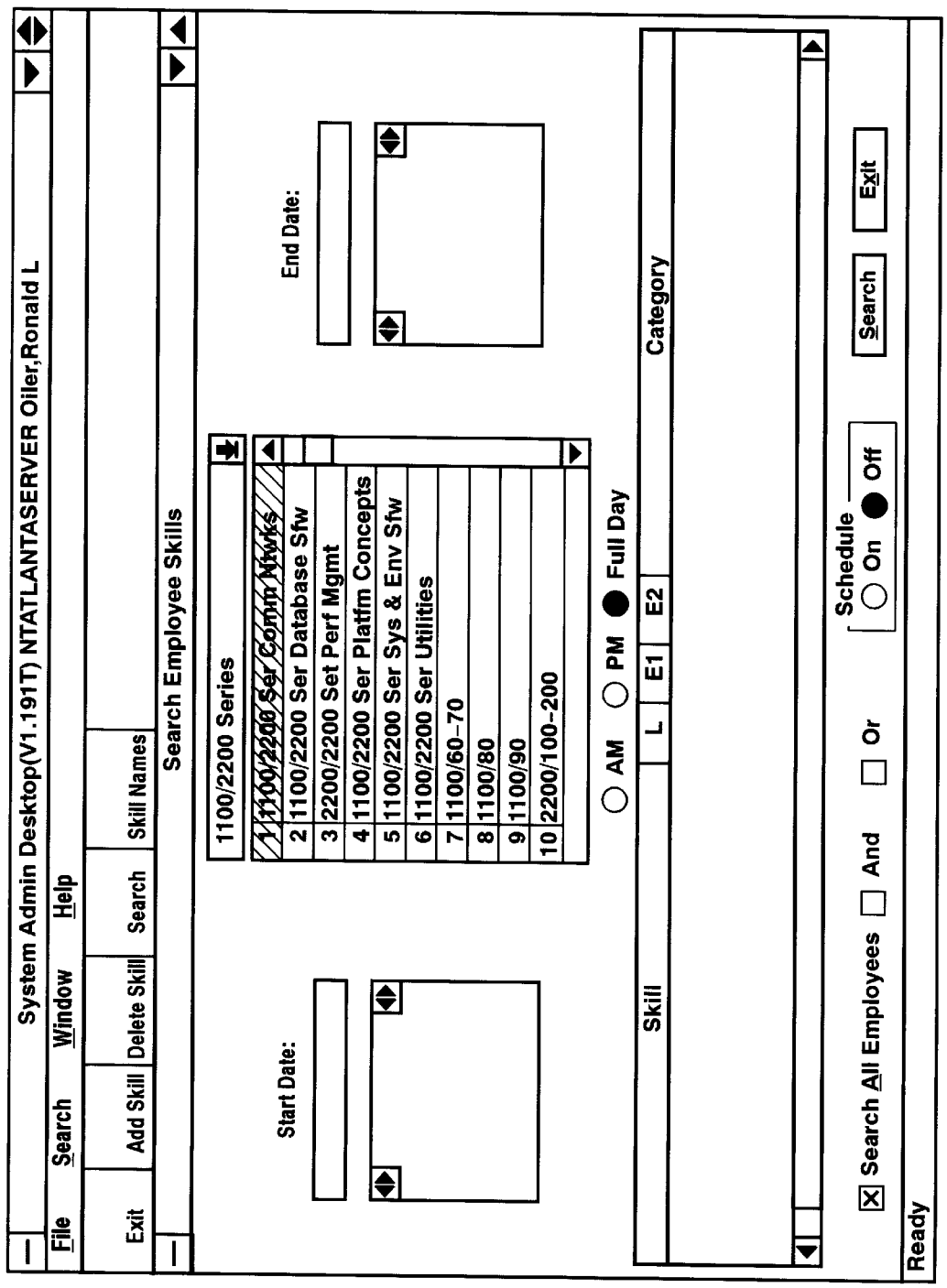

FIG. 55 is an illustration of the Search Employee Skills screen utilized as the entry screen to perform a Resource Search using the "Quick Search" function.

Figure 56:
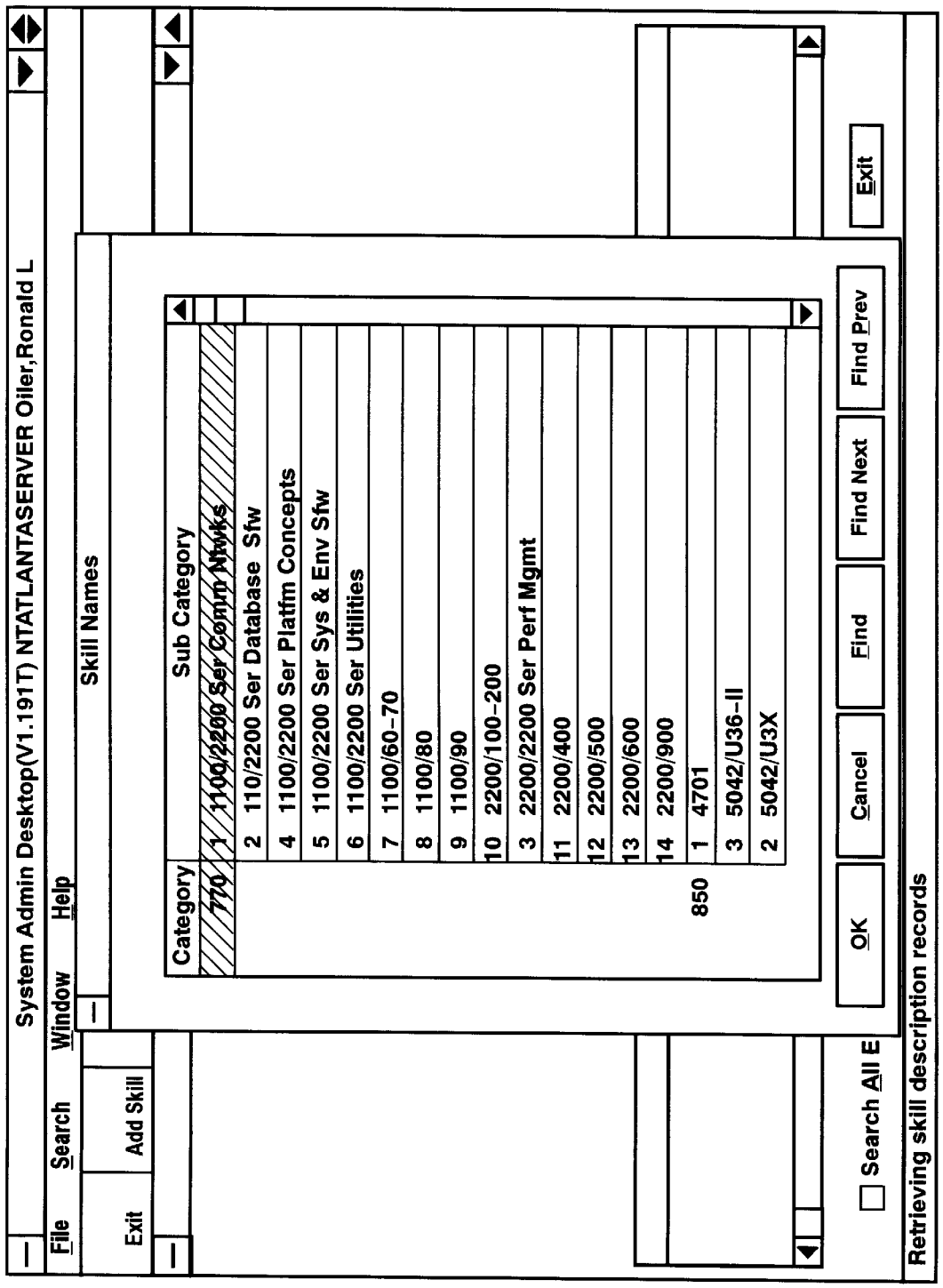

FIG. 56 is an illustration of the Search Employee Skills screen of FIG. 55 overlaid with the Skill Names pop-up window. The Skill Names window displays a selection list of skill names to assist the user in performing the Quick Search function.

Figure 57:
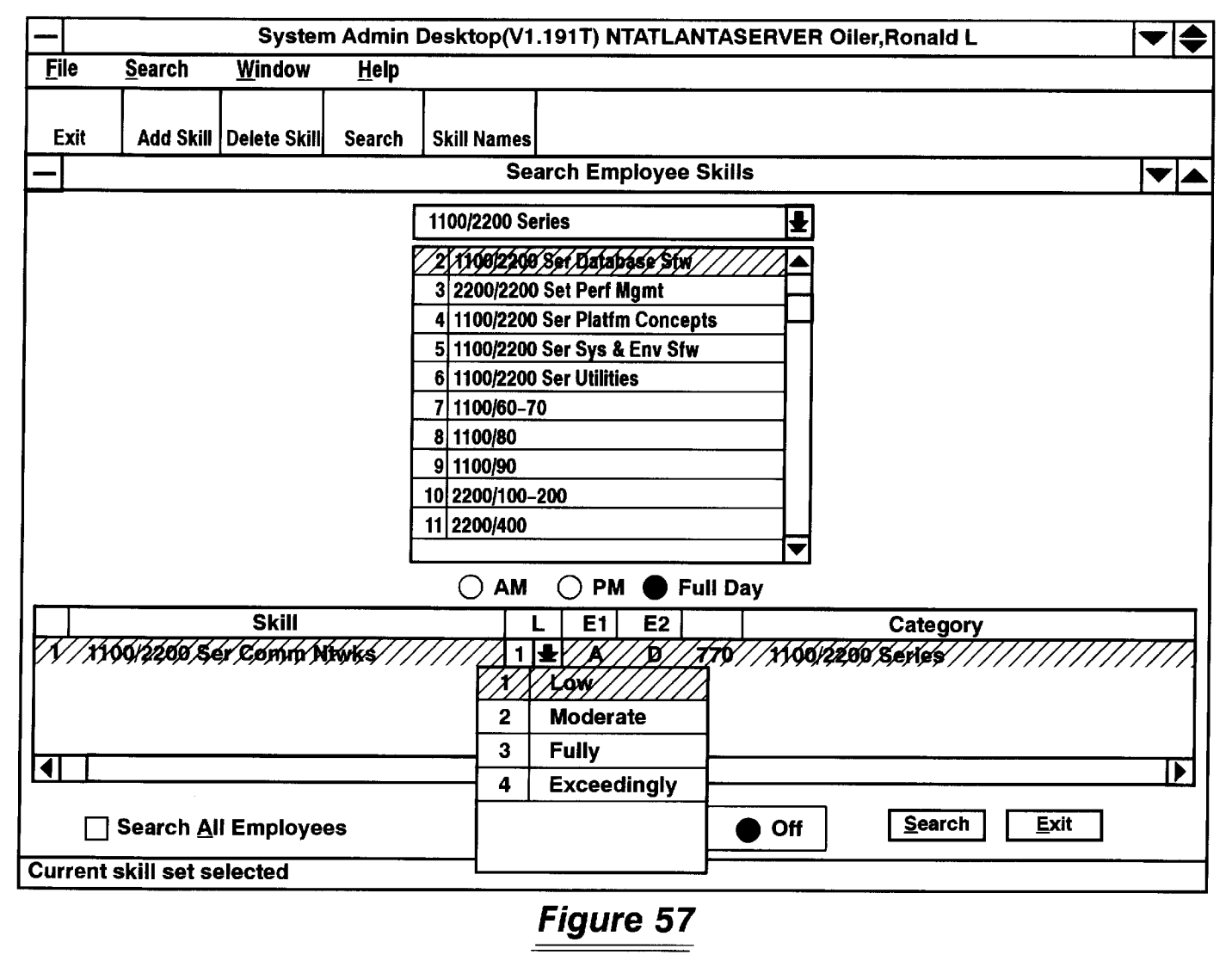

FIG. 57 is an illustration of the Search Employee Skills screen of FIG. 55 overlaid with a drop-down list box listing the available proficiency levels to assist the user in performing the Quick Search function.

FIG. 58 is an illustration of the Found Employees screen displaying a Skill Search Report listing the employees meeting the search criteria of the Quick Search function established from the screens of FIG. 55–57.

Figure 59:
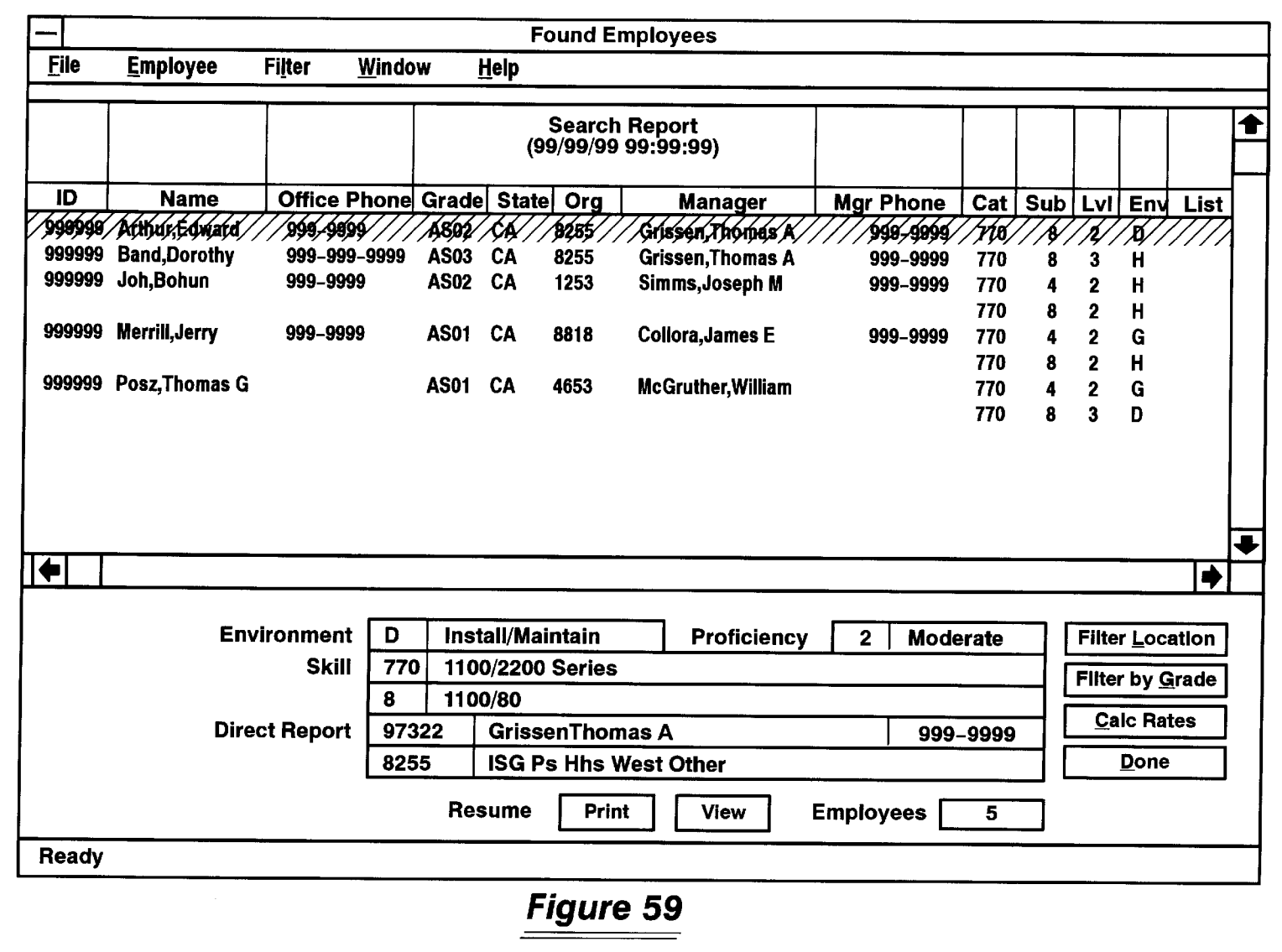

FIG. 59 is an illustration of the Found Employees screen of FIG. 58 with the search results narrowed by selecting the two filter options of Filter Location and Filter by Grade.

Figure 60:
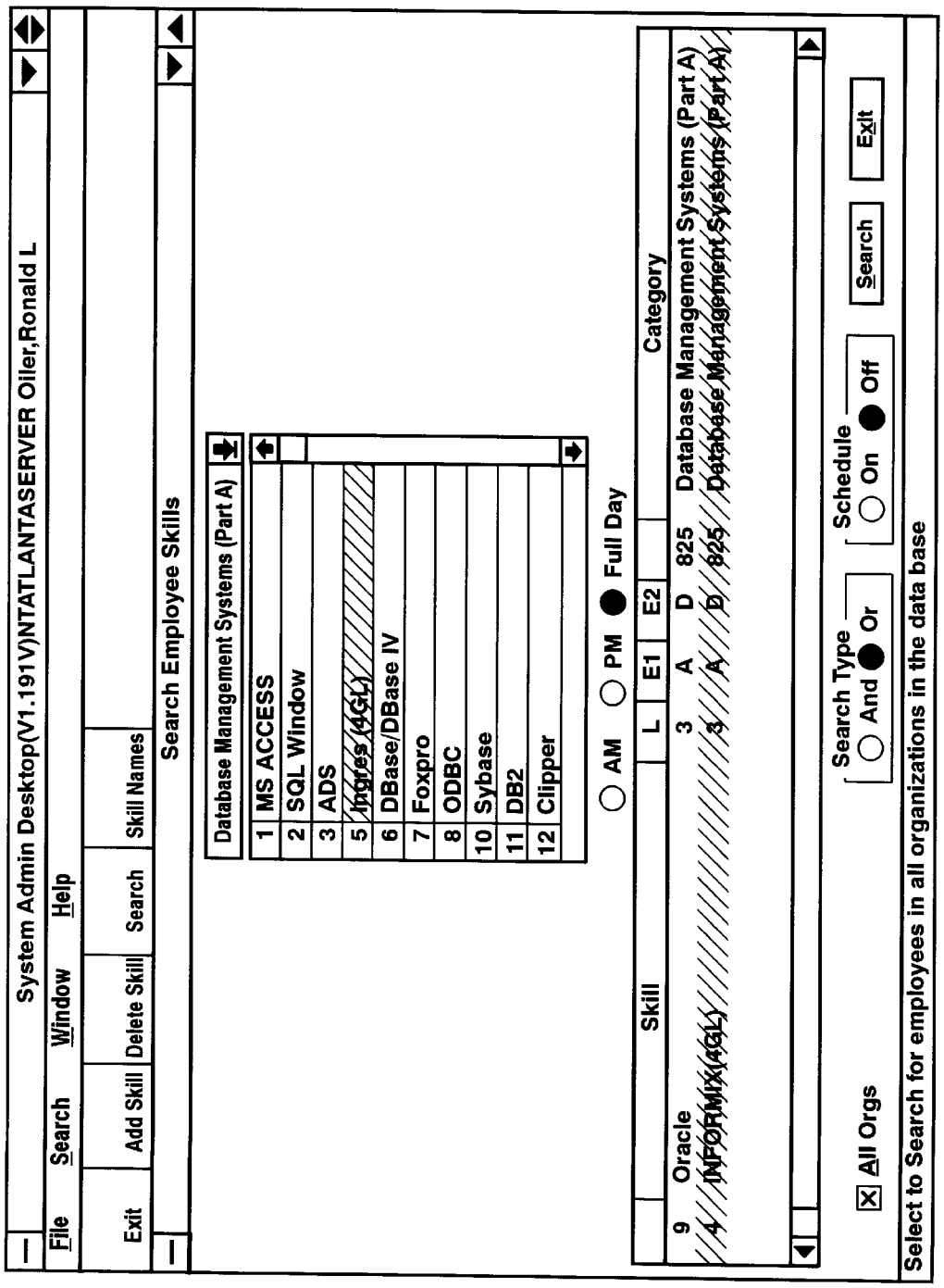

FIG. 60 is an illustration of the Search Employee Skills screen similar to that of FIG. 55 but for a different skill search category.

FIG. 61 is an illustration of the Found Employees screen (similar to FIG. 58) providing a Skill Search Report for the Quick Search selected in FIG. 60.

FIG. 62 is an illustration of the Found Employees screen of FIG. 61 overlaid with the Select States/Counties To Include pop-up window listing locations to assist the user in utilizing the Filter Location option.

FIG. 63 is an illustration of the Found Employees screen of FIG. 61 after application of the filter locations selected on the window of FIG. 62.

Figure 64:
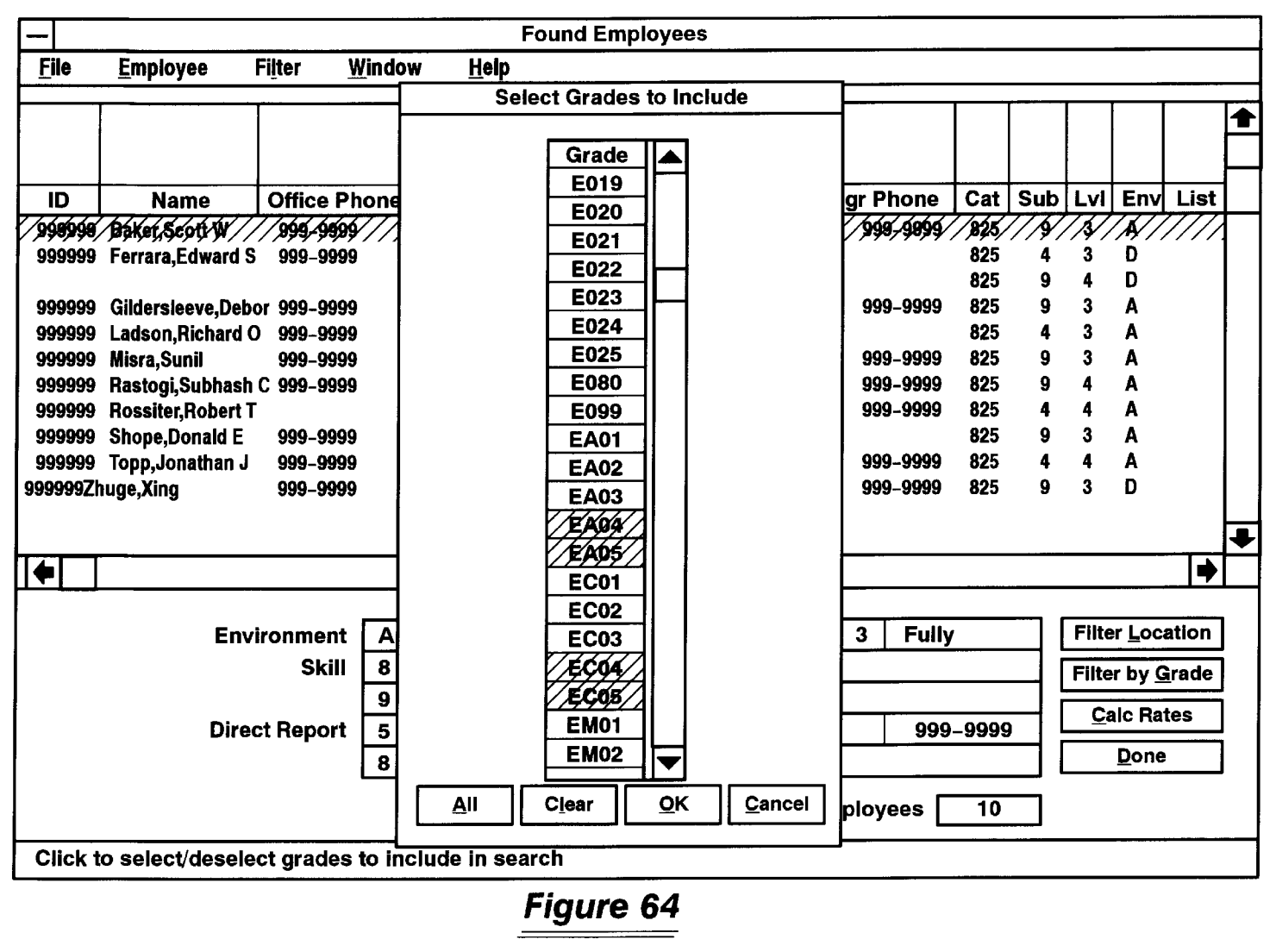

FIG. 64 is an illustration of the Found Employees screen of FIG. 61 overlaid with the Select Grades To Include pop-up window listing grades to assist the user in utilizing the Filter by Grade option.

Figure 65:
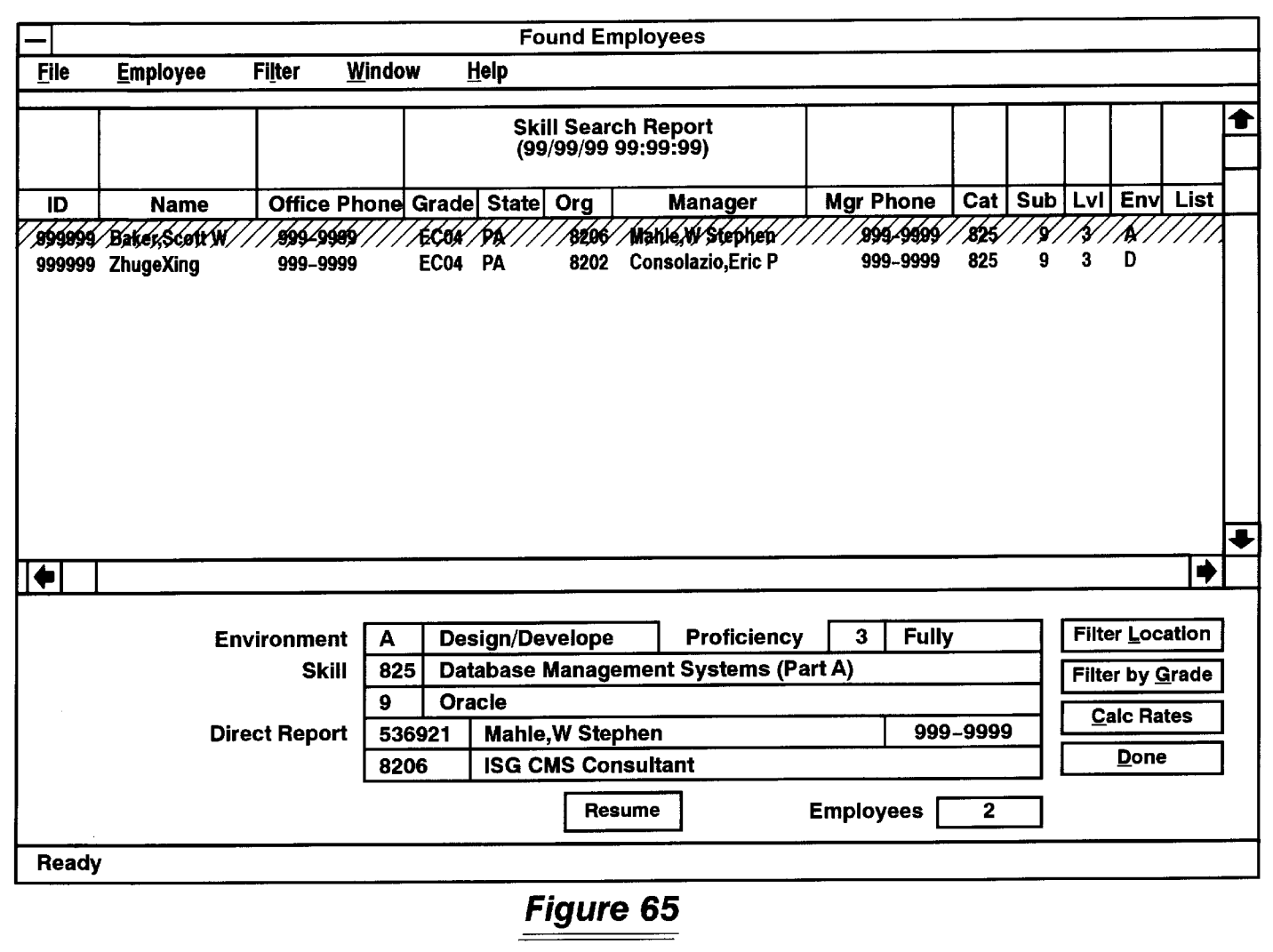

FIG. 65 is an illustration of the Found Employees screen of FIG. 63 after application of the filter grades selected on the window of FIG. 64.

Figure 66:
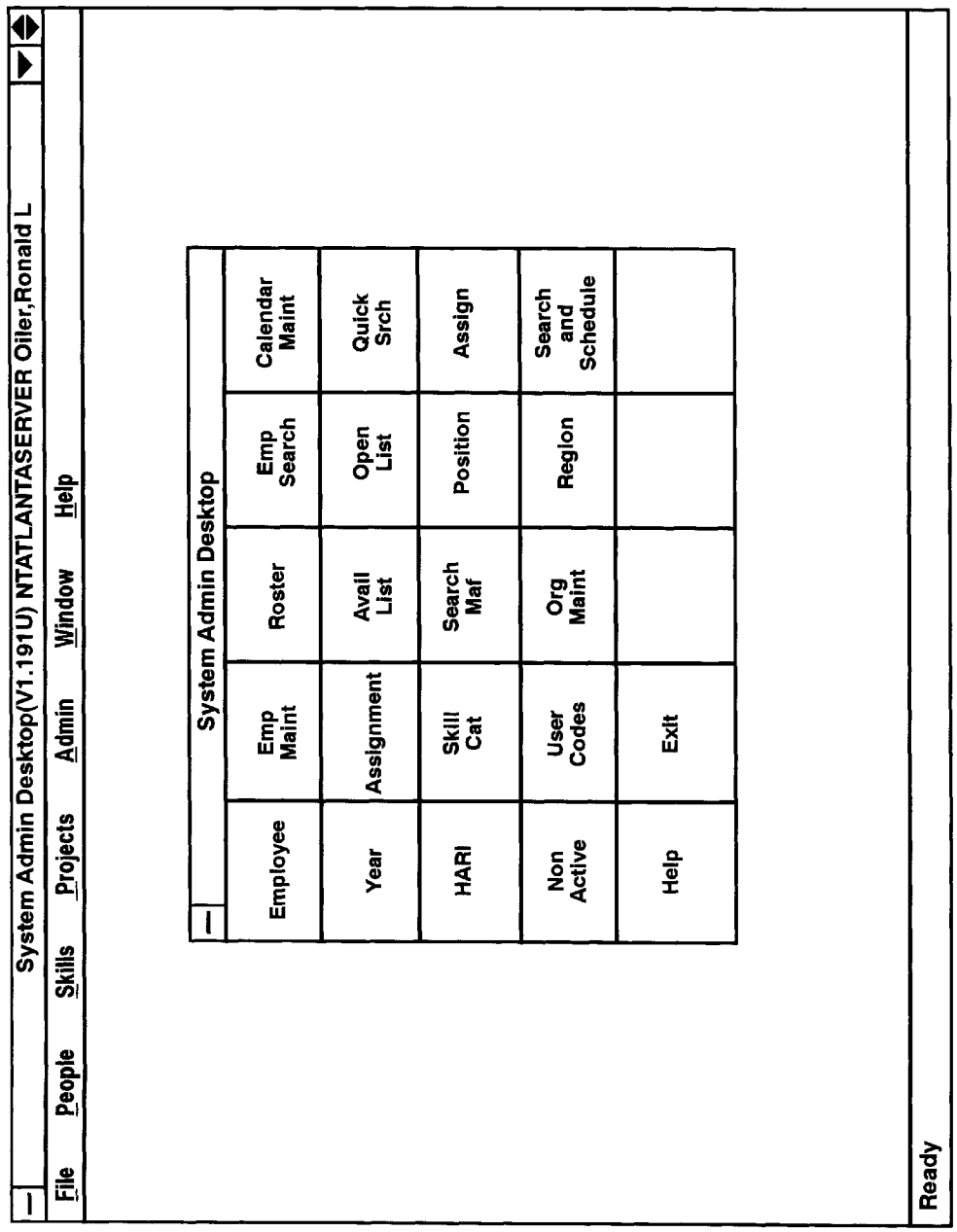

FIG. 66 is an illustration of a Main Menu window displaying main menu buttons for accessing the various functions of the RMS.

DESCRIPTION OF THE PREFERRED EMBODIMENT

Glossary

The following acronyms are used throughout the specification and drawings.

ACS—Approved Consultants System. The ACS system maintains ESV information on approved vendors.

CUIC—Cuic Number. The CUIC identifies a corporate division or a country. There may be duplicate employee numbers within a corporation but not within a Cuic.

EPS—Education Planning System.

ESV—External Services Vendors.

ETR—Education Training Request.

GUI—Graphical User Interface.

HARI—Human Assets & Resources Information.
The HARI database contains employee skill set information and resumes.

ISMS—Information Services Management System. ISMS is an umbrella system encompassing external databases named in this glossary (MAF, TAPS, etc.) and described below.

LOB—Line Of Business.

MAF—Master Authorization File. The MAF application defines projects and contains project demographic information as well as project ID numbers.

MDI—Multiple Document Interface. A Microsoft Windows GUI.

MSG—Marketing Segment Group. MSG is similar to LOB.

PIMS—Personal Information Management System.

RMS—Resource Management System.

TAPS—Technical Assistance Processing System.
The TAPS is an application that provides support for the TAR and maintains project assignments.

TAR—Technical Assistance Request. The TAR is an on-line document defining an engagement for which human resources are required.

WISE—Worldwide Information Services Employee-time. WISE is the personnel time reporting application.

Architecture/Environment/Dataflow

Referring to FIG. 1, the preferred embodiment of the RMS system of the present invention is illustrated in a corporate network. The system includes an Information Hub Server Center 10 preferably implemented utilizing Windows NT technology from Microsoft Corporation (Microsoft, Windows and Windows NT are trademarks of Microsoft Corporation). The Server Center 10 includes an RMS main production server 11 shown implemented as a PC server. The RMS server 11 includes a monitor display 12, a computer 13, a keyboard 14 and a mouse 15. The RMS server 11 includes an RMS database to be described, preferably stored on the computer system 13 hard disk. The Server Center 10 further includes a backup server 16 identical to the server 11.

The RMS server 11 communicates with the intracorporate clients through a Local Area Network (LAN) 20 and an Information Hub Router 21. The RMS server 11 also communicates with External Corporate Databases 22 via the LAN 20 for maintaining current the RMS database in the server 11 by updating with information from the External Corporate Databases 22. Similarly, the External Corporate Databases 22 may be maintained current by updates from the RMS database.

The system further includes an Information Hub Help Desk 23 that communicates with the client users through the LAN 20 and with the RMS server 11 via an interconnect 24. In addition to providing the traditional Help function to the client users, the Help Desk 23 monitors the performance of the main production server 11 via the interconnect 24 and places the backup server 16 on-line in the event of a failure in the server 11.

Client users interface with the RMS system at workstations such as those illustrated at 30, 31 and 32. The workstations 30–32 are illustrated as PCs each with a monitor display, a computer, a keyboard and a mouse, identified at workstation 31 by reference numerals 33–36, respectively. The workstations 30 and 31 are utilized by local Resource Management users and communicate with the Information Hub Router 21 via a LAN 37 and a Local Router 40. The workstation 32 may be utilized by remote Resource Management users and communicates with the Information Hub Router 21 via a remote communications controller 41 such as a Netblazer interface. The Netblazer interface 41 is available from numerous communication equipment vendors and allows remote users to dial into the corporate network and access the information therein.

The network of FIG. 1 is preferably implemented utilizing the standard TCP/IP network protocols. The LAN implementations are commercially available, for example, from Novell, Inc., as well as from Microsoft Corporation as Microsoft's Windows for Workgroups. The RMS database server 11 preferably utilizes the standard Structured Query Language (SQL).

With the Novell LAN implementation, the database server 11 is preferably a UNIX system or a PC server. (Novell and UNIX are trademarks of Novell, Inc). Commercial database software is obtainable from numerous commercial vendors. For example, Oracle Corporation and Sybase, Inc. provide database software alternatives for-the Novell LAN implementation.

The Oracle implementation server software may comprise SQLNet V2.0; TCP/IP; Oracle V7 and Oracle Replication. The Oracle implementation Client software may comprise MS DOS; Windows; SQLNet V2.0; TCP/IP and LAN Workplace for DOS.

The Sybase implementation server software may comprise Open Client; TCP/IP; Sybase System 10 and Sybase Replication. The Sybase implementation Client software may comprise of MIS DOS; Windows; Open Client; TCP/IP and LAN Workplace for DOS. (MS DOS is a trademark of Microsoft Corporation. LAN Workplace is a trademark of Novell, Inc. Oracle and SQLNet are trademarks of Oracle Corporation. Sybase is a trademark of Sybase, Inc).

It is appreciated that the LAN Workplace for DOS software allows simultaneous Novell and TCP/IP connections.

In an environment were mixed databases are used, the Open Database Connectivity Standard (ODBC), available from Microsoft Corporation, may be utilized to replace the SQLNet software or the Open Client software. ODBC provides transparent access from the application programs to the databases.

If the Windows for Workgroups implementation is utilized, the software from Microsoft Corporation packages the LAN and database access facilities together. The server software is Windows NT Advanced Server running MS SQL Server. The client software is Windows NT and Windows for Workgroups.

Referring to FIG. 2, where like reference numerals indicate like components with respect to FIG. 1, details of the RMS production server 11 interfaced with typical corporate external databases are illustrated. The RMS server 11 includes the computer system 13 interfaced through the LAN 20 with the external corporate databases 22. Also illustrated is the workstation 31 through which a client user may access the RMS server 11 through the network, as described above with respect to FIG. 1.

The external databases 22 are illustrated as including numerous corporate databases storing information utilized by the RMS server 11. The database acronyms are defined in the above glossary.

The external databases 22 include a MAF database 50 defining projects, tasks within projects and efforts within tasks. The MAF database 50 includes identification numbers such as MAF IDs, Task IDs and effort codes. The external databases 22 further include the HARI database 51 providing personnel information, skills information and resumes. Skill codes are provided by the HARI database 51.

The external databases 22 are illustrated as including the Workbench Calendars 52 of individual employees including PIMS utilized by individual employees. The external databases 22 further include the WISE database 53 which contains personnel timesheet hours.

Also included in the external databases 22 is the TAPS database 54 for maintaining project assignments. The TAPS database 54 includes TAR information as well as TAR numbers. Shown as included in the external databases 22 are the corporate office communication systems 55. The office communication systems 55 may include, for example, Microsoft MS Mail and the Unisys NAP system which support e-mail and voice mail, respectively. (Unisys and NAP are trademarks of Unisys Corporation). Project assignment and schedule change notifications are provided to employees by the RMS server 11 through the office communication systems 55.

The external databases 22 include the ACS database 56 storing ESV information including ESV skills. The external databases 22 further include the EPS and ETR database systems 57 containing information with respect to education, training and courses.

The external databases 22 include an Organizations database 58 containing information about the organizations comprising the corporation including organization tiering and organization codes. The external databases 22 further include a Customers database 59 containing data relating to corporate customers.

The RMS server computer system 13 includes data stores on, for example, hard disk storing the RMS system database 70 containing the database files utilized in the RMS system of the present invention to support the functional requirements. The RMS database files are as follows.

A Skills file 71 stores the skills, by employee, that are used in the resource search functions. The source of the information is the HARI database 51. Additionally, skills for ESVs from the ACS database 56 are also stored in this file. The data elements for the file are ID Number (Employee ID or ESV ID); Skill Code; Proficiency Level; Environment and Office Communication Systems ID. The Proficiency Levels may, for example, be Low, Moderate, Fully and Exceedingly. The environments may include such categories as sales, development, and the like.

A Skill Codes file 72 contains a list of skill codes from the HARI database 51. The data elements of the file are Skill Code and Description.

A Calendar file 73 stores the schedule records containing all the calendar entries for scheduled activities. The file contains one record for each date and time period for which an employee is scheduled. This file is maintained through the RMS, through manual calendar entries, by assigning a resource to a project, by enrolling in a class or cancelling an enrollment, and by updates from the external databases 22. The external database sources for the information are the MAF database 50, the HARI database 51, the Workbench Calendar and PIMS database 52, the TAPS database 54 and the EPS/ETR database 57. The data elements for the calendar file record are Employee ID Number; Date; Begin Time; End Time; MAF Number (Project ID); TASK ID; TAR Number; Course Number; Effort Code; Comments; Personal Memo Indicator; Tentative Indicator; Expiration Date; Flexible Indicator; Telephone Number; Status; Entered By; and Entry Date.

In a search for calendar file records, the primary search key utilized is Employee Number, Date and Begin Time.

Brief descriptions of the Calendar file data elements are as follows. The Employee Number identifies the employee to whom the record belongs. The Date is the date of the commitment. The Begin/End Time is the beginning/ending time of the commitment. The Task ID is the Task ID relating to the MAF. The Comments can include such information as location. The Personal Memo is a flag indicating that this is a personal memo record. The Tentative Indicator is a flag indicating that the commitment is tentative. The Expiration Date is the date on which a tentative record expires. The Flexible Indicator is a flag indicating that this commitment is flexible and may be changed with sufficient notice. The Telephone Number is the phone number at which the employee can be reached during this commitment. The Status is the record status indicating either Active or Inactive. The Entered By is the employee ID of the person who added this record. The Entry Date is the date on which this record was added.

A Holiday Calendar file 74 stores the calendar of holidays that apply to a particular group or organization. This file is used in the calendar functions and is maintained through the RMS system screens. The data elements are Date and Holiday Name.

A Projects file 75 contains project information downloaded from the MAF database 50 and set up through the RMS maintenance screens. The data elements are Project ID (MAF); Project Name; Customer Name; Parent MAF ID; Benefiting Organization; Date Range; Estimated Hours; Status; Project Type; Responsible Manager; and TAR Number.

A Project Task file 76 stores task information associated with projects and is downloaded along with the project information for the projects file 75. The data elements are Project ID; Task ID; Task Description; Estimated Hours; Date Range; and Status.

An Effort Codes file 77 contains a list of effort codes from the MAF database 50. This information is used when making calendar entries and scheduling. The data elements are Effort Code and Description.

A TAR file 78 contains TAR information from the TAPS database 54. The data elements are TAR Number; Revision Number; Organization; Description; Client; and Dates.

An Employee Master file 79 contains employee information sourced from the HARI database 51. The data elements are Employee Number; Employee Name; Job Level; Title; Social Security Number; Date of Hire; Location; Manager of Record; Telephone Number; FAX Number; Employee Status; Organization Number; Office Communication Systems ID; and other static demographics.

A Rates file 80 contains cost and list prices of personnel based on group and job classification. The file 80 is maintained through RMS maintenance screens by appropriate management level personnel. The data elements are Group; Job Classification; Cost; and List Price.

An ESV file 81 contains information for ESVs and other outside contacts. ESV information includes companies as well as individuals. The data elements are ESV ID; Name; Address; Telephone Number; Company/Individual Indicator; Contact; Comments; Federal ID Number; and Unisys Contact/Entered By.

A Resource Comments file 82 contains comments about prior usage, performance, restrictions, strengths and weaknesses of corporate personnel and ESV resources. The data elements are ESV ID (when applicable); Feedback (Text); Entered By; and Date Entered.

A Resume file 83 stores employee resumes including the resume data elements such as education, background, interest, etc. The source of the information in this file is the HARI database 51. Included in the data elements are Employee Number; Employee Name; Job Level; Title; Social Security Number; Date of Hire; Location; Manager of Record; Telephone Number; FAX Number; and Organization Number.

A Course Descriptions file 84 contains descriptions of classes from the ETR database 57. The data elements are Course Number; Course Name; Description of Course; and Prerequisites.

A Course Schedule file 85 contains schedules for courses from the ETR database 57 and is used in the course enrollment functions. The data elements are Course Number; Date; Number of Days; and Status.

An Organizations file 86 contains one record identifying each organization in the corporation. This information is used in the search process. The data elements are Organization ID; Organization Name; and Group ID.

The RMS server computer system 13 includes a module 90 providing interfaces for the external databases 22 including management functions for communication therewith. The interfaces and communication protocols of the module 90 are in accordance with the various data structures, architectures and protocols of the external databases 22. The interfaces and functions of the module 90 control the interchange of date from the various external databases 22 to the various files of the RMS system database 70. Preferably, batch updates of database files will occur once daily during evening hours. Other frequencies of batch mode update periodicity may be utilized as required. Alternatively, updates to the external databases 22 and to the RMS system database 70 may be effected in real-time so that the RMS system database 70 and the external databases 22 continue to track one another.

The RMS server computer system 13 further includes Screen Display Management functionality 91 and Screen Data Input and Output Management functionality 92. As discussed above, the RMS screen functions are, preferably, supported by the Windows or Windows NT technology available from Microsoft Corporation. Specific application code for generating the screens, windows, boxes, lists and menus to be discussed hereinbelow in the Microsoft Windows or Windows NT environment is routinely provided using well known software development techniques. The functionality 91 and 92 includes the display of, and user interaction with, the screens, to be described including inputs and selections utilizing the mouse and keyboard. For example, workstation 31 includes monitor 33 for screen display and mouse 36 and keyboard 35 for user interaction.

The RMS server computer system 13 further includes a Calendar Management function 93, a Resource Search Logic function 94 and a Project Assignment Logic function 95. The Calendar, Search and Assignment functions 93–95 interact with the screen functions 91 and 92, and with the RMS database 70 to perform the Calendar Maintenance, Resource Searching and Resource Scheduling functions to be hereinafter described. Details of the Resource Search Logic 94 and the Resource Assignment Logic 95 are provided in the appendix hereto.

The RMS server computer system 13 further includes a Master Controller 96 for coordinating and controlling all RMS functionality described herein including Calendar Maintenance, information browsing and updating, Resource Searching, Resource Scheduling and Database Maintenance and Inquiry.

Referring to FIG. 3, in which like reference numerals indicate like components with respect to FIG. 2, a dataflow diagram of the Resource Search and Scheduling functions of the RMS system is illustrated. The Resource Search function 94 accesses the RMS database files 71–73, 79 and 81, as illustrated, as well as receiving search parameters from Managers 100 (via RMS screen entries) in order to obtain project, personnel, skills and calendar information to satisfy a project requirement. The search for resources is performed in accordance with the timeframe, skills required to perform a task, the skill level required, the duration of the task and the number of hours anticipated to perform the task. In a manner to be described, the calendar may be ignored for priority assignments. Additional search parameter criteria may be entered, such as organization, ESV, location, contiguous days and full days/partial days. After searching and identifying one or more consultants that meet the task requirements, the system provides the capability to view details of the individual's schedule, detailed employee information, skills, resume, restrictions and comments.

After identifying the resource to fulfill a request, an assignment is made via the Project Assignment Logic 95. The Project Assignment Logic 95 may be invoked internally in the RMS system as indicated by a path 101 or as a manager input to the RMS system, as indicated by a path 102. The Project Assignment Logic 95 provides for updating the consultant's Workbench Calendar 52 and notifying the manager of record and the consultant of the schedule update via the office communication systems 55. The Project Assignment Logic 95 additionally updates the RMS calendar file 73 via calendar updates and enters resource assignments into the TAPS system 54.

In a manner to be described, the RMS system can make a schedule commitment tentative and can assign an expiration date. If no action occurs by that date, the commitment expires and the resource is available for other assignments. Tentative calendar entries are converted to an actual schedule once plans are completed.

The Project Assignment Logic 95 sends a Notification of Schedule Change, via a path 103, to the individual and, possibly, the manager of record when an assignment is made.

Referring to FIG. 4, in which like reference numerals indicate like components with respect to FIG. 2, a dataflow diagram of the Calendar functions of the RMS system is illustrated. The automated calendar functionality of the RMS permits effective and accurate location and assignment of consultants to projects. The Calendar Management function 93 includes Calendar Maintenance 108 for entering and updating schedule information. For example, the Projects database 54 enters project assignments into the Calendar Maintenance function 108. Additionally, calendar entries and updates are provided from the Workbench Calendar 52 as well as from personnel 110. Calendar Maintenance 108 provides realtime updates to the Workbench Calendar 52 as well as receiving real-time updates therefrom. The Calendar Maintenance function 108 also provides Notification Of Schedule Change to personnel via the office communication systems 55.

The information delineated above with respect to the Calendar file 73 may be entered therein via the Calendar Maintenance function 108. The information entered into the Calendar file 73 is used in the Resource Search And Assignment functions. The majority of calendar entries are built by RMS as a result of the Resource Scheduling process. As indicated, personnel 110 can also modify calendar entries and can enter non-project scheduled time, such as vacations. The RMS also provides a personal calendar for recording birthdays, anniversaries, and other personal events.

The Calendar Management function 93 also includes a Calendar Output function 109. Calendar inquiries and schedule browsing are performed through the Calendar Output functionality 109 utilizing the information in the Calendar file 73.

Referring to FIG. 5, in which like reference numerals indicate like components with respect to FIG. 2, a dataflow diagram of the ESV Tracking functions of the RMS system is illustrated. The RMS maintains records on ESVs in the illustrated RMS database files 71, 81 and 82 via an ESV Maintenance function 115. The ESV records include both companies and individuals and contain contact information and skills that can be provided. Feedback on the performance of ESVs is entered into the system and stored in the Comments file 82. This feedback provides managers guidance on the use of the ESV. This type of information is available to the user at the time of an ESV search. As considered herein under Resource Scheduling, the RMS provides the capability to include ESVs in the search results and project staffing.

Referring to FIG. 6, in which like reference numerals indicate like components with respect to FIG. 2, a dataflow diagram of the Training Interface functions of the RMS is illustrated. Utilizing the RMS database files 73, 84 and 85, the RMS provides Course Search functionality 120, Training Plan functionality 121, Course Enrollment functionality 122, Course Enrollment Cancellation functionality 123 and Course Completion functionality 124.

Utilizing this Training Interface functionality, enrolling in a training class automatically updates the Workbench Calendar 52 of the employee. To accomplish this function, the RMS provides a front-end interface to the ETR and EPS databases 57. The functionality also provides for enrollment inquiries.

Managers 100 can add courses to the training plan via the functionality 121 which then provides a front-end interface to the EPS database 57 for adding the course therein. The managers 100 also effect course enrollments via the functionality 122 which front-ends the ETR database 57 for entering the enrollments. The RMS feeds the HARI training records in the HARI database 51 via the Course Completion functionality 124. Course Enrollments 122 and Course Enrollment Cancellation 123 feed the RMS Calendar file 73 to maintain updated employee schedules. The course descriptions and schedules are maintained in the RMS database files 84 and 85 for the Course Searches function 120.

Referring to FIG. 7, in which like reference numerals indicate like components with respect to FIG. 2, a dataflow diagram of the Database Maintenance And Inquiry functions of the RMS is illustrated. The RMS database 70, containing data used by the RMS, is primarily supplied by the external corporate database systems 22. The RMS database 70 is periodically updated in batch mode at an appropriate frequency. The Batch Updates functionality is indicated by reference numeral 130. Information that is subject to frequent change may be extracted from the external databases 22 as required.

The RMS database files 71–85, as illustrated, were described in detail above. These RMS database files include: Employee Information; Employee Resumes; Employee Skills; Skill Codes; Static Project Information; Organization Numbers; Tasks by Project; Course Descriptions; Course Schedules; TAR Information; and ESV Information and Skills.

Inquiries into the RMS database 70 and provision for real-time RMS database updates is provided by the Online Maintenance And Inquiries function 131. For example, when inquiring on an employee, the user may view employee static information (i.e., name, location), along with the employee's resume and skill set. Project inquiries include static project and task information, and project staffing. Real-time RMS database updates are made for new projects and TARs with, for example, a new MAF number.

RMS Calendar Functions

The Calendar functions of the RMS are used to enter, maintain and view each employee's schedule of commitments. The primary usage of the information in the Calendar will be to identify employees available for assignments. The primary functions of the Calendar are maintenance of the details of an employee's schedule and inquiries thereon. Calendar entries are generated by the Resource Scheduling function when an employee is assigned to a project. The manual Calendar Maintenance functions are utilized to enter non-project scheduled time (such as classes, vacations, and meetings), to update existing calendar entries, and to record personal reminders (such as birthdays). An overview of the calendar dataflow functionality is provided above with respect to FIG. 4.

Referring to FIG. 8, a Yearly Calendar screen for a selected employee is illustrated showing scheduled days thereof with scheduled activities differently highlighted. The screen displays a current year, a twelve month calendar with dates highlighted that show those dates to which the employee has been assigned specific tasks or projects. The assigned dates are highlighted in color in accordance with the type of assignments. Vacation days are also color highlighted and holidays are shown as indented. The calendar year can be changed by clicking on the arrows on the bottom left of the screen. To find out what has been assigned for a highlighted date, the date is clicked on by the mouse 36 (FIG. 2). The Legend button is clicked on for an explanation of the color coding. To exit the calendar schedule, the Exit button is clicked utilizing the mouse.

Referring to FIG. 9, the screen of FIG. 8 is illustrated overlaid with the Legend pop-up window explaining the scheduled activity highlighting. The Legend pop-up window is invoked by clicking on the Legend button.

Referring to FIG. 10, the screen of FIG. 8 is illustrated overlaid with a pop-up window identifying the projects and dates that have been assigned. The window is invoked by clicking on the appropriate date on the Yearly Calendar screen. FIG. 10 also illustrates a drop-down window with a project type list.

Referring to FIG. 11, an alternatively formatted Yearly Calendar screen is illustrated providing a high level view of the schedule of a human resource for up to twelve months from the current month. The Calendar highlights available and scheduled days. Fully scheduled days and partially scheduled days are highlighted in different colors. By clicking on a month, the Monthly Calendar screen (FIG. 12) is invoked to view the calendar for the selected month showing further activity details. By clicking on a calendar day, the Daily Calendar screen (FIG. 13) is invoked illustrating a list of calendar entries for the date selected. The field at the bottom of the screen provides a description associated with the first calendar entry for a day selected by mouse clicking. The outer arrows at the top of the screen enable the user to view a prior or succeeding year. The inner arrows provide this function for the months.

Referring to FIG. 12, the Monthly Calendar screen is illustrated providing an overview of the calendar for a month of a human resource, similar to a calendar pad. Entries on the days of the monthly calendar include time and a brief description of the activity. An entry is displayed for each active calendar entry during the month. Scroll bars (not shown) are available for each day to view additional entries that exceed the room available in the box. To view the monthly calendar for a month other than the month displayed, a Month and Year is entered at the bottom of the screen. Alternatively, the Next Month and Prior Month buttons may be utilized to display the calendar entries for the month following and prior, respectively, to the month currently displayed.

Referring to FIG. 13, the Daily Calendar screen is illustrated listing active calendar entries for a selected date. This screen is invoked from the Yearly Calendar screen by clicking on a date on that screen. The screen of FIG. 13 displays the employee's name and the list box contains the active entries for that employee for the selected date. When a line in the list box is highlighted, the Details button invokes the Update Calendar Entries screen (FIG. 18) to view more information about the selected entry. Further descriptions of the list box is given with respect to FIG. 15.

Referring to FIG. 14, the printing format is illustrated of the daily calendar entries output created when the user requests printing or faxing of the active daily calendar entries. The first line under the Description/Comments column contains the MAF, TAR or Course Description. The second line shows comments entered when the entry was created.

Referring to FIG. 15, the Calendar Maintenance screen is illustrated and is the base point for initiating manual calendar updates and schedule inquiries. The Employee Name field displays the name of the logged-on user. Alternatively, a name can be entered into the Employee Name field from the keyboard 35 (FIG. 2). The Begin Date field displays the system date. The list box is filled with the schedule information for the selected employee starting with the beginning date.

The Select Employee button can also be utilized to select an employee whose schedule is to be viewed or updated. An Employee Selection screen (not shown) is invoked as a result of selecting the Select Employee button to assist in the selection. Thereafter, the selected employee name is displayed in the Employee Name field and the list box is filled with the schedule information for that employee starting with the beginning date.

With respect to the list box, the Date is the date of the commitment or personal memo. The Time is the starting time of the commitment. If the entry is associated with a TAR, MAF or Course Number, the associated ID is displayed. The Description contains the description of the TAR, MAF or Course Number. If the entry is Personal or Tentative, an asterisk is displayed in the appropriate column.

It is appreciated that the detail information for an employee's scheduled entry displayed on the Calendar Maintenance screen of FIG. 15 is obtained from the Calendar file 73 discussed above with respect to FIG. 2.

The Calendar Maintenance screen further includes a set of radio buttons designated as Date, ID and Description. (A set of radio buttons controls a set of mutually exclusive functions. When one radio button is selected, the other buttons in the set are deselected). The illustrated radio buttons are utilized to select the sort order for the records in the list box. A field is available under each radio button for entry of a search key. The list box is scrolled and the first record in the box that meets the entered search key criterion (based on the column selected by the radio button) is scrolled into view. Mouse clicking on one or more of the entries in the list box highlight the selected entries. The highlighted entries are utilized in conjunction with the Update, Group Update, and Delete command buttons.

The command buttons on the bottom of the screen will now be described.

The Display button is utilized to display the schedule of calendar entries if an employee's name or begin date is changed.

The Add button is selected to add new entries to the calendar. Selection of this button invokes the Add Calendar Entry screen of FIG. 17.

The Update button is selected for viewing and updating highlighted calendar entries. Selection of this button invokes the Update Calendar Entry screen of FIG. 18.

The Group Update button is selected to make the same change to all of a group of calendar records.

Selection of this button invokes the Group Calendar Update screen of FIG. 19.

The Delete button is selected to delete highlighted calendar entries. Selection of this button invokes the Delete Confirmation screen of FIG. 16.

The View Year button or the View Month button is selected to invoke the Yearly Calendar screen of FIG. 8 or the Monthly Calendar screen of FIG. 12, respectively.

The Select Group button is utilized for selecting a group of calendar records to update based on key criteria. Selection of this button invokes the Group Selection screen of FIG. 20.

It is appreciated that the added and updated calendar entries are recorded in the calendar file 73 as discussed above with respect to FIG. 2. This added and updated information from the calendar file is then utilized to update the fields and list box of the Calendar Maintenance screen of FIG. 15 to reflect the additions and changes to the calendar.

Referring to FIG. 16, the Delete Confirmation screen is illustrated and utilized to confirm that entries marked for deletion are to be deleted from the calendar. When the screen is invoked, the list box is filled with the schedule entries to be deleted. Upon selection of the OK button, the entries are marked "inactive" and are no longer part of the individual's schedule. It is appreciated that entries marked inactive are not actually erased from the database.

If the schedule entries are deleted by someone other than the individual, the Notification Of Schedule Change screen of FIG. 30 is invoked to provide notice of the change in the schedule.

Referring to FIG. 17, the Add Calendar Entry screen is illustrated and is utilized to make entries into the schedule of an employee. Since the Add Calendar Entry screen is invoked from the Calendar Maintenance screen, the involved employee's name is displayed in the Name field.

To add a calendar entry against a MAF number, a TAR number or a Course number, the user enters a MAF number, a TAR number or a Course number, respectively, in the respective field adjacent the associated Select button. If the MAF number, TAR number or Course number is not known, the Select MAF button, Select TAR button or Select Course button, respectively, may be clicked to select a MAF, TAR, or Course, respectively, from the MAF Selection screen, TAR Selection screen or Course Selection screen, respectively. The MAF, TAR and Course Selection screens will be described hereinafter with respect to FIGS. 22, 24 and 25, respectively.

The user may enter a Task ID associated with the selected MAF into the field adjacent the Select Task button. This field identifies the task of a project to which the calendar entry applies. If the Task ID is not known, the Select Task button may be clicked to select a task from the Task Selection screen to be discussed with respect to FIG. 23.

In order to indicate the effort code associated with a calendar entry, the user enters an effort code in the field adjacent the Select Effort Code button. If the effort code is not know, the Select Effort Code button may be selected to select an effort code from the Effort Code Selection screen to be discussed with respect to FIG. 26.

Upon return from any of these Selection screens, the data selected from the screen is displayed in the field adjacent the associated Select button on the Add Calendar Entry screen of FIG. 17.

The description associated with the MAF, TAR or Course Number is contained in the Description display-only field. The description associated with the task number is contained in the Task display-only field. The description associated with the effort code is contained in the Effort display-only field.

The beginning date and the ending date are entered into the Begin Date and End Date fields. The user may enter a value in these fields from the keyboard 35 (FIG. 2) or may click on a date in the Begin Date and End Date Calendar boxes. (The Calendar boxes below the Begin Date and End Date contain the calendar for the current month. Arrows (not shown) will allow the user to scroll through the months.)

The beginning and ending times providing the hours for the calendar entry are entered in the Begin Time and End Time fields. Furthermore, 2-Week Repeating Pattern Check Boxes provide entries for specifying a 2-Week pattern for schedule entries during the beginning and ending date range. Selections of the check boxes are made by mouse clicking.

The user may enter additional description, location information, or comments associated with the calendar entry in the Comments field. A Telephone # field is provided for the telephone number where the employee can be reached during the project hours. An Entered By field is provided for the name of the person making the calendar entry if different from the selected employee.

A Personal Memo check box may be selected by the user to indicate that the calendar entry is a personal item. A Flexible check box may be selected by the user to indicate that the dates and/or hours on the calendar entry are flexible and may be-rearranged with sufficient notification. A Tentative check box may be selected by the user to indicate that the commitment associated with the calendar entry is tentative at the time of the entry. An Expiration Date field is utilized for entry of the date on which a tentative commitment expires. After this date, the calendar entry will no longer appear on the employee's schedule.

When the Update button is-selected after entering the calendar entry information, an entry will be made in the Calendar for each day between the Begin Date and End Date. As calendar entries are generated, the system will check for any schedule conflicts (i.e., duplicate calendar entries for the date during the begin and end times). The user is notified of each schedule conflict and is asked whether to override the original entry, as will be discussed hereinafter with respect to the Schedule Conflict screens of FIGS. 28 and 29. If the user overrides, the original calendar entry is deleted (inactivated) and the new entry is added to the Calendar. Otherwise, the original calendar entry is retained and a new calendar entry for the conflict date is not added.

If the schedule entries are added by someone other than the individual, the Notification Of Schedule Change Screen of FIG. 30 is invoked.

Referring to FIG. 18, the Update Calendar Entry Screen is illustrated and utilized to review details of existing calendar entries and make changes to those entries, one entry at a time. Upon initiation of this screen, the detail information associated with a highlighted entry in the list box on the Calendar Maintenance screen is displayed.

The individual field descriptions and edits are provided above with respect to the Add Calendar Entry screen of FIG. 17. Upon selection of the Update button, schedule conflicts are reported and resolved as described above with respect to the Add Calendar Entry screen, and the Calendar is updated by entering the updated information into the Calendar file 73 of FIG. 2. Selection of the Next button or Previous button will display the Calendar details for the next or previous line from the list box that was highlighted. If schedule entries are updated by someone other than the selected individual, the Notification Of Schedule Change screen of FIG. 30 is invoked.

Referring to FIG. 19, the Group Calendar Update screen is illustrated and is used to apply information to a group of entries without having to update each entry individually. For example, this screen may be used to convert tentative entries to permanent entries and assign project information to a group of calendar entries.

When invoked, the screen displays, in the Name field, the name of the individual for whom the Calendar is being updated and, in the Updated By field, the name of the individual making the change.

The individual field descriptions and edits are provided above with respect to the Add Calendar Entry screen of FIG. 17. Any fields that are left blank will not be updated when the-calendar is updated.

After selecting the Update button, schedule conflicts are reported and resolved as discussed above with respect to the Add Calendar Entry screen. The Calendar is updated by entering the updates into the appropriate records of the Calendar file 73 of FIG. 2.

Referring to FIG. 20, the Group Selection screen is illustrated and used to select a group of calendar entries to be updated or deleted based upon key selection criteria. For example, the user may wish to delete all entries for a specified MAF number. The selection criteria are entered on the Group Selection screen.

The system selects each calendar entry for the employee that meets all of the criteria entered.

The individual field descriptions and edits are provided above with respect to the Add Calendar Entry screen of FIG. 17. The user may enter as many fields as required to limit the search selection.

After entering the search criteria, one of the buttons on the bottom of the screen is activated and the selected records (i.e., all active entries that meet all of the search criteria) are carried forward to an associated screen as follows.

The View Selection button invokes the Group Selection List screen (FIG. 21), which provides a view of the selected records, with the ability to alter the list, prior to updating or deleting them.

The Update button invokes the Update Calendar Entry screen ( FIG. 18), which behaves as if the user had highlighted multiple lines on the Calendar Maintenance screen (FIG. 15). Each entry in the selection is updated individually.

The Group Update button invokes the Group Calendar Update screen (FIG. 19). All entries in the selection are updated as a group with the same information.

The Group Delete button invokes the Delete Confirmation screen (FIG. 16). Upon confirmation of the delete, all entries in the selection are deleted (inactivated).

Referring to FIG. 21, the Group Selection List screen is illustrated and utilized to view the list of calendar entries that meet the search criteria entered on the Group Selection screen ( FIG. 20), prior to updating or deleting those calendar entries.

Upon initiation, the list box is filled with active calendar entries that meet the search criteria entered on the Group Selection screen. The displayed information in the list box for each entry is as follows.

The Date is the date of calendar entry and the Time is the beginning time for the calendar entry.

The ID is the MAF, TAR, or Course Number for the entry. If all are blank, the comment field is displayed in this column.

The Description is the description corresponding to the MAF, TAR or Course Number for the entry and the Effort column is utilized for the description corresponding to the effort code in the calendar record.

The Update, Group Update, and Group Delete buttons are as described with respect to the Group Selection screen of FIG. 20. Upon activation of the Delete Selection button, the highlighted line or lines are deleted from the group selection and are removed from the list box. When one of the Update or Delete buttons is selected these records are omitted from the selection.

Referring to FIG. 22, the MAF Selection screen is invoked whenever the Select MAF button is selected on a screen on which a MAF number is needed and unknown.

The screen is utilized to assist the user in determining the MAF number when only the project name or customer name is known. The user enters the known Project Name and/or the Customer Name in the search criteria fields. The list box is then filled with the projects with names and/or customer names meeting the search criteria.

The illustrated radio buttons, corresponding search key fields and the Find command button provide the sort and the search and locate functions. For the sort function, the radio buttons and search key fields above each column in the list box are utilized. Selecting a radio button causes the list box to be resorted and the curser to be positioned in the corresponding search key field. As characters are entered in the search key field, the list box is scrolled and the first record in the list box that meets the criteria entered is highlighted.

The search and locate function provides the capability to enter a string and then search the database for the first or next record that meets the search criteria. The field to be searched is identified by the sort radio button that is highlighted. The search and locate function is invoked by selection of the Find command button.

Highlighting a line in the list box and selecting the OK button returns the selected MAF to the initiating screen for processing.

Referring to FIG. 23, the Task Selection screen is invoked when the Select Task button is selected on a screen on which a task number is needed and unknown. The screen is used in determining a task number when only the MAF ID is known. The MAF ID will have been previously entered or selected prior to initiating this screen.

During screen initialization, the MAF ID and description are displayed in the fields at the top of the screen and the list of tasks associated with the MAF ID are displayed in the list box. Highlighting a line in the list box and selecting the OK button returns the selected task to the initiated screen for processing.

The illustrated radio buttons, corresponding search key fields, and the Find command button provide the sort function and the search and locate function as described above with respect to FIG. 22.

Referring to FIG. 24, the TAR Selection screen is displayed whenever the Select TAR button is selected on a screen on which a TAR number is needed and unknown. This screen is used to assist the user in determining a TAR number when only the customer name or project name is known.

After screen initialization, the user enters the TAR description and/or the customer's name in the TAR Description and Customer Name search criteria fields. Thereafter, the list box is filled with the TARs whose names and/or customer names meet the search criteria.

Highlighting a line in the list box and selecting the OK button returns the selected TAR to the initiating screen for processing.

The illustrated radio buttons, corresponding search key fields, and the Find command button provide the sort function and the search and locate function as described above with respect to FIG. 22.

Referring to FIG. 25, the Course Selection screen is invoked when the Select Course button is activated on a screen where a course number is needed and unknown. This screen is used to assist the user in determining a course number when only the description is known.

After screen initialization, the user enters the course description in the Course Name field. Thereafter, the list box is filled with the courses whose descriptions meet the search criteria.

Highlighting a line in the list box and selecting the OK button returns the selected course to the initiating screen for processing.

The illustrated radio buttons, corresponding search key fields, and the Find command button provide the sort function and the search and locate function as described above with respect to FIG. 22.

Referring to FIG. 26, the Effort Code Selection screen is invoked when the Select Effort Code button is activated on a screen on which an effort code is needed and unknown.

During screen initialization, the effort codes are displayed in the list box. If a MAF number was entered on the originating screen, the MAF number and description is displayed in the MAF fields and all effort codes associated with that MAF are included in the list box. Otherwise, all effort codes in the database are included in the list box.

Highlighting a line in the list box and selecting the OK button returns the selected effort code to the initiating screen for processing.

The illustrated radio buttons, corresponding search key fields, and the Find command button provide the sort function and the search and locate function as described above with respect to FIG. 22.

Referring to FIG. 27, the Organization Code Selection screen is invoked whenever the Select Org button is activated on a screen on which an organization code is needed and unknown.

During screen initialization, the organization codes and names are displayed in the list box.

Highlighting a line in the list box and selecting the OK button returns the selected organization code to the initiating screen for processing.

The illustrated radio buttons, corresponding search key fields, and the Find command button provide the sort function and the search and locate function as described above with respect to FIG. 22.

A more detailed presentation of the Organization Code Selection screen will be provided below with respect to FIG. 33.

Referring to FIGS. 28 and 29, two different formats for the Schedule Conflict screen are illustrated and invoked when the user attempts to update the Calendar with an entry that conflicts with or overlaps with an existing active entry. In the Calendar functions of the RMS, this screen may be invoked from the Add Calendar Entry (FIG. 17) and Update Calendar Entry (FIG. 18) screens. This screen is also invoked from the Resource Scheduling functions when attempting to assign a resource to a project.

The format for the Schedule Conflict screen illustrated in FIG. 28 allows the user to override a schedule conflict with the new entry. The format of the Schedule Conflict screen illustrated in FIG. 29 only notifies the user that there is a conflict, as well as the name of the manager who may perform the override.

The list box is filled with the following information for each calendar record for which a conflict exists.

Conflict Date is the date of the existing entry that is in conflict with the new entry.

Begin/End Time is the time range of the calendar entry that is in conflict with the new entry.

Description is the MAF description, TAR description, Course Description, or Comment field from the existing line that is in conflict with the new line.

Effort is the description associated with the effort code, if entered, on the existing line.

To override any of the entries in the list box, the user highlights those entries and selects the Override button. This inactivates the calendar entry and the entry is deleted from the list box. The calendar entry will no longer appear on the employee's calendar.

On the notification only format of the screen illustrated in FIG. 29, the user may only view the calendar entries in conflict. When the review and updates are completed, the Exit button returns control to the initiating screen.

Referring to FIG. 30, the Notification Of Schedule Change screen is invoked when a change is made to an employee's calendar by an individual other than the employee. Upon initiation, the screen is displayed with the Notify Employee box checked. The employee's name and mail ID are displayed in the designated fields. If the update was made by an individual other than the employee's manager, the Notify Manager box is also checked, and the manager's name and mail ID are displayed in the designated fields.

Upon selection of the OK button, priority notification is sent through electronic mail (office communication systems 55 of FIG. 2) to the employee with the employee's manager copied on the letter.

Resource Adding/Updating and Information Browsing

The RMS system provides the capability of adding to, maintaining and browsing the employee information in the RMS database 70 of FIG. 2. This includes adding a new employee and updating employee details. A dataflow overview of the Database Maintenance And Inquiry functions of the RMS is provided above with respect to FIG. 7.

Referring to FIG. 31, the Employee Maintenance screen is illustrated and utilized for adding and updating the employee records in the RMS database 70 (FIG. 2). In addition, the screen is utilized for browsing employee detail information which will be discussed with respect to FIG. 42. For browsing, the screen is captioned Employee Read-Only Roster. The toolbar at the top of the screen is utilized to assist the user in these functions. The employee Resume is also accessible by clicking the Resume Print or View command buttons at the central left part of the window.

To add a new employee to the RMS database 70, the Add button on the toolbar is clicked. The text boxes of the screen are cleared and ready for input of the new employee data. The employee ID, name, location and other applicable data are entered. When functioning in the Add mode, the added employee may be saved by clicking on the Update or Exit buttons on the toolbar or selecting another employee from the selection box of the Employee Maintenance screen of FIG. 31.

Buttons available on the toolbar of the screen facilitate selection of data for the new employee, such as position code, organization, etc. The toolbar buttons are also utilized to update existing records of an employee when functioning in an Update mode. Pop-up windows are overlaid on the screen of FIG. 31 to provide appropriate information to the user. For example, clicking on the Position, Org, Status, Contacts, or Views button on the toolbar invokes the appropriate pop-up window to be described with respect to FIGS. 32–36, respectively.

Referring to FIG. 32, the Employee Maintenance screen of FIG. 31 overlaid with the Position Selection pop-up window is illustrated. Positions are sorted by Position ID or Position Title by utilizing the illustrated radio buttons in the manner described above. A search and locate function, as previously described, is provided utilizing the illustrated radio buttons and the sort key field below the Select Order buttons. A Position title for the employee is selected by clicking the desired title and then clicking the Select command button.

Referring to FIG. 33, the Employee Maintenance screen of FIG. 31 overlaid with the Select Organization pop-up window is illustrated. The sort order, as well as the search and locate functions described above, are provided via the radio buttons and search key field at the top of the window. The desired organization is selected by clicking thereon and then clicking the Select command button.

Referring to FIG. 34, the Employee Maintenance screen of FIG. 31 overlaid with the Employee Status pop-up window is illustrated. An employee status is selected using one of the six radio buttons and a description can be entered in the Description text box. The RMS database 70 (FIG. 2) is updated with the selected status by clicking the Update command button on the window.

Referring to FIG. 35, the Employee Maintenance screen of FIG. 31 overlaid with the Employee Contacts window is illustrated. The contents of the Engagement and Mentor text boxes are added, deleted or changed by using the Clear and Select Employee groups of command buttons on the bottom of the screen. Database updates are done by clicking the Done command button. Referring to FIG. 36, the Employee Maintenance screen of FIG. 31 overlaid with the Employee Views pop-up window is illustrated. The views, or virtual organization, may indicate a specific area of expertise or interest. The purpose of the view is to provide additional flexibility and information for the employee search. Views may be added to the selected employee by clicking the Add command button on the window. A data selection window (not shown) is displayed with all available system views from which one can be selected. To delete a view for the selected employee, the view is highlighted and the Delete command button is clicked.

With continued reference to FIGS. 31–36, Updating is performed by selecting the Update button on the toolbar of the Employee Maintenance screen of FIG. 31. The selection list box in the center of the screen displays the Employee Names and corresponding Employee IDs. The list can be scrolled utilizing the scroll bar on the box. An employee is selected by clicking and the selected employee details appear in the illustrated fields of the screen. The pop-up windows are utilized in the manner described above with respect to FIGS. 32–36. The new information entered into the screens for the updated records is saved in the manner described above for the Add employee function.

Referring to FIG. 37, the HARI (skills) screen is illustrated and used to view, add and delete skills information in the RMS database for a particular employee. For convenience, the command buttons are grouped in a standard HARI questionnaire format that is utilized by the enterprise at which RMS is installed. Accordingly, the command buttons reflect Background, Skills, and Career Interests. In use, the Select Employee command button in the center of the screen is clicked and an employee selection list (not shown) displays. The desired employee is clicked from the list and the details thereof appear in the text boxes in the upper part of the window labeled—Employee, Employee No., Location, and Work Phone. Updates are made for the selected employee by clicking on the appropriate command button.

Referring to FIG. 38, the HARI Skills Data Entry screen is illustrated. This screen reflects the portion of the HARI Questionnaire relating to skills and is invoked when the HARI Skills command button of FIG. 37 is activated. This HARI Skills screen is formatted in accordance with the standard HARI Questionnaire and changes are entered in appropriate fields by navigating down the questionnaire. Alternatively, the appropriate HARI section may be selected using the drop-down list box (not shown activated) at the upper left part of the window. The radio buttons at the lower right part of the window provides selection of the view as either Skills or Employee Detail. After finishing, the Update command button at the bottom of the window may be clicked. Clicking on the Summary command button at the bottom of the window invokes the HARI Skill Proficiency Summary window illustrated in FIG. 39.

Referring to FIG. 40, the Organization Maintenance screen used to update and add to the organizational information in the RMS database is illustrated. This screen is principally utilized by the system administrator. When the screen of FIG. 40 is invoked, the existing organization units appear listed on the window. The illustrated radio buttons and search key field are utilized to perform the sort order as well as search and locate functions discussed above. The desired Organization is highlighted by clicking on it and the various details of the organization are displayed in the text boxes at the bottom of the screen. To make changes, the Update button on the toolbar is selected. Selecting the Delete button on the toolbar will delete the highlighted organization from the listing. To add a new organization, the Add button on the toolbar is clicked and the Get New Org dialogue box of FIG. 41 is displayed. After inputting the Organization Number and Organization Type in the illustrated text boxes of the dialogue box of FIG. 41, the Done command button of the dialogue box is clicked. The lower part of the Organization Maintenance window of FIG. 40 is blanked and the organization details are entered.

FIGS. 40 and 41 illustrate screens utilized by the system administrator to maintain the organizational information. It is appreciated that other similar screens (not shown) are utilized by the system administrator for maintaining other information, such as Position Codes and Employee's Views.

As discussed above with respect to FIG. 31, the RMS can be utilized to browse employee detail information in a read-only mode. FIGS. 42–46 illustrate screens utilized in this function.

Referring to FIG. 42, the Employee Read-Only Roster screen utilized to browse employee detail information is illustrated. As discussed, this screen is the same as the Employee Maintenance screen of FIG. 31 except for the screen caption. Upon initiation, the selection list box in the center of the screen is filled with employee's names and IDs. Browsing is effected with the up and down arrows on the box and after finding the name of interest it is clicked on. On the bottom part of the window, the selected employee details appear.

Alternatively, a name search can be performed by entering the name in the text box on the upper part of the window. The resume of the employee is available for viewing in the manner described above with respect to FIG. 31. The Terminate Word check box permits Word For Windows to be automatically exited after printing the resume if the Print button is clicked. To the right of the selection list box, the number of employees in the roster is shown in a text box. Clicking the Rates command button on the window displays the employee rate and cost. Clicking the Views command button on the window displays the views for the selected employee (see FIG. 36).

Additional information about the selected employee is available by clicking the buttons on the toolbar as follows.

Upon clicking the Schedule button on the toolbar, a Yearly Calendar screen is shown with the scheduled information for the selected employee displayed (see FIGS. 8–14).

By clicking on the Contacts button or the Views button on the toolbar, the respective Employee Contacts window or Views window is displayed. These windows were discussed above with respect to FIG. 35 and 36, respectively.

By clicking on the Skills button on the toolbar, a window is displayed, as illustrated in FIG. 43, listing the selected employee's skills. The skills are categorized as in HARI. At the bottom of the window, two drop-down list boxes are available for checking the meaning of the codes for Skill Level and Environment.

Referring to FIG. 44, the Employee Roster screen used in the read-only browsing of employee detailed information is illustrated. This screen provides an additional view on the employee detail information. The roster may be sorted by Employee, Manager or Organization where the sort field is defined by clicking the appropriate radio button at the upper part of the window. A search text box is also available for entry of a desired name. The search field is selected using the same group of radio buttons. Additional employees are viewed by utilizing the vertical scroll bar and additional fields of information are viewed by utilizing the horizontal scroll bar. Details for a specific employee selected from the list is available by pressing the Detail button on the toolbar. The Employee Detail window is illustrated in FIG. 45 and has an appearance the same as that described with respect to FIG. 42.

Referring to FIG. 46, a Resume screen is illustrated providing the resume of a selected employee. The Resume screen is invoked during an employee information search function. For example, the resume is obtained, as discussed above, from the screens illustrated in FIGS. 31 and 42.

Referring to FIG. 47, a screen displaying a drop-down, cascading menu from the Admin item on the menu bar of a Main Menu screen is illustrated. The options of the cascading menu provide different views on the RMS database to be selected allowing user defined data to be extracted from the database.

Referring to FIG. 48, the Specify Retrieval Criteria window is illustrated and is displayed when selecting the Employees option from the cascading menu of FIG. 47. The user specifies employee information retrieval criteria on this window. The scroll bars of the selection list are utilized to access all the selection fields.

Referring to FIG. 49, the Employee Search screen is illustrated displaying the information matching the specified retrieval criteria of FIG. 48. This screen provides an extensive view of the RMS database which can be accessed utilizing the vertical and horizontal scroll bars. The Sort button on the toolbar is utilized to format the data to facilitate analysis.

Referring to FIG. 50, the Employee Search screen of FIG. 49 overlaid with the Specify Sort Columns pop-up window is illustrated. The Specify Sort Columns window is displayed in response to clicking on the Sort button on the toolbar of the Employee Search screen of FIG. 49. This pop-up window assists the user in formatting the information on the Employee Search screen of FIG. 49.

On this window there are two list boxes. In the one on the left side, a list of all columns is displayed. To select a sort column, drag-and-drop it from the left list box to the one on the right. The sort order can now be selected as Ascending by checking the box adjacent the selected sort column. The sort order is Descending if the box is unchecked.

Additionally, by clicking on a sort column in the list box on the right side, the Modify Expression pop-up window is displayed as illustrated in FIG. 51.

Referring to FIG. 51, the Modify Expression window is utilized to enhance the sort or provide a more specific view of the information retrieved on the Employee Search screen of FIG. 49. To do this, the command buttons on this window representing the basic arithmetic operations are utilized. Additionally, the functions in the list box can also be used. The column-names in the right hand list box can be used as arguments of the functions or as operands. The expression that is created is displayed in the list box at the top left side of the window. Clicking the OK command button applies the expression to the retrieved information.

Resource Search and Assignment

This section describes the screens and processes involved in identifying resources with the skills and availability to fulfill a project request. The Calendar is utilized in this process to eliminate from the search personnel who are unavailable. Also described are the functions of assigning resources to a project. When scheduling resources, the Calendar is updated to reflect the commitment. FIGS. 52–65 relate to the Resource Searching And Assigning functions of the RMS. FIG. 3 illustrates the dataflow for these functions.

The Resource Searching functions of the RMS use project requirements and the Calendar to identify employees with the necessary skills and availability to fulfill an assignment. The search may be limited by optional parameters entered by the user. The Resource Searching functions may also include identifying ESVs with the appropriate skills to fulfill project requirements.

The user enters as many parameters as necessary to refine the search. The results of this search produce a list of employees who meet all of the requirements identified. Once employees have been identified for assignment, an Assign Employees Update screen of the Resource Scheduling function is invoked to update the Calendar and make the assignment.

The screens and user interactions described with respect to FIGS. 52–65 may be effected at the user workstation 31. The screens are displayed on the monitor 33 and user interaction is effected by the mouse 36 and the keyboard 35. By these means the user interacts with the information stored in the RMS system database 70.

Referring to FIG. 52, the Resource Search screen is illustrated that performs the search for resources to assign to projects. Parameters for the search are entered on the screen. As a result of the search process, employees who fulfill project requirements and availability are identified.

The parameters identified by the Resource Search screen of FIG. 52 define a particular search profile. Each profile may be given a name and stored to a flat file (not shown). The drop-down list box (not shown activated) in the upper left part of the screen is utilized to display the names of the stored profiles. If it is desired to use a predefined profile, the name is selected from the list and the search parameters automatically fill the respective fields on the screen. The name of the profile appears in the text field in the upper right part of the screen. Alternatively, the profile name may be entered into the text field in the upper right part of the screen with the stored search parameters automatically filling the fields.

Start Date and End Date specify the beginning date and the ending date, respectively, of a date range during which to search for resources. If no other limiting search criterion is entered, the system will attempt to find resources that are available every day during the Start/End Date range.

With the curser in the Start Date field or the End Date field, a drop-down calendar (not shown activated), from which the user may select a date, is displayed from the appropriate field. The user clicks on a date in the drop-down calendar and the date selected is copied into the appropriate Start Date or End Date field.

The Resource Search screen includes a HARI categories drop-down box (not shown activated) below the Start Date field which is filled with the major skill categories for which a resource is required. Upon selection of a HARI category from the HARI categories drop-down box the HARI sub-categories skills list box (located below the HARI categories drop-down box) is filled with a list of skills associated with the selected major skill category. These skills are denoted as HARI sub-categories and identify the skill categories in the major HARI category. The user selects the skills from the HARI sub-categories list box required to fulfill the engagement. As skills are selected, they are copied to the skills list box at the bottom of the screen.

The Schedule On/Off radio buttons specify whether or not the employee's Calendar should be considered when performing the search. The user selects one of the radio buttons to indicate whether or not to consider prior commitments when performing the search. If the schedule is off, prior commitments are ignored.

The # Days field specifies the number of days during the date range for which a resource is required. The system will attempt to find resources that have this number of days available during the date range. <# Days> is used in conjunction with Work Hours and the date range to limit the search. If Work Hours are entered, the system attempts to locate resources who have <# Days> days available during the Work Hours entered and during the date range specified. If Work Hours are not entered, the system defaults by attempting to locate resources who have <# Days> full days available during the date range.

The Contiguous check box, used in conjunction with # Days, specifies that when searching for availability for the # Days entered, these days must be contiguous if the check box is selected.

The Work Hours fields specify the hours during which the resources are required to work during the date range. Work Hours are used in conjunction with the date range, # Days, and the Repeating Pattern. If only a date range and work hours are entered, the system attempts to locate resources that are available every day during the date range and work hours. When used in conjunction with # Days, the system attempts to locate resources who are available during these work hours for the number of days entered, during the date range. When used in conjunction with a Repeating Pattern, the resource must be available during these work hours on the days specified, during the date range.

The Total # Hours field specifies the total number of hours for which a resource is needed during the date range. The system accumulates the hours available during the date range, until <# Hours> hours are accumulated. If <Total # Hours> hours are available during the date range, the employee is available.

The % Available field specifies the minimum percentage of total time that the resource is required during the date range, based on an eight hour day. The default is 100%. Particularly on long-term projects, the user may wish to lower this percentage to allow for non-project time such as vacations, administrative time, training, and group meetings.

The Organization drop-down box (not shown activated) is initially filled with organization names from which the user may select. If left blank, the search includes personnel from all organizations. The Organization drop-down box was discussed above with respect to FIGS. 27, 33, 40, and 41.

The Location drop-down box (not shown activated) is initially filled with area names from which a selection may be made. Selection of a location specifies that the search should be limited to personnel whose geographical work area matches that selected. A work area may consist of multiple work locations. If left blank, the search is performed on employees from all work areas.

The 2-Week Repeating Pattern check boxes identify the specific days on which a resource is required on a repeating bases. The days that are checked are used in conjunction with the Start/End Date and Work Hours.

The Search button initiates the search after all parameters are entered. Upon selection of the Search button, the search for resources meeting the requirements proceeds. Upon completion of the search, a number of resources who satisfy the search criteria is displayed in the # Found box. The search is performed by the Resource Search Logic 94 of FIG. 2. This Resource Search Logic is described in detail in the Appendix hereto.

The Assign button invokes the Assign Employees screen of FIG. 53 to list the resources found in the search and to facilitate assigning them to a project.

The Exit button indicates that the search is completed with control returning to the calling program.

Referring to FIG. 53, the Assign Employees screen is illustrated providing a Search Report listing employees identified from the Resource Search screen of FIG. 52. The Assign Employees screen is utilized to select the project, effort code, and employees to be assigned to the project. The Assignment function invokes the Resource Scheduling function of the RMS updating the employee's Calendar with the assignments.

A project name is entered in the Project Name field. Alternatively, the Select MAF button may be utilized to display a list of projects from which to choose as discussed above with respect to FIG. 22. The appropriate effort code is entered or selected from a drop-down list invoked from the Select Effort Code button as discussed above with respect to FIG. 26.

A program manager may utilize the Assign Employees screen of FIG. 53 to obtain detail employee information by highlighting a listed employee utilizing an appropriate mouse click protocol. The RMS system provides all of the detail information for the selected employee utilizing the information browsing functionality discussed above with respect to FIGS. 42–51. If after reviewing and evaluating the employee detail information the manager wishes to assign the employee to the project, the highlighting for the employee is maintained. If the manager wishes to reject the selected employee, the selection highlighting is deactivated by an appropriate mouse click protocol.

After all desired employees are selected, the Assign button is clicked to invoke the Assign Employees Update screen of FIG. 54.

Referring to FIG. 54, the Assign Employees Update screen is illustrated which assigns the employees to the projects and performs associated updates to the Calendar. The Assign Employees Update screen is invoked as a result of performing the Resource Search function described above with respect to FIGS. 52 and 53 or may be invoked in the process of assigning an individual selected resource to a project. Resource Scheduling is performed to establish links between an employee and a project, which requires specific skills to perform. As a result of the scheduling process, Calendar entries are generated to reserve the employee's time for the duration of the assignment, and notification is sent to the affected employees to inform them of changes in their schedules.

If the assignment function was initiated through the search process, the search parameters that were entered on the Resource Search screen of FIG. 52 are carried forward to the Assign Employees Update screen and are displayed in the corresponding assignment parameter fields. If the assignment function was initiated from the Main Menu or other screen on which search parameters are not entered, the assignment parameter fields are initially blank and should be entered. Editing of these fields is described above with respect to the Resource Search screen of FIG. 52.

Upon selection of the Update button, a record is written to the Calendar file 73 (FIG. 2) for each day for which the selected employee is scheduled. Prior to writing the calendar record, the system checks if the employee has been previously scheduled for that date and time period. If so, the Schedule Conflict screen (FIGS. 28 and 29) is invoked to resolve the conflict. Upon completion of the update, the Notification Of Schedule Change screen (FIG. 30) is invoked for notifying the employee and the employee's manager of the schedule changes.

The scheduling functionality is performed by the Project Assignment Logic 95 of FIG. 2. Details of this logic are described in the Appendix hereto.

The Resource Search may also include ESVs as well as employees. In order to identify appropriate ESVs, the Skills file 71, the ESV file 81, and the Resource Comments file 82 of the RMS system database 70 (FIG. 2) are utilized in the search. For an ESV search, preferably the Schedule radio buttons of the Resource Search screen of FIG. 52 will be set to Off.

Employees can be assigned to a project utilizing the Assign Employees screen of FIG. 53 and the Assign Employees Update screen of FIG. 54 one employee at a time. When an employee is selected on the basis of the Search Report of FIG. 53 and evaluation of additional detail information viewed by the manager, the Assign button is clicked and the employee is assigned utilizing the screen of FIG. 54. At this time a Flexible and/or Tentative indication can be entered (with Expiration Date if Tentative is selected) for the assigned employee.

Referring to FIG. 55, the Search Employee Skills screen is illustrated and utilized to perform a Resource Search using the "Quick Search" function. A skill category is selected from the drop-down list box options (not shown activated) at the upper center of the screen and a skills list within the selected category is displayed in the selection list box at the center of the screen. One or more skills from the selection list box is selected and the skill or skills are added to the Search Skill list at the bottom of the screen. If more than one skill is selected, an And search or Or search can be effected utilizing the check boxes at the bottom of the screen. Thus, the user may choose to search for all or any of the skills by checking And or Or.

As a search option, the user may specify Off or On for the Schedule by clicking the Schedule radio buttons at the bottom of the screen. If Off is selected, the search will include employees regardless of their schedule. If On is selected, the search will only include employees that are available during the specified time frame. The Start Date and End Date text boxes and associated calendars only display if the Schedule On radio button is selected. These text boxes and calendars are illustrated for completeness even though the Schedule Off radio button is shown selected.

If the Schedule On radio button is chosen, the start and end dates of the period for which the employee is required are selected by clicking the appropriate dates on the left part of the screen (start date) and the right part of the screen (end date) calendar. (Clicking on the innermost arrow buttons on the calendars changes the month. Clicking on the outermost arrow buttons changes the year). These calendars are similar to that illustrated in FIG. 11.

Clicking on the Skill Names button on the toolbar results in the display of a Skill Names selection list as illustrated in FIG. 56. The list can be browsed utilizing the scroll bar. A desired skill name is selected by clicking on the name and then on the OK command button. The selected skill is added to the Search Skill list on the bottom of the Search Employee Skills screen of FIG. 55.

Skills can be added and deleted from the Search Skill list at the bottom of the screen of FIG. 55 using the Add Skill and Delete Skill buttons on the toolbar.

As a search option, the searched skill proficiency level can be selected by clicking on the row of the skill in the "L" (level) column as illustrated in FIG. 57. The illustrated drop-down list box appears with the available proficiency levels as in HARI (Low, Moderate, Fully, Exceedingly). The required skill level is selected by mouse clicking. All employees with proficiency skill level equal or higher than that selected are listed.

As a further search option and in the manner described with respect to skill proficiency, a skill environment may be chosen utilizing the "E1" and "E2" columns for the searched skill. If a selection is made in both columns, an Or search for the two is performed. If no selection is made, the search includes all environments.

As a further search option, the employees to include in the search are selected by the Search All Employees check box. If the box is checked, all employees are included in the search. If the box is not checked, the search only includes employees within the user's organization.

The skill search is initiated by clicking on the Search button on the toolbar. The Found Employees screen, as illustrated in FIG. 58, displays a Skill Search Report with the employees meeting the search criteria.

Referring to FIG. 58, the user may narrow the search results by selecting one of the filter options on the bottom of the Found Employees screen. The filter options are selected by clicking on one or both of the Filter Location and Filter by Grade buttons. For example, if the user searches for employees in California using the location filter, and then chooses level AS1–5 with the grade filter, the result displayed, as illustrated in FIG. 59, will include Architectural Specialists in California that meet the search criteria.

With continued reference to FIGS. 58 and 59, information about a selected employee is accessed by clicking on the employee. Information about the employee selected appears at the bottom of the screen. Clicking on the Employee item on the menu bar provides a link to the Employee Read-Only Roster and further detailed information as discussed above with respect to FIG. 42–51.

Employee resumes are accessible by clicking on the Print Resume or View Resume buttons on the bottom of the screen (FIG. 59).

Referring to FIGS. 60 and 61, the Search Employees Skills screen and the Found Employees screen, similar to those of FIGS. 55 and 58, respectively, are illustrated, but for a different skill search category. To select employees by location, the Filter Location button (FIG. 61) is clicked and a pop-up menu appears with state and country options as illustrated in FIG. 62. In FIG. 62, the locations to include in the search are selected and the OK command button is clicked. FIG. 63 displays the list of all employees meeting the search criteria for the selected locations. To remove the location filter, the Filter Location (FIG. 62) is entered selecting Clear and OK.

The same process is used to select employees by grade level using the Filter by Grade button. It is appreciated that the filters remain in use unless the user goes into the location filter or grade filter and clears it. FIG. 64 illustrates the pop-up menu displayed when utilizing the grade filter and FIG. 65 illustrates the list of all employees meeting the search criteria for location and grade as discussed with respect to FIGS. 60–64.

As described, FIGS. 55–65 provide details of the Quick Search functionality with the found employees indicated on the screens of FIGS. 59 and 65. Together with employee details accessed therefor, employees can be selected and assigned to the project utilizing the screens of FIGS. 53 and 54 as discussed above with respect to these screens.

The quick search functionality of FIG. 55–65 can also be utilized in locating appropriately skilled ESVs by accessing the appropriate RMS database files as discussed above with respect to FIG. 52–54.

User Entry Points to RMS Functionality

Referring to FIG. 66, a desktop Main Menu window displaying Main Menu buttons for accessing the various functions of the RMS is illustrated. This window may, for example, be accessed by a user from the workstation 31 (FIG. 2). Signing on to the RMS system and obtaining the window of FIG. 66 provides connection to the RMS database 70 (FIG. 2) so as to access the above-described RMS program functionality with respect to the database.

Selecting the Search and Schedule button provides access to the Resource Search and Scheduling functionality described above with respect to FIG. 52–54. Activating the Quick Search button provides access to the Quick Search function described above with respect to FIGS. 55–65. A resource identified by the Quick Search function may he assigned to a project by clicking the Assign button on the Main Menu of FIG. 66. This invokes the functionality described above with respect to FIGS. 53 and 54.

The Calendar Maintenance button provides access to the functionality described above with respect to FIGS. 8–30.

The Employee button provides read-only functionality as described above with respect to FIGS. 42–51. The Employee Maintenance button provides access to the functionality described above with respect to FIGS. 31–39. The Roster button provides direct access to the Employee Roster described above with respect to FIGS. 44 and 45.

The Year button provides direct access to the Calendar functions described above with respect to FIGS. 8–14. Initially, a listing of employees (not shown) is provided from which an employee can be selected for displaying the employee's Calendar.

The HARI button provides direct access to HARI information as described above with respect to FIGS. 37–39. The Skill Category and Search MAF buttons provide detail views of skills and projects, respectively, as stored in the RMS database 70 (FIG. 2).

The Organization Maintenance button provides access to the functionality described above with respect to FIGS. 40 and 41.

It is appreciated that by the architecture, screens and functionality described above, the user is provided with a single point of access not only to the entire RMS database 70 of FIG. 2, but also to all of the external databases 22. As described above, with particular reference to FIG. 2, the user at a workstation, such as the workstation 31, can utilize the desktop entry screen of FIG. 66 to access all of the RMS functionality. The RMS server computer system 13 is linked to the external databases 22 via the LAN 22 and the interfaces 90. Thus, the user at the workstation 31 has a convenient single point of access to all of the human resource and project information available in the corporation. The screens, windows, boxes, lists, etc., as described above, provide displays to the user.

While the invention has been described in its preferred embodiment, it is to be understood that the words which have been used are words of description rather than of limitation and that changes may be made within the purview of the appended claims without departing from the true scope and spirit of the invention in its broader aspects.

Appendix

This appendix presents detailed logic for the resource search and project assignment functions. (See FIGS. 52–54).

Search Logic

This logic is performed during the resource search process. These steps are performed for each employee in the database.

1. Does the employee have the skills selected?
    No—Return to step 1 with next employee
    Yes—Continue with step 2.
2. Was an organization selected?
    Yes—Is this employee a member of that organization?
        No—Return to step 1 with next employee
        Yes—Continue with step 3
    No—Continue with step 3.
3. Was a location selected?
    Yes—Does the employee's home location match?
        Yes—Continue with step 4
        No—Return to step 1 with next employee
    No—Continue with step 4.

For each work date (week day, non-holiday dates) between Start Date and End Date, the calendar is checked to determine if the employee is available. If a calendar record does not exist for the date being examined, the employee is available for the entire day. If a calendar record does exist for the date being examined, the begin and end times of the commitment are examined. For partial days, a day is only considered to be available if 4 or more contiguous hours are available during the work day (between 8:00 a.m. and 5:00 p.m.). Inactive calendar entries, personal memos, and expired tentative entries are ignored, that is, they are treated as if they do not exist. If specific work hours are not entered on the screen, 8:00 a.m. to 5:00 p.m. are assumed.

Steps 4 through 9 are performed for each work date between Start Date and End Date. For each date that meets the requirements, an entry is made in an array. The array entry contains the date and available time on that date (begin and end time). If Work Hours were entered and the employee is available during these hours, Work Hours are placed in the array for the available times. If Work Hours are not entered, the begin and end times in the array are set to the available contiguous hours on that date (or 0800 to 1700 if the day is unscheduled). After all dates have been examined, processing continues with step 10. The array entries are further processed against the requirements to determine if the employee should be included in the available pool for assignment to a project.

4. Was the Schedule Off radio button selected?
    Yes—Were any Repeating Pattern Days selected?
        No—Add the date to the array; continue with the next date
        Yes—Does the date fall on one of the selected days of appropriate week? (see step 6) Yes—Continue with step 8 No—Continue with the next date at step 4
    No—Continue with step 5.
5. Calculate # hours between begin and end time of Work Hours. Add # hours to Total Hours Required. If Work Hours not entered, add 8 to Total Hours Required.
6. Were any of the 2-Week Repeating Pattern boxes checked?
    No—Continue with step 7
    Yes—Determine the day of the week for the date being checked.
        Compute Week #=(Date being checked—Start Date+1)/7.
        Is Week # zero or an even number?Yes—Is the day of the week of week 1 of the repeating pattern on which the date falls checked?
            Yes—Is the employee available during Work Hours (or 0800 to 1700)? Yes—Continue with step 9 No—Return to step 1 for next employee
            No—Return to step 4 for next date
        No—Is the day of the week of week 2 of the repeating pattern on which the date falls checked?
            Yes—Is the employee available during Work Hours (or 0800 to 1700)? Yes—Continue with step 9 No—Return to step 1 for next employee
            No—Return to step 4 for next date.
7. Were Start/End Dates only entered (i.e. # Days, Total # Hours and % Available not entered)?
    Yes—Is the employee available during Work Hours (or 0800 to 1700)?
        Yes—Continue with step 9
        No—Return to step 4 for next date
    No—Continue with step 8.
8. Were # Days entered?
    Yes—Is the employee available during Work Hours (or 0800 to 1700)?
        Yes—Continue with step 9
        No—Return to step 4 for next date
    No—Continue with step 11.
9. Add an entry to the array for this date if there are at least 4 contiguous hours available on this date.

If Work Hours were entered, the Begin and End Times in the array will contain Work Hours. If Work Hours were not entered, the contiguous hours available on that date are stored in the Begin and End Times in the array (or 0800 to 1700). Add numbers of hours available on this date (from the array) to Total Available Hours. Return to step 4 for next date.

After all dates have been examined and array entries built, the following steps determine whether the employee meets all the requirements.

10. Schedule Off selected?
    Yes—Continue with step 17
    No—Continue with step 11.
11. Were any days in repeating pattern checked?
    Yes—Go to step 17 (will only get to this step if the pattern matched availability)
    No—continue with step 12.
12. Were Total # Days entered?
    Yes—Are there this many entries in the array?
        Yes—Was Contiguous checked?
            Yes—Continue with step 13
            No—Continue with step 17
        No—return to step 1 with next employee
        No—Continue with step 14.
13. Was Contiguous checked?
    No—Continue with step 14
    Yes—Were Work Hours entered? (If Work Hours, Total # Hours, or % Available are all blank, the system will behave as if Work Hours of 0800 to 1700 were entered and will perform the Work Hours logic above.)
        Yes—Search array for the number of contiguous days specified.
            Were <# Days> contiguous days found?
                Yes—Store off the beginning date of the contiguous days; continue with step 17
                No—Return to step 1 with next employee
            No—Continue.
14. Were Begin/End Dates only entered? (i.e. Total # Hours, # Days, % Availability not entered)
    No—Continue with step 15
    Yes—Compare each date in the array against Begin/End Dates (excluding weekends and holidays) where the employee is available during Work Hours (use 0800 to 1700 if Work Hours are not entered).
        All dates found in array for Work Hours?
            Yes—Go to step 17
            No—Return to Step 1 with next employee.
15. Were Total # Hours entered?
    Yes—Total Available Hours >=Total # Hours?
        Yes—Continue with step 17
        No—Return to step 1 with next employee
    No—Continue with step 16.
16. % Available Entered?
    Yes—Total Available Hours/Total Hours Required >=% Available?
        Yes—Continue with step 17
        No—Return to step 1 with next employee
    No—Continue with step 17.
17. Add the employee to the selection list. (Store employee information as well as beginning date of availability. If Contiguous Days was checked, the beginning date of availability is the date from step 12. If the Schedule Off button is selected, the beginning date of availability is the Start Date from the screen. Otherwise, the beginning date of availability is the first date in the array.)

18. Increment # Found.

19. Return to step 1 with next employee.

Assignment Logic

Assignment Logic is invoked upon selection of the "Update" button from the Assign Employees Update screen. This logic adds entries to the employee's calendar.

1. Build an array of available dates as described in Search Logic of this Appendix, steps 4 through 9.
2. If a Repeating Pattern was specified, the system builds calendar entries for each array entry between the beginning and ending date. If Work Hours were entered, they are used in the calendar entry. Otherwise, 0800 to 1700 is used. For each entry which conflicts with an existing entry, the Schedule Conflict Screen is displayed to resolve the conflict.
3. If # Days were specified, but Contiguous was not checked, select the first <# Days> entries from the array and write those entries to the calendar. If Work Hours were entered, they will be used in the calendar entry. Otherwise, the available hours from the array will be used.
4. If # nays were specified and Contiguous was checked, search the array for <# Days> contiguous days. When found, write a record to the calendar for each date, starting with the first date of the contiguous days, using Work Hours or available hours from the array.
5. If Start and End Dates only were entered, (# Days, Total # Hours, or a Repeating Pattern were not entered), the system writes a record to the calendar for each entry in the array, that is, each working date between the Start Date and the End Date. If Work Hours were entered, they are used in the calendar entry. If Work Hours were not entered, the available time from the array is used. For each entry which conflicts with an existing entry, the Schedule Conflict Screen is displayed to resolve the conflict.
6. If Total # Hours was entered, the system writes a record to the calendar for each entry in the array, that is, each working date between starting and ending date, until the number of hours written to the calendar=Total # Hours. The begin and end times from the array are used in the calendar entry. For each record written to the calendar, the number of hours between begin and end time is accumulated until reaching total # hours.

What is claimed is:

1. A method implemented on a programmed computer system for identifying candidate human resources to be assigned to a project, said project requiring predetermined skills and predetermined time availability, comprising:

maintaining, in said computer system, a system database storing system skills data identifying skills possessed by potential candidate human resources and system calendar data of scheduled activities of potential candidate human resources, searching said system skills and said system calendar data for human resources possessing said predetermined skills and said predetermined time availability, so as to identify said candidate human resources, generating assignments to said project of said candidate human resources identified in said searching step, adding data of said assignments to said system calendar data, and generating a calendar display from said system calendar data for an individual human resource with days of said calendar display highlighted in accordance with project assignments of said individual human resource, including an assignment added to said system calendar data in said adding step, thereby automatically determining human resources with appropriate skills and time availability for assignment to projects and automatically generating said calendar display providing an overview of said highlighted days during which said individual human resource is assigned to said projects.

2. The method of claim 1 wherein said method services an enterprise and said project is a project of said enterprise, said enterprise maintaining databases external to said computer system storing data relating to human resources of said enterprise, said method further including:

providing interfaces between said external databases and said computer system for providing data from said external databases for said system data stored in said system database.

3. The method of claim 2 wherein said project requires a predetermined skill proficiency level said system skills data identify skill proficiency levels possessed by potential candidate human resources, and said searching step includes searching said system skills data for human resources possessing said predetermined skill proficiency level so as to identify said candidate human resources.

4. The method of claim 2 wherein said project requires a predetermined skill environment said system skills data identify skill environments possessed by potential candidate human resources, and said searching step includes searching said system skills data for human resources possessing said predetermined skill environment so as to identify said candidate human resources.

5. The method of claim 2 wherein said maintaining step further includes maintaining said system database storing further system data identifying further information with respect to said potential candidate human resources, said method further including:

generating a display of said further information pertaining to said candidate human resources identified in said searching step, and generating assignments to said project of candidate human resources identified in said searching step and selected in accordance with said display of said further information.

6. The method of claim 5 wherein said further information includes resumes of said potential candidate human resources.

7. The method of claim 1 further including:

transferring data related to said assignments through said interfaces to said external databases for updating said external databases therewith.

8. The method of claim 7 wherein said interfaces provide for interchange of data between said system database and said external databases, said method further including:

providing a common user interface for accessing and updating said system database and said external databases, said common user interface providing a common view of the information in said system database and said external databases.

9. The method of claim 1 wherein said days are differently highlighted in accordance with different assignment types.

10. The method of claim 9 wherein said days are emphasized in accordance with non-project schedules of said individual human resource.

11. The method of claim 1 further including:

generating, for said individual human resource, a monthly calendar display of days of the month with scheduled daily activities of said individual human resource.

12. The method of claim 1 further including:

selecting a day of said calendar display, and generating a display of scheduled activities of said individual human resource for said selected day.

13. The method of claim 1 further including:

generating a list of projects on said calendar display to which said individual human resource is assigned.

14. The method of claim 1 wherein said predetermined time availability includes a repeating time pattern.

15. The method of claim 1 further including providing notification of said assignments.

16. The method of claim 1 wherein:

said method further includes maintaining said system database storing system External Services Vendor data identifying skills possessed by External Services Vendors, said External Services Vendors being potential candidate human resources, said searching step includes searching said system External Services Vendor data for External Services Vendors possessing at least one of said predetermined skills so as to identify at least one of said candidate human resources.

17. A method implemented on a programmed computer system for identifying candidate human resources to be assigned to a project, said project requiring predetermined skills and predetermined time availability, comprising:

maintaining, in said computer system, a system database storing system skills data identifying skills possessed by potential candidate human resources and system calendar data of scheduled activities of potential candidate human resources, and searching said system skills and calendar data for human resources possessing said predetermined skills and said predetermined time availability, so as to identify said candidate human resources, said method further including maintaining said system database storing system personnel data identifying demographic parameters of potential candidate human resources, said project requiring a predetermined demographic parameter, said searching step including searching said system personnel data for human resources possessing said predetermined demographic parameter so as to identify said candidate human resources.

18. The method of claim 17 wherein said predetermined demographic parameter comprises location.

19. The method of claim 17 wherein said predetermined demographic parameter comprises organization of said enterprise.

20. A method implemented on a programmed computer system for identifying candidate human resources to be assigned to a project, said project requiring predetermined skills and predetermined time availability, comprising:

maintaining, in said computer system, a system database storing system skills data identifying skills possessed by potential candidate human resources and system calendar data of scheduled activities of potential candidate human resources, and searching said system skills and calendar data for human resources possessing said predetermined skills and said predetermined time availability, so as to identify said candidate human resources, wherein said searching step includes identifying said candidate human resources irrespective of conflicts between said predetermined time availability of said project and said scheduled activities of said candidate human resources, said method further including:

providing a notification of said conflicts between said predetermined time availability of said project and said scheduled activities of said candidate human resources identified in said searching step.

21. A method implemented on a programmed computer system for identifying candidate human resources to be assigned to a project, said project requiring predetermined skills and predetermined time availability, comprising:

maintaining, in said computer system, a system database storing system skills data identifying skills possessed by potential candidate human resources and system calendar data of scheduled activities of potential candidate human resources, searching said system skills and calendar data for human resources possessing said predetermined skills and said predetermined time availability, so as to identify said candidate human resources, generating a resource search display for entering search parameters defining requirements of said project, said search parameters including said predetermined skills, said search parameters defining a search profile, storing said search profile with a profile name, and selecting said profile name so as to automatically enter said search parameters comprising said profile onto said resource search display.

22. A method implemented on a programmed computer system for identifying candidate human resources to be assigned to a project, said project requiring predetermined skills, comprising:

maintaining, in said computer system, a system database storing system skills data identifying skills possessed by potential candidate human resources, searching said system skills data for human resources possessing said predetermined skills so as to identify said candidate human resources, and generating a list of said candidate human resources identified in said searching step, said maintaining step further including maintaining said system database storing further system data identifying further information with respect to said potential candidate human resources, said method further including:

activating a filter by defining an additional search parameter, and filtering said list in accordance with said additional search parameter by searching said further system data for human resources on said list satisfying said further search parameter, thereby identifying filtered candidate human resources.

23. The method of claim 22 further including:

generating assignments to said project of said filtered candidate human resources.

24. Resource Management System (RMS) apparatus implemented on a programmed computer system for identifying candidate human resources to be assigned to a project, said project requiring predetermined skills and predetermined time availability, comprising:

a system database in said computer system storing system skills data identifying skills possessed by potential candidate human resources and system calendar data of scheduled activities of potential candidate human resources, means for searching said system skills and said system calendar data for human resources possessing said predetermined skills and said predetermined time availability, so as to identify said candidate human resources, means for generating assignments to said project of candidate human resources identified by said searching means, means for adding data of said assignments to said system calendar data, and means for generating a calendar display from said system calendar data for an individual human resource with days of said calendar display highlighted in accordance with project assignments of said individual human resource, including an assignment added to said system calendar data by said adding means, thereby automatically determining human resources with appropriate skills and time availability for assignment to projects and automatically generating said calendar display providing an overview of said highlighted days during which said individual human resource is assigned to said projects.

25. The apparatus of claim 24 wherein said apparatus services an enterprise and said project is a project of said enterprise, said enterprise maintaining databases external to said computer system storing data relating to human resources of said enterprise, said apparatus further including:

interfaces between said external databases and said computer system for providing data from said external databases for said system data stored in said system database.

26. The apparatus of claim 25 wherein said project requires a predetermined skill proficiency level and said system skills data identify skill proficiency levels possessed by potential candidate human resources, said searching means being operative for searching said system skills data for human resources possessing said predetermined skill proficiency level so as to identify said candidate human resources.

27. The apparatus of claim 25 wherein said project requires a predetermined skill environment and said system skills data identify skill environments possessed by potential candidate human resources, said searching means being operative for searching said system skills data for human resources possessing said predetermined skill environment so as to identify said candidate human resources.

28. The apparatus of claim 25 wherein said system database further includes further system data identifying further information with respect to said potential candidate human resources, said apparatus further including:

means for generating a display of said further information pertaining to said candidate human resources identified by said searching means, and means for generating assignments to said project of candidate human resources identified by said searching means and selected in accordance with said display of said further information.

29. The apparatus of claim 28 wherein said further information includes resumes of said potential candidate human resources.

30. The apparatus of claim 24 operative for transferring data related to said assignments through said interfaces to said external databases for updating said external databases therewith.

31. The apparatus of claim 30 wherein said interfaces provide for interchange of data between said system database and said external databases, said apparatus further including:

a common user interface for accessing and updating said system database and said external databases, said common user interface providing a common view of the information in said system database and said external databases.

32. The apparatus of claim 24 wherein said means for generating a calendar display is operative for differently highlighting said days in accordance with different assignment types.

33. The apparatus of claim 32 wherein said means for generating a calendar display is operative for emphasizing said days in accordance with non-project schedules of said individual human resource.

34. The apparatus of claim 24 further including:

means for generating, for said individual human resource, a monthly calendar display of days of the month with scheduled daily activities of said individual human resource.

35. The apparatus of claim 24 further including:

means for selecting a day of said calendar display, and means for generating a display of scheduled activities of said individual human resource for said selected day.

36. The apparatus of claim 35 further including:

means for generating a list of projects on said calendar display to which said individual human resource is assigned.

37. The apparatus of claim 24 wherein said predetermined time availability includes a repeating time pattern.

38. The apparatus of claim 24 further including means for providing notification of said assignments.

39. The apparatus of claim 24 wherein:

said system database further includes system External Services Vendor data identifying skills possessed by External Services Vendors, said External Services Vendors being potential candidate human resources, said searching means being operative for searching said system External Services Vendor data for External Services Vendors possessing at least one of said predetermined skills so as to identify at least one of said candidate human resources.

40. Resource Management System (RMS) apparatus implemented on a programmed computer system for identifying candidate human resources to be assigned to a project, said project requiring predetermined skills and predetermined time availability, comprising:

a system database in said computer system storing system skills data identifying skills possessed by potential candidate human resources and system calendar data of scheduled activities of potential candidate human resources, and means for searching said system skills and calendar data for human resources possessing said predetermined skills and said predetermined time availability, so as to identify said candidate human resources, said system database further including system personnel data identifying demographic parameters of potential candidate human resources, said project requiring a predetermined demographic parameter, said searching means being operative for searching said system personnel data for human resources possessing said predetermined demographic parameter so as to identify said candidate human resources.

41. The apparatus of claim 40 wherein said predetermined demographic parameter comprises location.

42. The apparatus of claim 40 wherein said predetermined demographic parameter comprises organization of said enterprise.

43. Resource Management System (RMS) apparatus implemented on a programmed computer system for identifying candidate human resources to be assigned to a project, said project requiring predetermined skills and predetermined time availability, comprising:

a system database in said computer system storing system skills data identifying skills possessed by potential candidate human resources and system calendar data of scheduled activities of potential candidate human resources, and means for searching said system skills and calendar data for human resources possessing said predetermined skills and said predetermined time availability, so as to identify said candidate human resources, wherein said searching means is operative for identifying said candidate human resources irrespective of conflicts between said predetermined time availability of said project and said scheduled activities of said candidate human resources, said apparatus further including:

means for providing a notification of said conflicts between said predetermined time availability of said project and said scheduled activities of said candidate human resources identified by said searching means.

44. Resource Management System (RMS) apparatus implemented on a programmed computer system for identifying candidate human resources to be assigned to a project, said project requiring predetermined skills and predetermined time availability, comprising:

a system database in said computer system storing system skills data identifying skills possessed by potential candidate human resources and system calendar data of scheduled activities of potential candidate human resources, means for searching said system skills and calendar data for human resources possessing said predetermined skills and said predetermined time availability, so as to identify said candidate human resources, means for generating a resource search display for entering search parameters defining requirements of said project, said search parameters including said predetermined skills, said search parameters defining a search profile, said apparatus being operative for storing said search profile with a profile name, and means for selecting said profile name and automatically entering said search parameters comprising said profile onto said resource search display.

45. Resource Management System (RMS) apparatus implemented on a programmed computer system for identifying candidate human resources to be assigned to a project, said project requiring predetermined skills, comprising:

a system database in said computer system storing system skills data identifying skills possessed by potential candidate human resources, means for searching said system skills data for human resources possessing said predetermined skills so as to identify said candidate human resources, and means for generating a list of said candidate human resources identified by said searching means, said system database further including further system data identifying further information with respect to said potential candidate human resources, said apparatus further including:

search parameter filter means for defining an additional search parameter and filtering said list in accordance with said additional search parameter by searching said further system data for human resources on said list satisfying said further search parameter, thereby identifying filtered candidate human resources.

46. The apparatus of claim 45 further including:

means for generating assignments to said project of said filtered candidate human resources.

* * * * *